US005745662A

United States Patent [19]

Nagata et al.

[11] Patent Number: 5,745,662

[45] Date of Patent: Apr. 28, 1998

[54] SIGNAL PROCESSING APPARATUS OF A PRINTER UTILIZING INTERRUPTION SIGNALS

[75] Inventors: Tomishi Nagata; Makoto Maehara, both of Shizuoka, Japan

[73] Assignee: Star Micronics Co., Ltd., Shizuoka, Japan

[21] Appl. No.: 748,718

[22] Filed: Nov. 14, 1996

Related U.S. Application Data

[63] Continuation of Ser. No. 136,251, Oct. 15, 1993, abandoned.

[30] Foreign Application Priority Data

Oct. 19, 1992 [JP] Japan ........................ 4-279803

[51] Int. Cl.[6] ........................ G06F 15/00

[52] U.S. Cl. ........................ 395/113; 358/437

[58] Field of Search ........................ 395/101, 106, 395/111, 112, 113, 114, 325, 376, 733, 734, 735, 551, 553, 556, 557; 358/437; 711/206, 217, 218, 221; 364/736.5, 737; 399/9, 18, 19, 30, 76

[56] References Cited

U.S. PATENT DOCUMENTS

| | | | |
|---|---|---|---|
| 4,388,697 | 6/1983 | Breen et al. | 375/222 |
| 4,878,170 | 10/1989 | Zeevi | 701/211 |
| 5,008,709 | 4/1991 | Shinada et al. | 399/86 |
| 5,010,482 | 4/1991 | Keller et al. | 395/872 |
| 5,027,135 | 6/1991 | Negishi et al. | 347/134 |
| 5,032,986 | 7/1991 | Pathau et al. | 711/217 |
| 5,101,344 | 3/1992 | Bonet et al. | 345/581 |
| 5,282,274 | 1/1994 | Liu | 711/206 |

FOREIGN PATENT DOCUMENTS

| | | | |
|---|---|---|---|
| 63-251825 | 4/1987 | Japan | G06F 15/00 |
| 63-251825 | 10/1988 | Japan . | |

OTHER PUBLICATIONS

Patent Abstracts of Japan, vol. 016, No. 382 (P-1403), 14 Aug. 1992 & JP 04 122954A (Ricoh Co Ltd), 23 Apr. 1992 * abstract *.

Patent Abstracts of Japan, vol. 008, No. 223 (P-307), 12 Oct. 1984 & JP 59 106050 A (Fujitsu KK) 19 Jun. 1984 * abstract *.

Patent Abstracts of Japan, vol. 009, No. 123 (E-317), 28 May 1985 & JP 60 010873 A (Canon KK) 21 Jan. 1985 * abstract *.

*Primary Examiner*—David K. Moore
*Assistant Examiner*—Gabriel I. Garcia
*Attorney, Agent, or Firm*—Wenderoth, Lind & Ponack

[57] ABSTRACT

An LED printer 21, after power-on, take steps a1 to a6 for preparation and then steps a7 to a9 for printing operation, as shown in FIG. 28. In controlling the printing operation at step a9, the temperature of a fixing unit 46 is detected by a thermistor or the like. Collection of these various data is accomplished by providing a step for counting the number of executions of the operation in the operation executed every one-millisecond and by converting the number of executions thus counted into an elapsed time. The configuration of the processing apparatus is thereby remarkably reduced in size.

3 Claims, 70 Drawing Sheets

163(133)

TEMP. T →

| TEMP. T (deg.) | ENERGIZING DUTY |
|---|---|
| 100 | μ1/50 |
| 110 | μ2/50 |
| ⋮ | ⋮ |
| 170 | μn/50 |

→ ENERGIZING DUTY Dd

Fig. 25
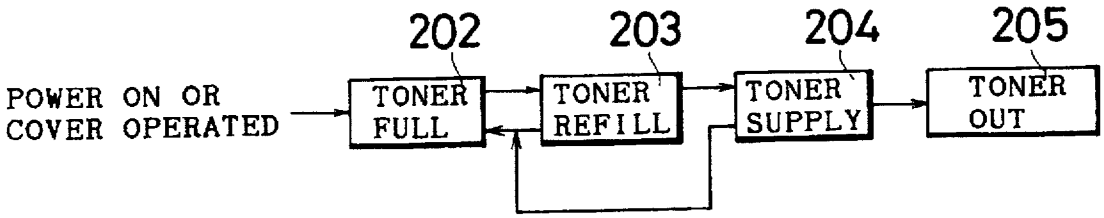
Fig. 26
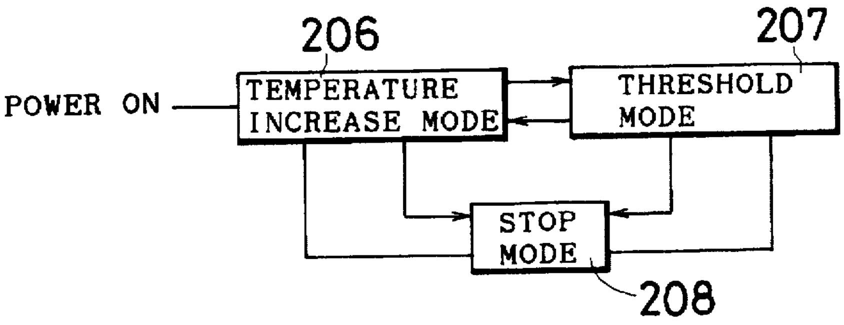
Fig. 27 (1)
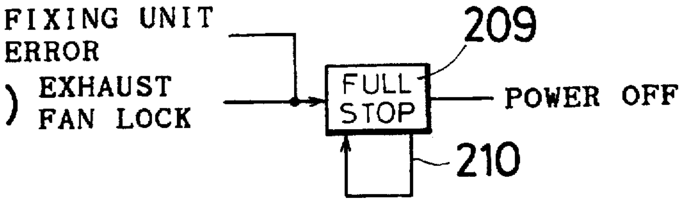
Fig. 27 (2)
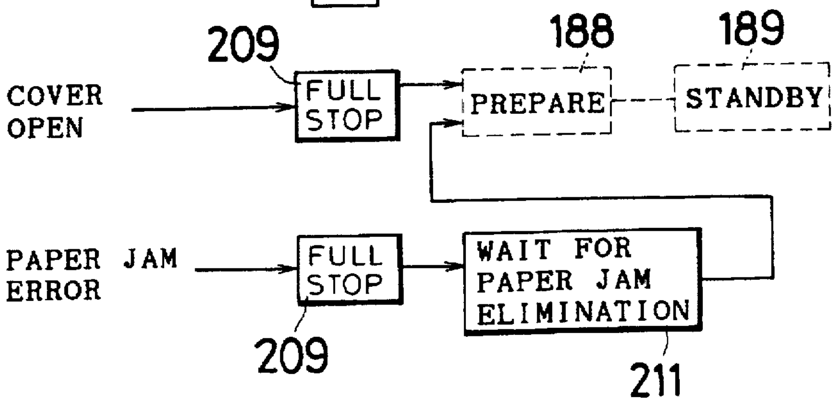

Fig. 29 (1) POWER SUPPLY
AC100V
0V
Fig. 29 (2) DRIVING VOLTAGE V1
DC5V
0V
Fig. 29 (3) DRIVING VOLTAGE V1
DC5V
0V
Fig. 29 (4) $\overline{RS}$
t1
t3
t4
t2
t5
ΔV

Fig. 30 (1) DATA

Fig. 30 (2) DATA

Fig. 32 (1) BD
Fig. 32 (2) STB1
Fig. 32 (3) STB2
Fig. 32 (4) STB3
Fig. 32 (5) STB4

Fig. 33(1) CPRDY
Fig. 33(2) MOTOR
Fig. 33(3) CHARGER
Fig. 33(4) DEVELOPING BIAS VOLTAGE
Fig. 33(5) FIXING ROLLER TEMP.
Fig. 33(6) PREPARATION FLAG
Fig. 33(7) TONER SENSOR
Fig. 33(8) TONER MOTOR

Fig. 41 (1) MOTOR 126

Fig. 41 (2) FIXING UNIT 46

Fig. 41 (3) PRINT

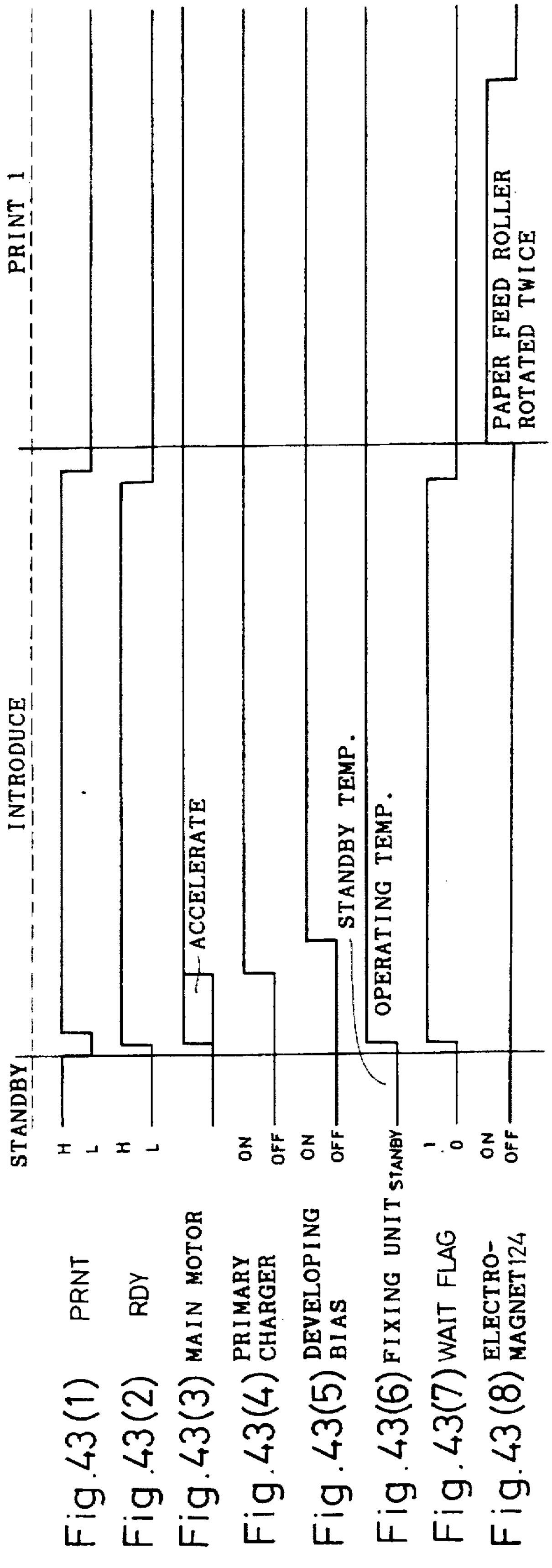
STANDBY
INTRODUCE
PRINT 1
Fig.43(1) PRNT
H
L
Fig.43(2) RDY
H
L
Fig.43(3) MAIN MOTOR
ACCELERATE
Fig.43(4) PRIMARY CHARGER
ON
OFF
Fig.43(5) DEVELOPING BIAS
ON
OFF
Fig.43(6) FIXING UNIT
STANBY
STANDBY TEMP.
OPERATING TEMP.
Fig.43(7) WAIT FLAG
1
0
Fig.43(8) ELECTRO-MAGNET124
ON
OFF
PAPER FEED ROLLER ROTATED TWICE Fig.47(1) SENSOR 39
Fig.47(2) VSRQ
Fig.47(3) VSY
Fig.47(4) RESIST ROLLER 38
Fig.47(5) TRANSFER DISCHARGER100
Fig.47(6) SENSOR 51
ON
OFF
H
L
FIRST PRINT
SECOND PRINT
PRINT READY
STOP
t8
t9
t10
t11
t12
t13
NEXT PAPER FEED OK
PAPER OVER
DISCHARGE

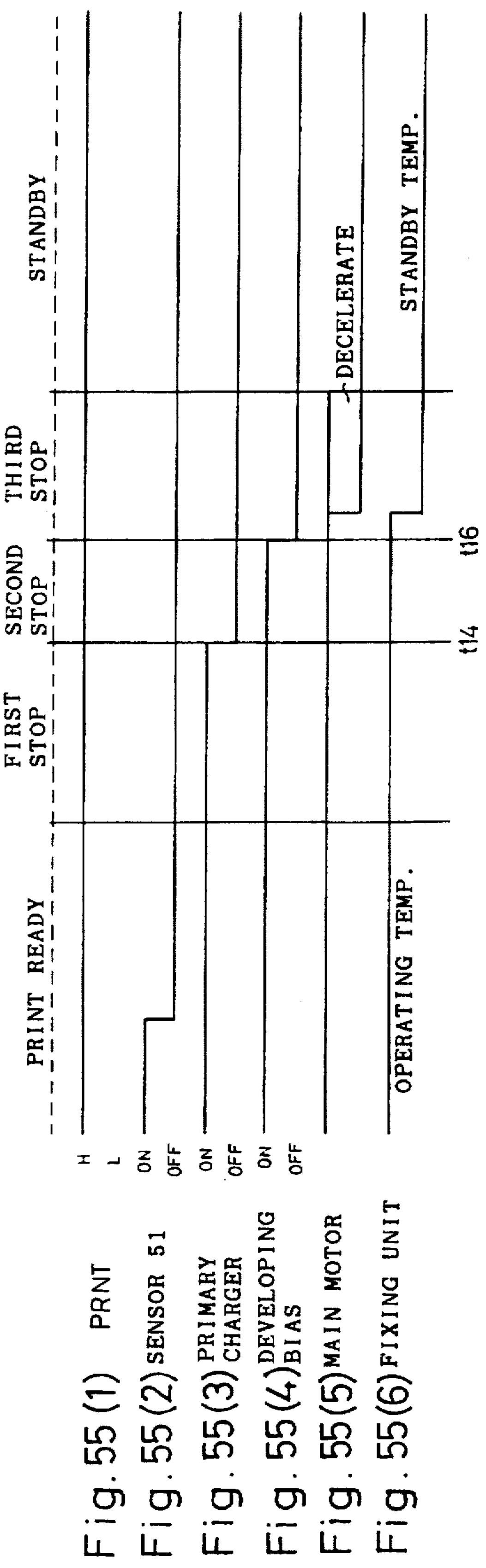
PRINT READY
FIRST STOP
SECOND STOP
THIRD STOP
STANDBY
DECELERATE
STANDBY TEMP.
OPERATING TEMP.
t14
t16
H
L
ON
OFF
Fig. 55(1) PRNT
Fig. 55(2) SENSOR 51
Fig. 55(3) PRIMARY CHARGER
Fig. 55(4) DEVELOPING BIAS
Fig. 55(5) MAIN MOTOR
Fig. 55(6) FIXING UNIT

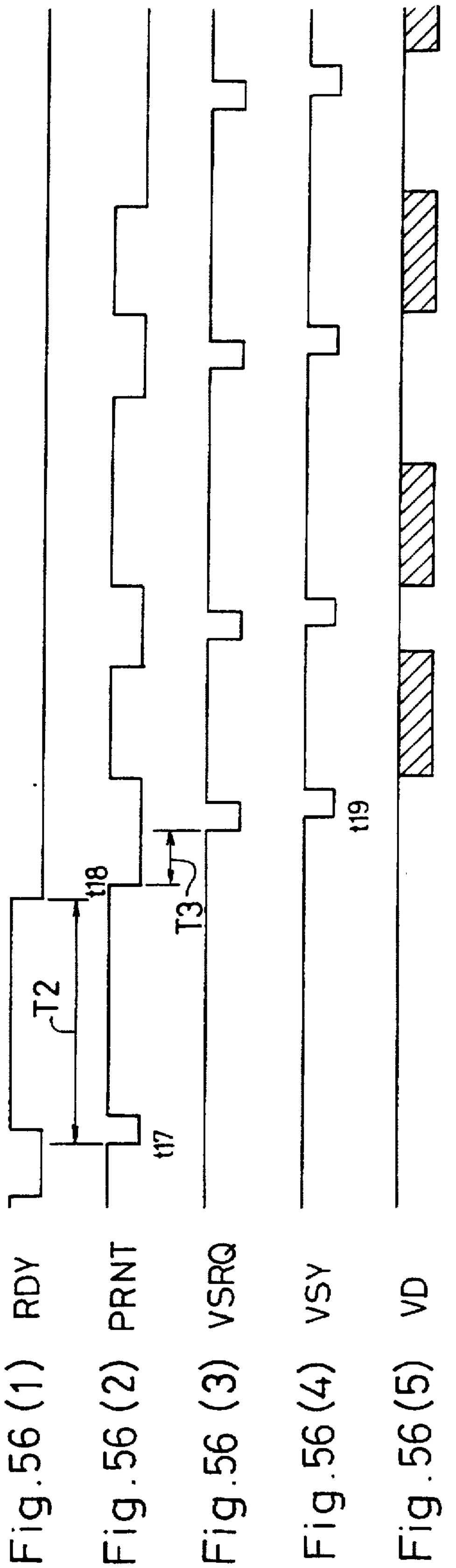
Fig.56 (1)
Fig.56 (2)
Fig.56 (3)
Fig.56 (4)
Fig.56 (5)

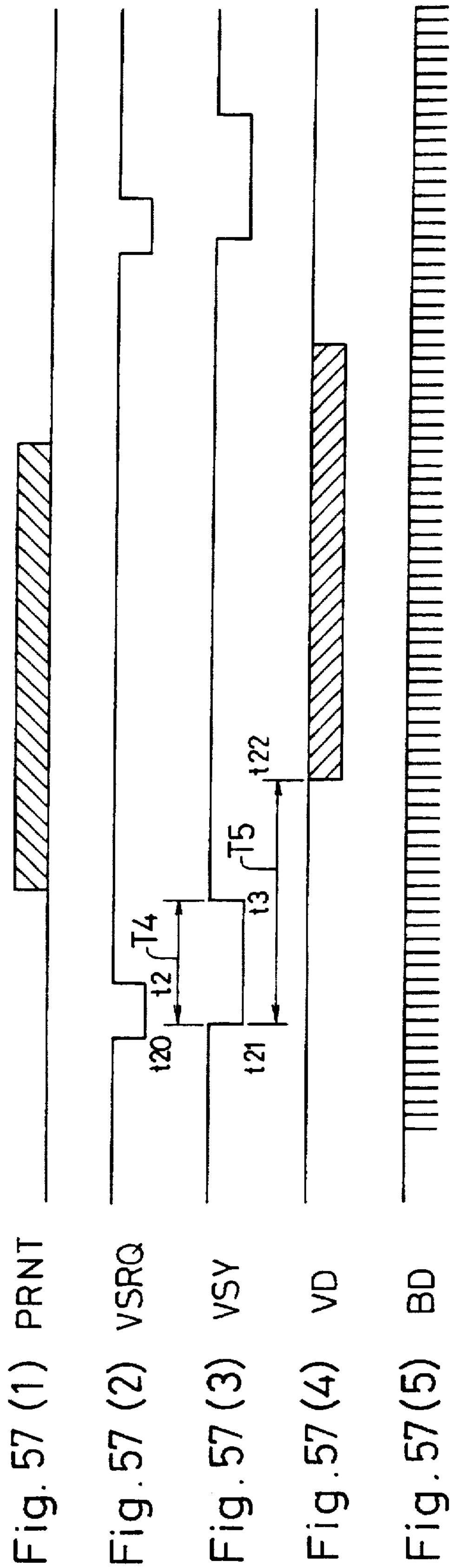
Fig. 57 (1)
Fig. 57 (2)
Fig. 57 (3)
Fig. 57 (4)
Fig. 57 (5)

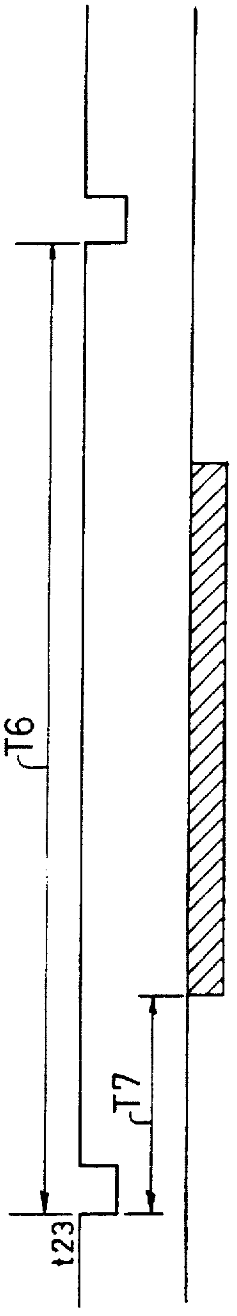
Fig. 58(1) BD
Fig. 58(2) VD

Fig. 68
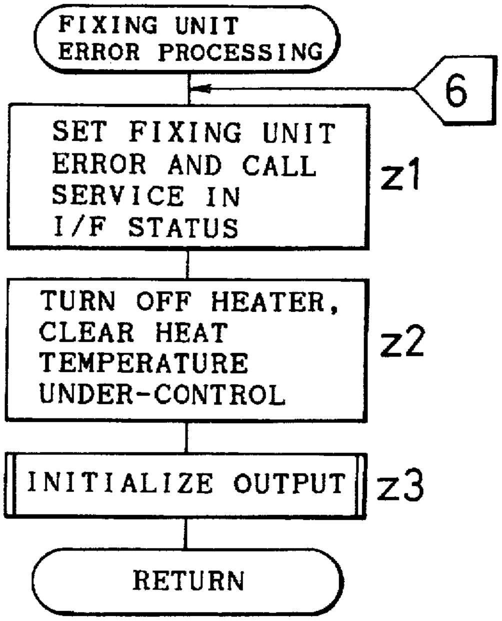
Fig. 69 (1) CPU 145 OUTPUT
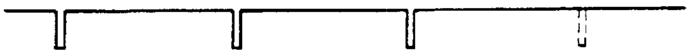
Fig. 69 (2) WDT 151 OUTPUT
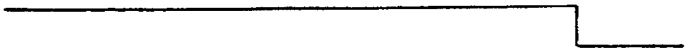
Fig. 69 (3) CPU 145 OURPUT

Fig.70 (1)
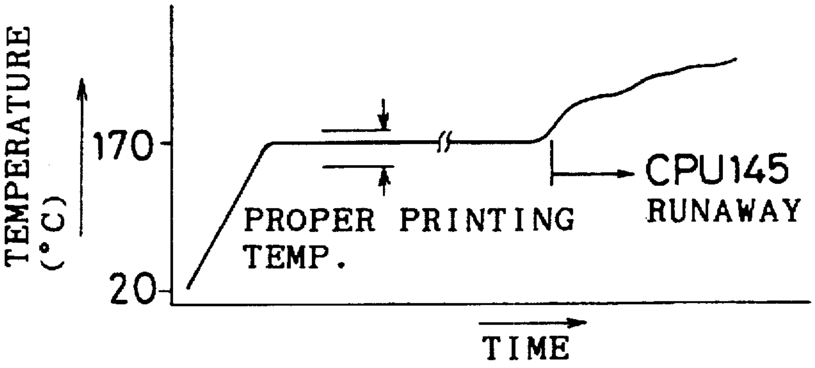
Fig.70 (2)
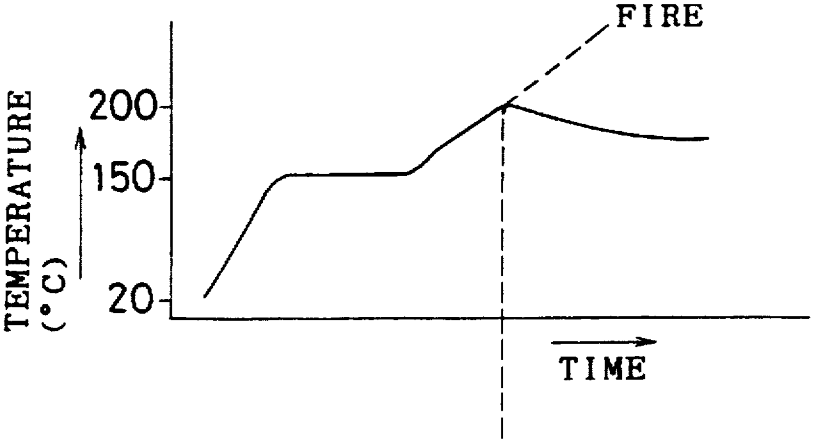
Fig.70 (3)

SIGNAL PROCESSING APPARATUS OF A PRINTER UTILIZING INTERRUPTION SIGNALS

This application is a Continuation of now abandoned application Ser. No. 08/136,251, filed Oct. 15, 1993.

BACKGROUND OF THE INVENTION

1. Field of the Invention

The present invention relates to a signal processing apparatus for processing data, signals, etc., on the basis of an operation program stored in advance.

2. Description of the Related Art

In recent years, an electrophotographic apparatus such as LED (light-emitting diode) printer or laser printer (hereinafter sometimes collectively referred to as "optical printer") has been widely used as an electronic printer. In such an optical printer, the operations of transporting recording paper, forming an electrostatic latent image on a photosensitive drum or the control of various drive mechanisms for performing these operations are executed by a CPU (central processing unit) including a microprocessor. These control operations are performed in accordance with an operation program stored in a ROM (read-only memory) or the like in advance.

When the CPU controls a transfer apparatus, a timer is set for each sheet of the recording paper introduced into a housing in order to specify ever-changing positions of the recording paper transported in the housing. More specifically, the position of the recording paper after being introduced into the housing is measured as an elapsed time from the moment of introduction. A great number of such timers are required as they are also used for regulating the duration of various operations or time intervals between different operations in the electrophotographic apparatus.

On the other hand, a clock signal used for these operation of the CPU is prepared by dividing a source oscillation of a frequency band between several MHz and several tens of MHz fed from a crystal oscillator. Providing a required number of timers or counters by hardware using the source oscillation or clock signal results in a disadvantage of a bulky circuit configuration. When an attempt is made to program control the operation of such a counter or timer, it is necessary to assign separate memory areas for performing a required number of timers or counters to a memory connected with the CPU. Further, the source oscillation or clock signal has a very high frequency as compared with the speed or cycle of transportation of the recording paper, for example, in the electrophotographic apparatus. Therefore, in assigning timers and counters to the memory, timer value or counter value is considerably increased, thereby requiring a large memory capacity. In the memory of the electrophotographic apparatus, other area for storing or processing various data but the counters and timers is reduced, thus deteriorating function of the apparatus. Increasing the memory capacity to obviate this disadvantage also increases the size of the configuration. These disadvantages occur in an electronic device and equipment in general having a stored program type of control unit as well as in the electrophotographic apparatus.

As described above, in the prior art, to prevent the deterioration of the function of the electrophotographic apparatus, it is necessary to increase the storage capacity of a storage means, resulting in a disadvantage of a bulky configuration.

The prior art control units perform various processes while receiving signals in parallel from a number of sensors, such as a sensor for detecting whether a paper cassette has been set for supplying recording paper to which a toner image on the photosensitive drum mounted in an LED printer is transferred, a sensor for detecting the absence of the recording paper in the paper cassette, a paper jam sensor mounted on the transport path of the recording paper in the housing, a temperature sensor of a fixing unit for thermally fixing the recording paper to which the toner image has been transferred and so forth.

FIG. 73 is a block diagram showing a conventional apparatus where signals are introduced from a number of sensors. A plurality of sensors 1 as mentioned above are connected to an input circuit 2, and a signal from each sensor 1 is binary coded on the basis of a threshold value set for each sensor 1. The input circuit 2 is connected to a control unit 3 such as a microcomputer. The control unit 3 outputs address data corresponding to each sensor 1 to the input circuit 2 through an address bus 6 having a plurality of bits thereby to designate one of the sensors 1. The data related to the designated sensor 1 is read through an eight-bit data bus 5, for example.

In accordance with the read data which is either a logic level "1" or a logic level "0", the control unit 3 outputs through the address bus 6 address data corresponding to any one of a plurality of program areas 4*a*, 4*b*, . . . set in a program memory 4 such as a ROM (read-only memory).

The operation of this control unit 3 is described as the following instructions:

READ A, PORT

TEST 1, A

GOTO ON, PROCESSING PROGRAM ADDRESS

More specifically, this series of instructions stores the data of the sensor 1 designated at an address PORT into a register A to judge whether the first bit of the data stored in the register A is a logic level "1" or a logic level "0". On the basis of the result of this judgment, if the first bit is a logic level "1", the process is shifted to a head address of the program area 4*a*, for example, and if the first bit is a logic level "0", the process is shifted to a head address of the program area 4*b*.

In the conventional art, as described above, the three steps of instructions mentioned above are required to read an output of any one of the sensors 1 and then to execute an operation corresponding to the output conditions. It is necessary to repeat such a process for all the sensors 1 connected with the input circuit 2, and therefore data read operation is a much time-consuming job.

FIG. 74 is a block diagram showing a conventional apparatus where signals are sent to a plurality of ports. In a conventional printer, a CPU 3 is provided for controlling the operation of a motor, a solenoid (electromagnetic plunger) for switching the operation of a mechanism, a discharger and others. The CPU 3 is connected with a memory 8 such as a random-access memory (RAM) to store the operating data on the motor or solenoid or data on the activation/deactivation of a high voltage circuit for applying high voltage to the discharger.

The CPU 3 is connected to an output port 7 through an address bus 6 and a data bus 5 comprising a plurality of bits respectively. The output port 7 is designated by an address data (PORT) outputted from the CPU 3 through the address bus 6. Data read from a memory 8 and stored in an accumulator 3*a* in the CPU 3 is transferred to the designated address (PORT) through the data bus 5. The instructions executed by the CPU 3 for these operations are as follows:

READ A, (MEMORY)

ADD A, 00000010B

WRITE (PORT), A

WRITE (MEMORY), A

In this series of instructions, the first instruction reads data in an address (MEMORY) in the memory 8 into the accumulator 3*a*, and the second instruction adds the data "00000010B" to the data in the accumulator 3*a* thereby to set the second lowest bit of the eight-bit data to "1". The third instruction outputs the data in the accumulator 3*a* to an address (PORT). The fourth instruction stores changed contents of the accumulator 3*a* again into the address (MEMORY) of the memory 8.

This series of instructions represents an operation for setting the bit b1 of the data comprising bits b7 to b0 to a logic level "1", corresponding to a starting operation of the second motor in the case of FIG. 74.

In the above-described conventional art, it is necessary to designate the output port 7 by using the address data to transfer the control data to the output port 7 through the data bus 5. This transfer in turn requires setting data to be transferred in the accumulator 3*a* of the CPU 3. Setting of the data is attained by transferring the data stored in the memory 8 to the accumulator 3*a*. Accordingly, in the conventional art described, when the CPU 3 controls the starting operation of the second motor, at least four instructions are required as described, thereby consuming a considerable time.

SUMMARY OF THE INVENTION

It is an object of the present invention to provide a signal processing apparatus that overcomes the above-mentioned technical problems and that permits a compact construction.

It is another object of the invention to provide a signal processing apparatus that realizes a drastic improvement in the reading speed of input data from an external device.

It is still another object of the invention to provide a signal processing apparatus that realizes a drastic improvement in the speed of data output operation to an external device.

The invention provides a signal processing apparatus comprising:

- a first processing means for executing a predetermined first process;
- a periodic interrupt setting means for setting an interrupt to the first processing means at predetermined time intervals during the operation of the first processing means; and
- a second processing means for executing a predetermined second process by an interrupt set by the periodic interrupt setting means, counting the number of executions of the second process and executing a predetermined third process when the number of executions of the second process counts up to a predetermined number of executions.

According to the invention, the first processing means executes a predetermined first process. While the first processing means executes the first process, the periodic interrupt setting means sets an interrupt to the first processing means at predetermined time intervals. The second processing means executes a predetermined second process by the interrupt, while counting the number of executions of the second process. When the number of executions of the second process counts up to a predetermined number of executions, a predetermined third process is executed.

Accordingly, where the second processing means executes the third process after a lapse of a period of time corresponding to the predetermined number of executions, there is no need of a timer circuit or program for measuring the period on the basis of a clock signal of high frequency in a megahertz band. Such a timer circuit or a measurement program requires a comparatively large memory capacity for the very high frequency of the clock signal. In addition, in the case where there are a great variety of the third process to be executed by the second processing means, it is necessary to provide so many timer circuits for so many processes, thereby increasing both the memory capacity required for driving the signal processing apparatus and the size of the configuration.

According to the invention, the need for these timer circuits is eliminated, and only a small memory capacity is required to count the number of executions of the second process by setting the predetermined time intervals for interrupts set by the periodic interrupt setting means longer than the cycle of the clock signal. Thus the signal processing apparatus may be downsized.

The invention further provides a signal processing apparatus comprising:

- an input signal selecting means for being supplied with a plurality of signals representing one or the other logic state of binary data and selecting and outputting one of input signals;
- a program storing means for storing operation programs corresponding to one or the other logic state of each input signal in a first storage area or a second storage area respectively comprising separate storage areas associated with each separate input signal, wherein the most significant bit of a head address of the first storage area or the second storage area being so selected as to be a binary data corresponding to the one or the other logic state, and the residual address other than the most significant bit of the separate storage areas associated with each separate input signal being identical;
- an address generating means for generating the residual address data corresponding to each input signal; and
- an address data coupling means for coupling the input signal from the input signal selecting means and the address data from the address generating means into an address data comprising the former as the most significant bit and the latter as the residual address data, and applying the coupled data to the program storing means.

According to the invention, the input signal selecting means is supplied with a plurality of signals representing one or the other logic state of binary data and one of the input signals is selected and outputted. The program storing means stores operation programs corresponding to one or the other logic state of each input signal in the first storage area or the second storage area respectively comprising separate storage areas associated with each input signal. The most significant bit of the head address of the first storage area or the second storage area is so selected as to be a binary data corresponding to one or the other logic state, and the separate storage areas associated with each input signal of the first storage area or the second storage area is so selected that the residual address data other than the most significant bit are identical.

The address data coupling means couples the input signal from the input signal selecting means and the address data from the address generating means into an address data comprising the former as the most significant bit and the latter as the residual address data, and applies the coupled data to the program storing means. As a result, the reading speed of data fed from external devices is improved remarkably.

The invention provides a signal processing apparatus comprising:

an address data output means for outputting an address data comprising a plurality of bits; and an output data select means for being supplied with the address data comprising a plurality of bits and selecting one of a plurality of output terminals on the basis of residual address data other than a predetermined bit, and outputting an address data of the predetermined bit from the selected output terminal.

In the signal processing apparatus according to the invention, address data comprising a plurality of bits is supplied from the address data output means to the output data select means. The output data select means is connected with a plurality of output terminals. One of the output terminals is selected on the basis of the residual address data other than the predetermined bit of the plural-bit address data, and address data of the predetermined bit is outputted from the selected output terminal.

More specifically, in order to output data from an output terminal of the output data select means, the address data output means executes only a single instruction to write given data in the particular address using the coupled address data comprising the residual address data corresponding to the output terminal and the predetermined one-bit address data in a logic state corresponding to the output data contents. Accordingly, the need for executing a plurality of instructions as required in the conventional art is eliminated, thereby remarkably improving the speed of data output operation.

BRIEF DESCRIPTION OF THE DRAWINGS

The above and other objects, features and advantages will be made apparent by the detailed description taken in conjunction with the accompanying drawings below.

FIG. 25 is a transition diagram for explaining the toner-refilling operation in the LED printer 21.

FIG. 26 is a transition diagram for explaining the temperature control operation for the fixing unit 46 of the LED printer 21.

FIG. 27 is a transition diagram for explaining the error processing for the LED printer 21.

FIG. 29 is a timing chart showing the operation of the LED printer 21 at power on.

FIG. 33 is a timing chart for explaining the operation of the LED printer 21 after power on.

FIG. 43 is a timing chart for explaining the printing operation according to an embodiment.

FIG. 55 is a timing chart for explaining the printing stop operation according to an embodiment.

FIG. 56 is a timing chart for explaining the relationship between various control signals and the printing data VD according to an embodiment.

FIG. 57 is a timing chart for explaining the relationship between various control signals and the horizontal synchronizing signal BD.

FIG. 58 is a timing chart for explaining the relationship between the horizontal synchronizing signal BD and the printing data VD.

FIG. 68 is a flowchart for explaining the error processing executed after steps v16 and v22 in FIGS. 64(*b*) and 64(*c*).

FIG. 69 is a timing chart for explaining the operation of detecting the runaway of the CPU 145 in the LED printer 21.

FIG. 70 shows waveforms for explaining the temperature control operation of the fixing unit 46.

DESCRIPTION OF THE PREFERRED EMBODIMENTS

A preferred embodiment of the invention will be explained below with reference to the accompanying drawings.

(1) Mechanical Configuration of LED Printer

Figure 1:
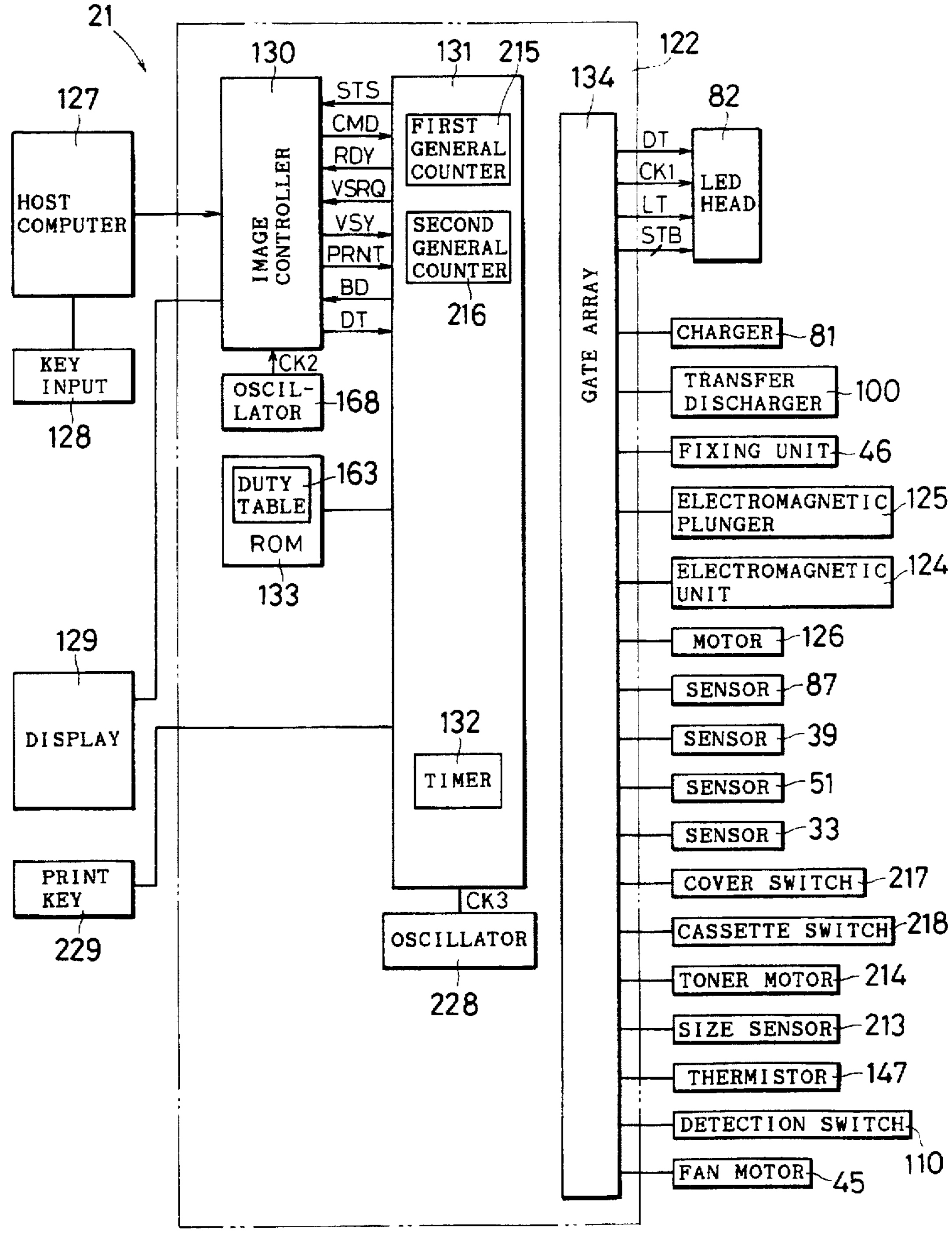
FIG. 1 is a block diagram showing a general electrical configuration of an LED printer 21 according to an embodiment of the invention.
Figure 2:
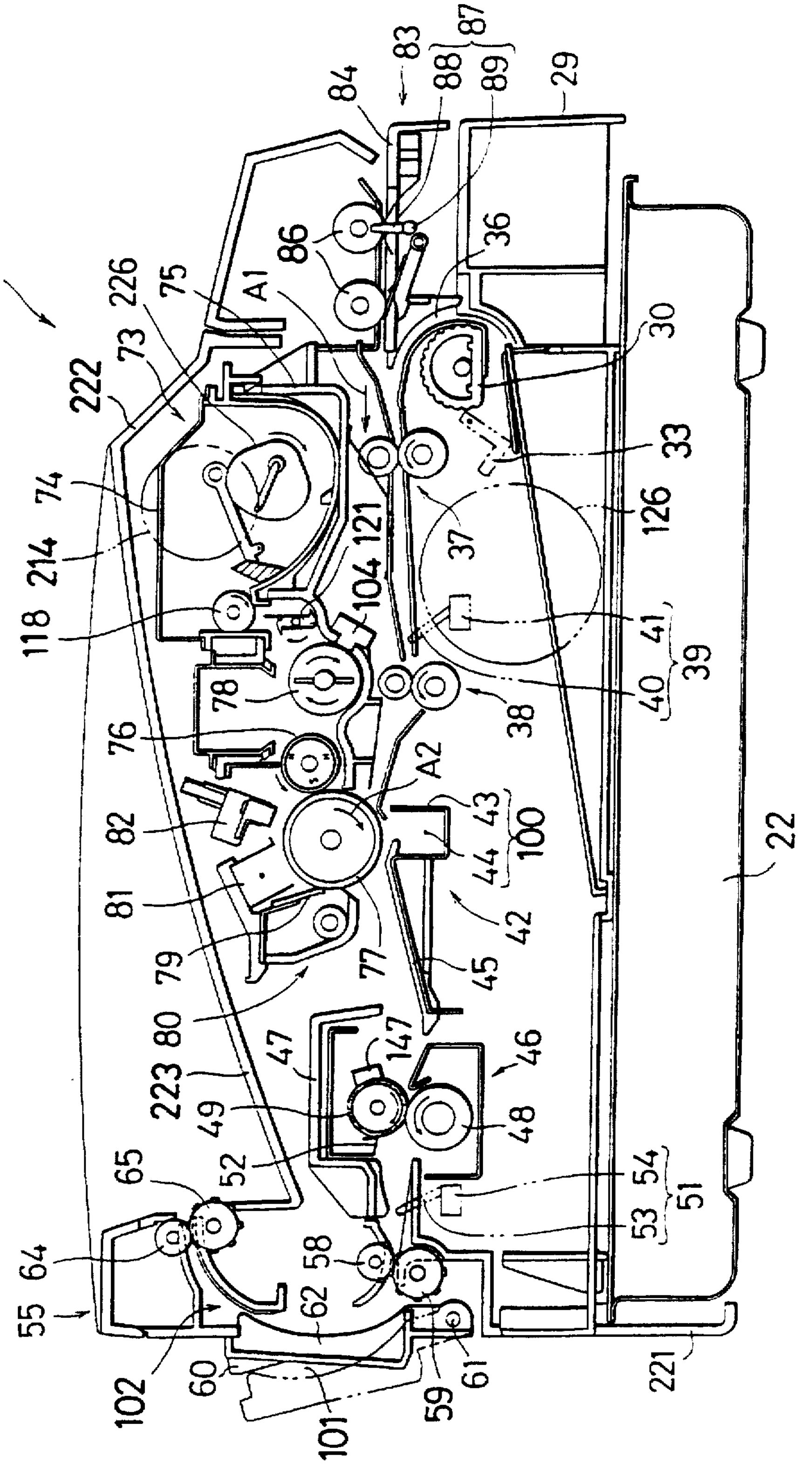
FIG. 2 is a longitudinal sectional view showing the LED printer 21.
Figure 3:
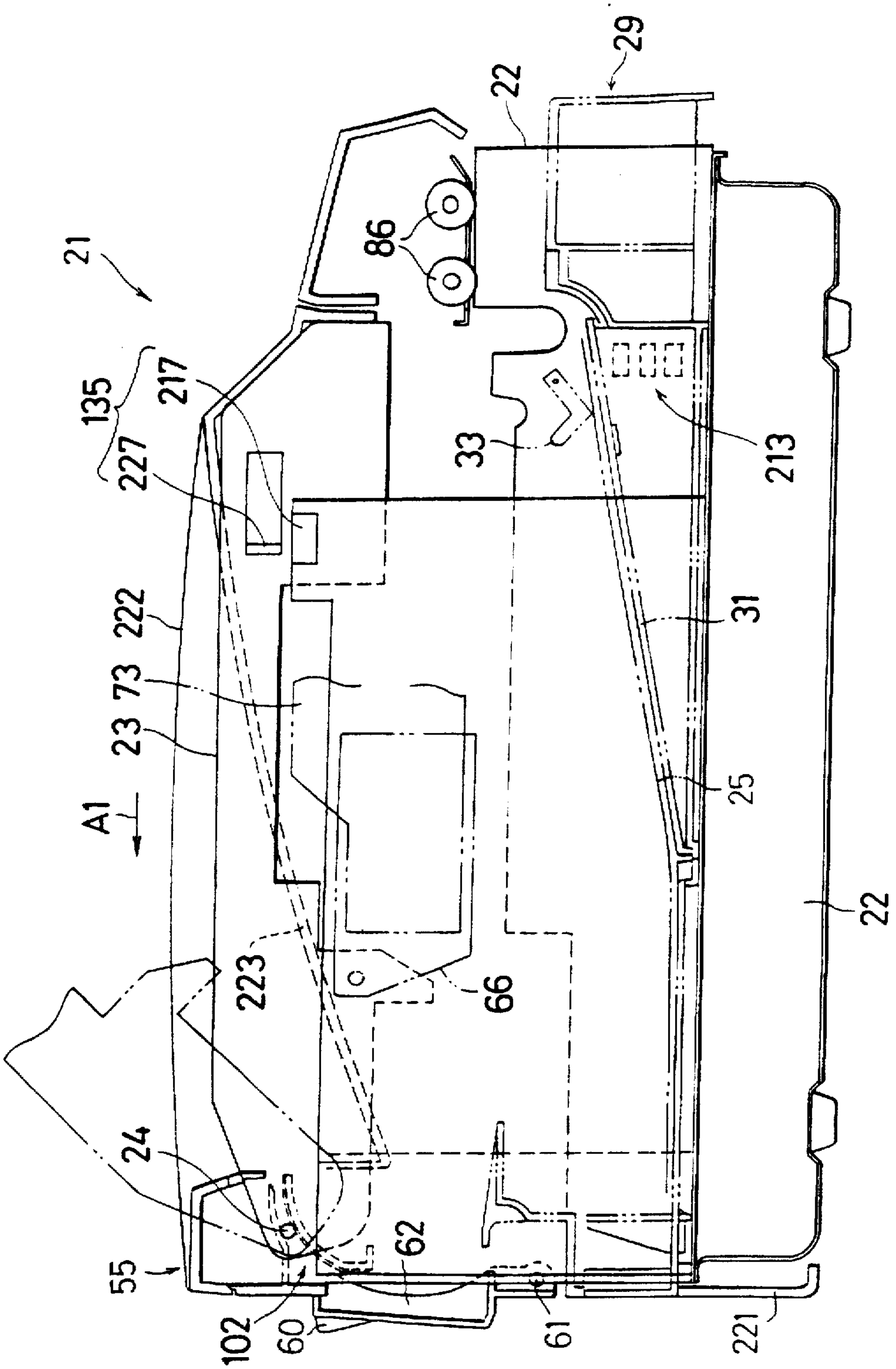
FIG. 3 is another longitudinal sectional view showing the LED printer 21.

FIG. 1 is block diagram showing an electrical configuration of an LED (light-emitting diode) printer 21 according to an embodiment of the invention, FIG. 2 is a system diagram showing a configuration of the LED printer 21 and FIG. 3 is a sectional view showing the LED printer 21 except for the driving mechanism. The LED printer 21 comprises a substantially box-shaped lower housing 22 open upward and an upper housing 23 so shaped as to cover the lower housing 22. The upper housing 23 is coupled angularly displaceably through a support shaft 24 to the substantial upper end of the lower housing 22 in the vicinity of the downstream end in the transport direction A1 of recording paper in the LED printer 21. The lower housing 22 is open upward. The lower housing 22 is surrounded by a lower cover 221 formed of synthetic resin, and the upper housing 23 is covered by a upper cover 222 formed of synthetic resin. In the vicinity of the downstream end in the transport direction A1 of the upper housing 23 and the lower housing 22, disposed is a rear cover 60 pin-connected with the lower cover 221 by a shaft 61.

To the lower housing 22, detachably mounted is a paper cassette 29 containing a stack of recording paper 25 from the upstream side in the transport direction A1. A substantially semicylindrical paper feed roller 30 is disposed on the take-out side of recording paper 25, i.e., on the right side in FIGS. 2 and 3. The paper cassette 29 includes a lift plate 31 urged upward by spring force to bring the recording paper 25 into close proximity to the paper feed roller 30. The paper feed roller 30 is semicylindrical in shape as described above, and functions to start and stop feeding the recording paper 25 for each period of rotation.

The paper feed roller 30 is mounted rotatably in the upstream side of the transport direction A1 of the lower housing 22 with its rotational axis running in parallel to the width direction perpendicular to the transport direction A1, i.e., perpendicular to the page in FIG. 2. Above the lift plate 31 and in the downstream side of the paper feed roller 30 in the transport direction A1, arranged is a sensor 33 for detecting the presence or absence of the recording paper 25 in the paper cassette 29. The sensor 33 comprises a detection lever arranged angularly displaceably around an axis parallel to the width direction and a photosensor for detecting the detection lever optically. Therefore, in case of the absence of recording paper 25 on the lift plate 31, the detection lever is angularly displaced downward. The photosensor detects the state of the detection lever and thereby the absence of the recording paper 25 in the paper cassette 29 is detected.

The recording paper 25 which has started to be fed upstream in the transport direction A1 by the paper feed roller 30 at the upstream end in the transport direction of the 'LED printer 21 is transported further by being held under pressure between a pair of transport rollers 37 through an inverting path 36 for inverting the paper feed downstream of the transport direction A1. The recording paper is thus held by the resist rollers 38. On the upstream side the resist rollers 38, arranged is a sensor 39 for detecting the recording paper.

The sensor 39 also comprises a detection lever 40 and a photosensor 41 for optically detecting the end of the detection lever 40 which may be angularly displaced depending on the presence or absence of the recording paper.

The recording paper that has passed the resist rollers 38 is subjected to the transfer process by a transfer unit 42 in the manner described later. The transfer unit 42 comprises a transfer discharger 100 having a metallic shield case 43 metallic in shape of box longitudinal along the width direction of the LED printer 21 with an opening at one end in the direction perpendicular to the width direction and a discharge wire 44 tensioned in the shield case 43.

The recording paper subjected to the transfer process by the transfer unit 42 is transported to a fixing unit 46. The fixing unit 46 comprises a pressure roller 48 and heating roller 49 in mutual contact in a substantially box-shaped housing 47. The pressure roller 48 is adapted to come into elastic contact with the heating roller 49 by a spring not shown. A cleaning piece 52 and a thermistor 147 for measuring the temperature of the heating roller 49 are arranged in contact around the heating roller 49. A thermal fuse 157 is mounted in sliding contact on the outer periphery of the heating roller 49 of the fixing unit 46. A heater in the heating roller 49 is driven through the thermal fuse 157. This thermal fuse 157 is designed to be cut off at a temperature of about 250° to 300° C. in the fixing unit 46. A sensor 51 for detecting the recording paper 25 is arranged downstream in the transport direction A1 of the fixing unit 46. The sensor 51, which is structured in the same way as the sensors 33, 39, comprises a detection lever 53 protruded into the transport path of the recording paper 25 and a photosensor 54 for detecting the angular displacement of the detection lever 53 under the pressure of the recording paper 25. A rear unit 55 including the sensor 51 is disposed at the downstream end in the transport direction A1 of the lower housing 22.

The rear unit 55 includes paper discharge rollers 58, 59 on the downstream side of the sensor 51 in opposite relation to each other for discharging the recording paper out of the apparatus after the fixing process. An opening 101 is formed on the downstream side of the paper discharge rollers 58, 59 of the rear unit 55 in the transport direction A1. A rear cover 60 for covering the opening 101 as desired is mounted angularly displaceably through an axis 61 downward of the opening 101 of the rear unit 55.

An inverting member 62 constituting an inverting path 102 is arranged on the inside of the rear cover 60. The inverting member 62 following the engaging point of the paper discharge rollers 58, 59 has a substantially semi-arcuate inner peripheral surface for directing the recording paper from the discharge rollers 58, 59 upward and inverting the direction of movement toward the upstream side in the transport direction A1. At the trailing end of the inverting member 62, paper discharge rollers 64, 65 are arranged in opposite relationship to each other for discharging the recording paper into a stacker 223 formed in an upper cover 222.

At almost the center of the upper housing 23 along the transport direction A1, a holding member 66 open toward the upstream side in the transport direction A1 is mounted angularly displaceably. A process cartridge 73 is detachably mounted in the holding member 66.

The process cartridge 73, which is briefly explained below, will be described more in detail later. The process cartridge 73 has a housing 75 for replaceably accommodating a toner box 74 containing toner. A developing roller 76 and a photosensitive drum 77 are rotatably mounted in spaced relationship to each other along parallel axes in the housing 75. The process cartridge 73 includes an agitator 78 for supplying the developing roller 76 with a developer which is a mixture of the toner contained in the toner box 74 and a carrier. In the neighborhood of the agitator 78, disposed is a toner sensor 104 for detecting the toner concentration in the developer.

Around the photosensitive drum 77 in the housing 75, i.e., on the downstream side in the rotational direction A2 of the photosensitive drum 77 with respect to the developing roller 76, arranged are a cleaning unit 80 including a cleaning blade 79 for scraping off the toner remaining on the photosensitive drum 77 after transfer the process by the transfer unit 42 and a charger 81, such as a corona discharger, for charging the surface of the photosensitive drum 77 uniformly with charges of a predetermined polarity. There is a gap between the charger 81 and the developing roller 76, where swingably arranged is an LED head 82 for generating a light for forming a desired optical image on the surface of the photosensitive drum 77 charged by the charger 81.

A manual feed device 83 for feeding the recording paper manually into the LED printer 21 is arranged in the neighborhood of the upstream end in the transport direction A1 of the lower housing 22, above in the inverting path 36 in FIG. 2 where the direction of transport A1 of the recording paper 25 from the paper cassette 29 is inverted in the downstream direction. The manual feed device 83 has a rest 84 for supporting the recording paper for manual loading. Transport rollers 86 for feeding the recording paper into the LED printer 21 are arranged on the rest 84. Under the rest 84, disposed is a sensor 87 for detecting the presence or absence of the recording paper on the rest 84 in order to switch the paper source between the paper cassette 29 and the manual feed device 83. The sensor 87 has a configuration similar to the sensors 33, 39 described above, and includes a detection lever 88 displaceable in angle under the pressure of the recording paper placed on the rest 84 and a photosensor 89 for detecting the angular displacement of the detection lever 88.

The recording paper that has been transported downstream in the transport direction A1 by the transport rollers 86 from the manual feed device 83 is held by the transport rollers 37 in the neighborhood of the upper end of the inverting path 36 shown in FIG. 2 and fed to the resist rollers 38. The recording paper loaded in the manual feed device 83 is detected by the sensor 87. Then, even when the paper cassette 29 is mounted in the LED printer 21, the paper feed roller 30 does not perform the operation as described later, while paper is fed from the manual feed device 83 in priority.

Figure 4:
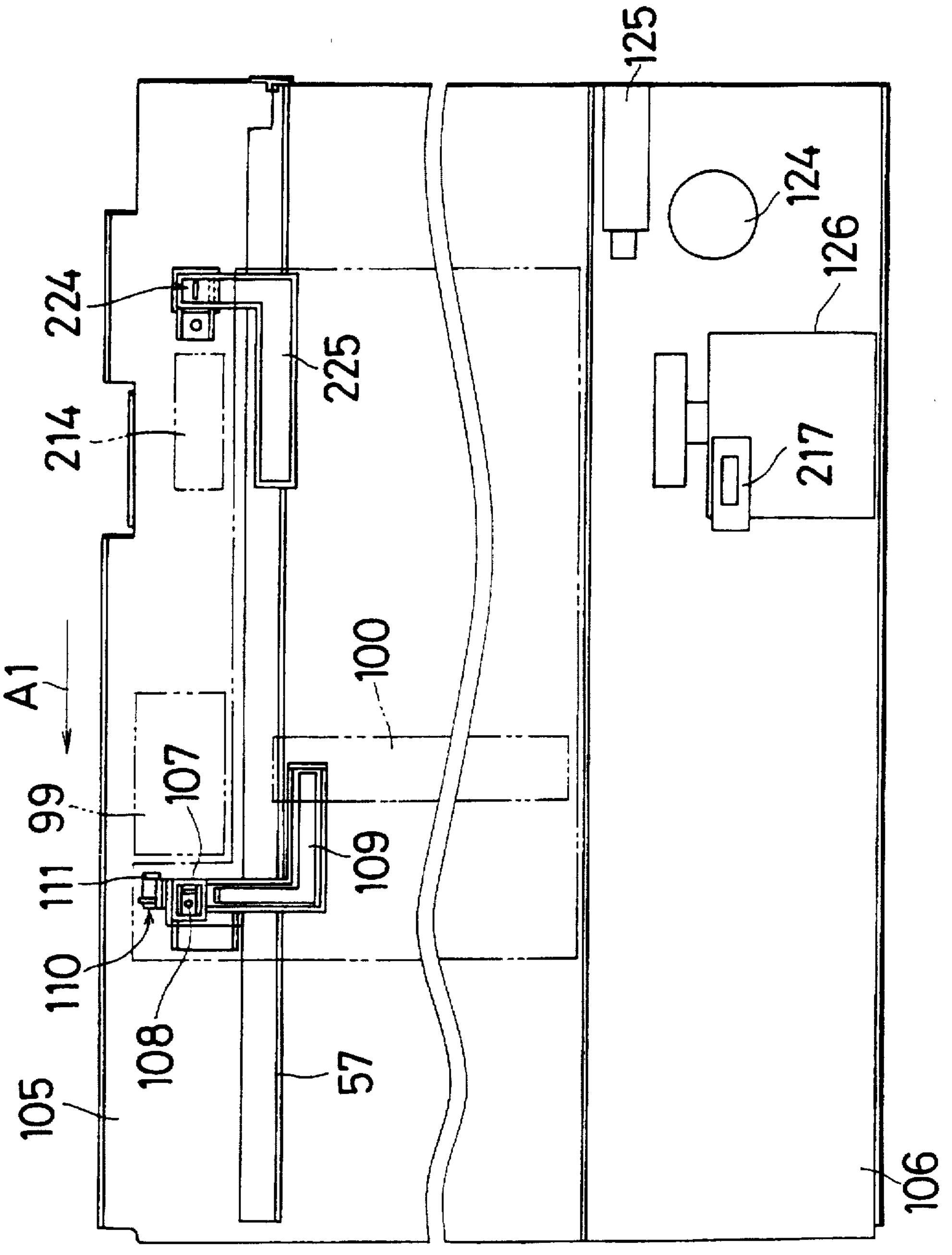
FIG. 4 is a plan view of the LED printer 21.
Figure 5:
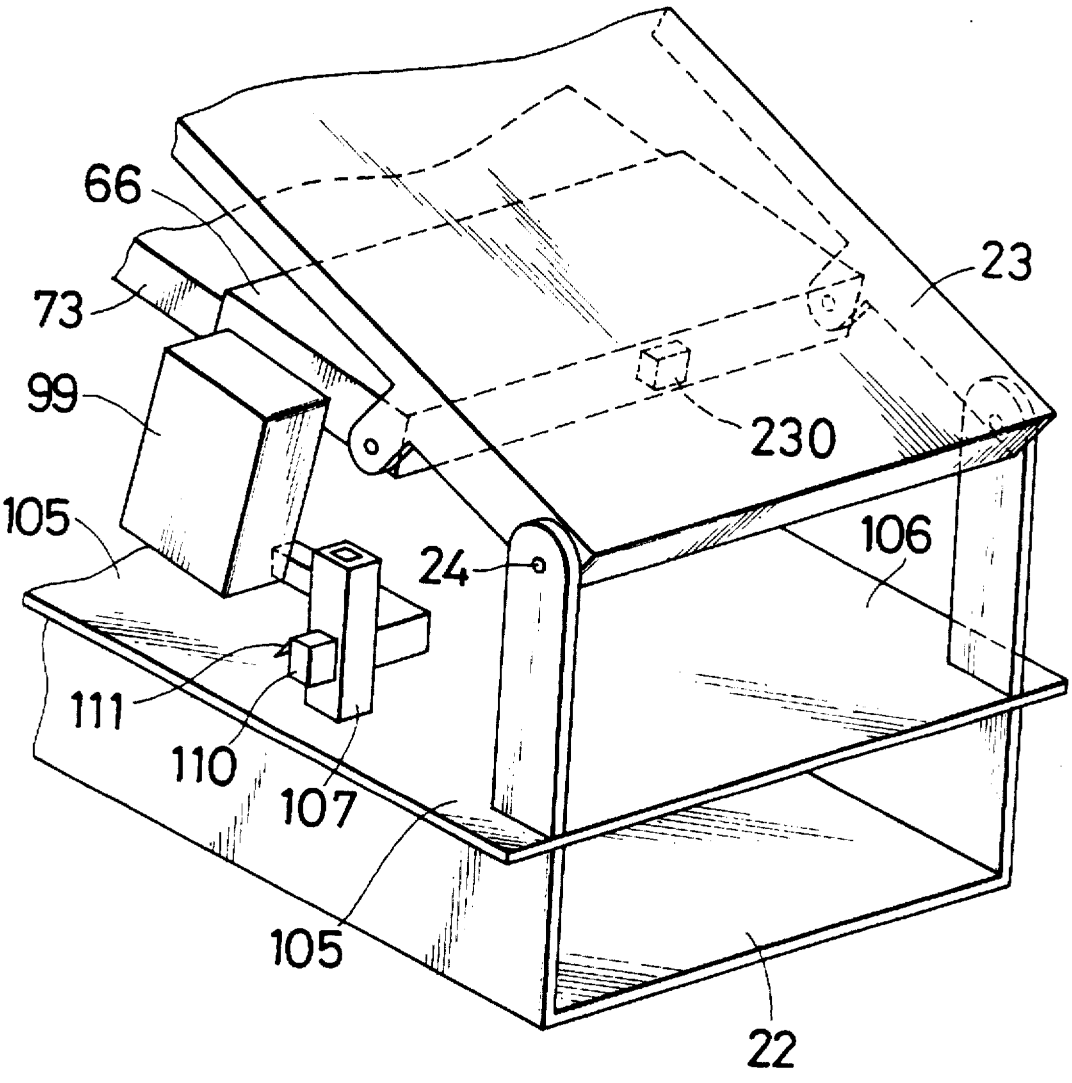
FIG. 5 is a perspective view of the rear side of the LED printer 21.
Figure 6:
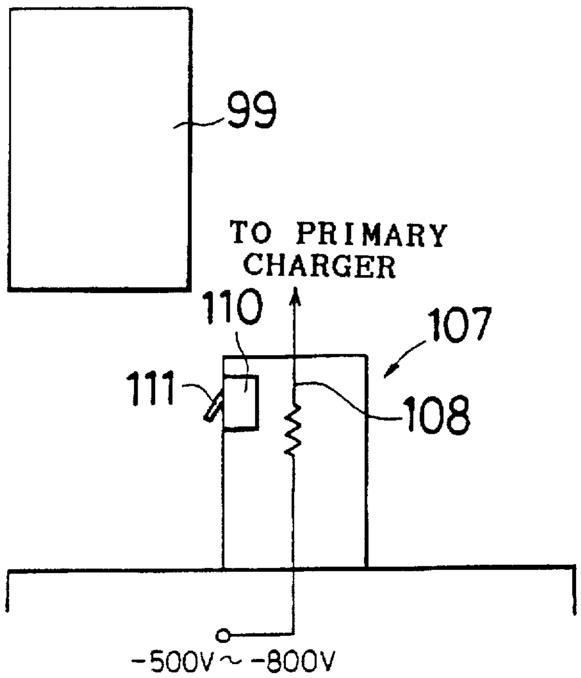
FIG. 6 is a diagram showing a power feeder member 107 and the neighborhood thereof.

FIG. 4 is a plan view showing the LED printer 21, FIG. 5 is a perspective view of the LED printer 21 as taken from the left side in FIG. 3, and FIG. 6 is a front view showing a configuration for detecting a waste toner box 99.

The waste toner box 99 for collecting the waste toner discharged from the process cartridge 73 mounted in the holding member 66 is replaceably mounted at the rear end of the holding member 66 in the page of FIG. 3, i.e., at the upper end in FIG. 4. At the ends along the width of the lower housing 22, on the other hand, formed are support members 105, 106 respectively so as to be protruded outward along the width. On the support member 105 in the side where the waste toner box 99 is mounted, arranged is a prismatic power feed member 107 protruding upward. The power feed member 107 is hollow, into which a connection terminal in the shape of spring-plate (not shown) protruded downward from the process cartridge 73 is inserted inside to assure conduction. Inside the power feed member 107, arranged is a first power feeder 108 in the shape of coil spring for supplying discharge power to the charger 81 in the process cartridge 73 by contacting the connection terminal of the process cartridge 73. The power feed member 107 includes a waste toner detection switch (hereinafter referred to as "the detection switch") 110 comprising a microswitch, for instance, in a position directed toward the waste toner box 99.

More specifically, when the upper housing 23 is closed to the lower housing 22 causing the waste toner box 99 to decline downward in FIGS. 3 and 5, the waste toner box 99 presses an actuator 111 of the detection switch 110. The output of the detection switch under this condition is read thereby to detect that the waste toner box 99 is mounted on the holding member 66. Also, as shown in FIG. 3, at the end along the width of the upper housing 23, arranged is a pressure member 227 protruding from the page to this side, which releases/presses the cover switch 217 at the time of opening/closing the upper housing 23. The output of this cover switch 217 is used to detect the open/close state of the upper housing 23.

A prismatic power feed member 224 is also erected on the upstream side of the power feed member 107 in the transport direction A1 on the support member 105. The upper end of the power feed member 224 is formed to extend inside along the width and then downstream along the transport direction A1. A power feeder 225 is arranged in the crankshaped upper end of the power feed member 224. At the forward end of the power feeder 225, a connection terminal (not shown) disposed at the lower end of the process cartridge 73 can make a conductive contact when the upper housing 23 is closed as described above. The other end of the connection terminal is connected with the developing roller 76 mounted in the process cartridge 73 for applying a developing bias voltage to the developing roller 76.

Figure 7:
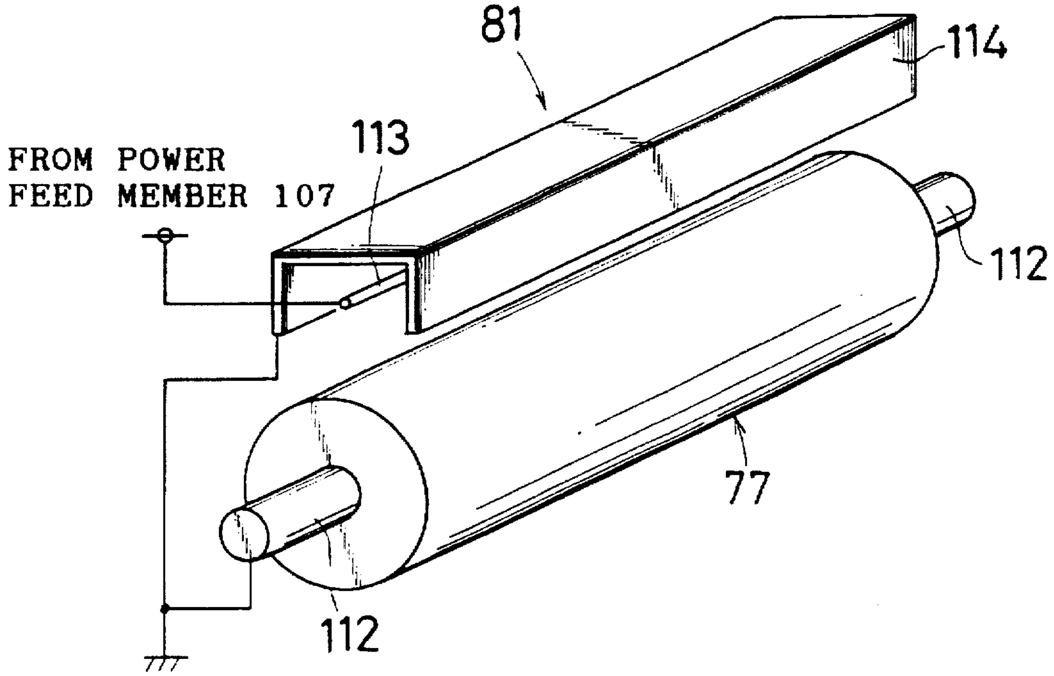
FIG. 7 is a perspective view showing the relationship between a charger 81 and a photosensitive drum 77.

FIG. 7 is a system diagram showing the photosensitive drum 77 and the charger 81. According to this embodiment, the shaft 112 of the photosensitive drum 77 is connected to the earth potential. The discharge wire 113 of the charger 81, on the other hand, is supplied with a voltage of −500 V to −800 V, for instance, from the power feed member 107. The shield case 114 of the charger 81 is connected to the earth potential together with the shaft 112.

Figure 8:
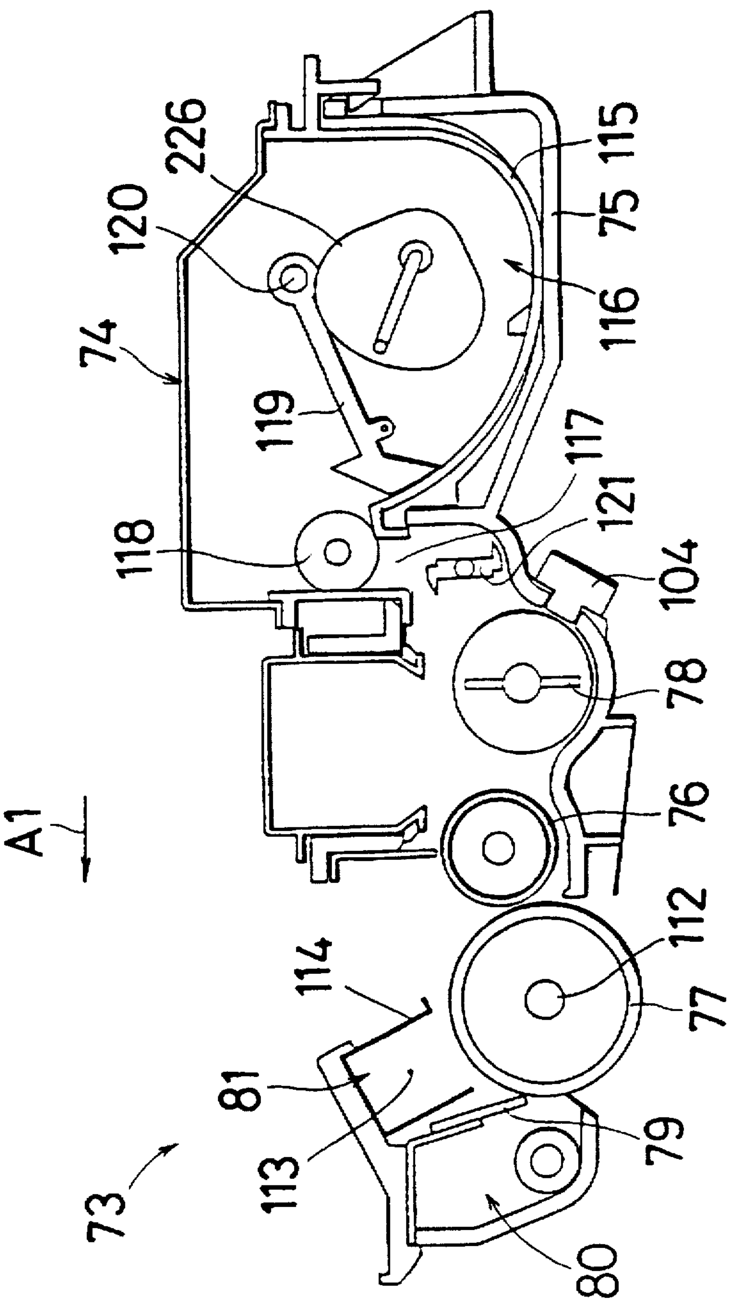
FIG. 8 is a sectional view showing a process cartridge 73.

FIG. 8 is a sectional view of the process cartridge 73. The process cartridge 73 accommodates the toner box 74 in the housing 75 noted above. The housing 115 of the toner box 74 is convex-shaped downward to fit the shape of the housing 75 of the process cartridge 73. The housing 115 has a toner container 116 open upward, which has on the downstream side along the transport direction A1 a toner refill hole 117 directed downward. A toner refill roller 118 made of a porous material such as sponge is arranged with an axial line perpendicular to the transport direction A1 at the closing position of the toner refill hole 117. The toner container 116, on the other hand, includes a toner moving member 119 for moving the toner in the toner container 116 to the toner refill roller 118 by a swinging motion driven under the peripheral pressure of a cam 226 by the rotation thereof. The toner moving member 119 is driven and angularly displaced reciprocally around the axis 120.

Under the toner refill roller 118 of the process cartridge 73, arranged is a sub-agitator 121 for moving the toner from the toner refill roller 118 to the developing roller 76. The toner moved by the sub-agitator 121 is further moved toward the developing roller 76 by an agitator 78. At the same time, the toner is mixed with the carrier accommodated near the developing roller 76 in the housing 75 of the process cartridge 73 and thus supplied to the developing roller 76 as a developer.

(2) Electrical Configuration of LED Printer

The electrical configuration of the LED printer 21 having the above-mentioned fundamental structure is shown in FIG. 1. The LED printer 21 comprises: a controller 122 defined by two-dot chain in FIG. 1; the LED head 82 connected with the controller 122 and supplied with a printing data DT, a clock signal CK1, a latch signal LT and a plurality of strobe signals STB; the charger 81 for charging the surface of the photosensitive drum 77; the transfer discharger 100; the fixing unit 46; an electromagnetic plunger 125 for activating/deactivating the transport roller 86 of the manual feed device 83 in accordance with the output of the sensor 87; a motor 126 for supplying the rotational force to each driving mechanism (the resist roller 38, the photosensitive drum 77, the pressure roller 48, etc.); and an electromagnetic unit 124 for switching a clutch unit for transferring or cutting off the rotational force from the motor 126 to the paper feed roller 30.

The controller 122 is connected with the sensors 33, 39, 51, 87, the cover switch 217, a cassette switch 218 for detecting whether the paper cassette 29 has been mounted, a toner motor 214 for driving the toner moving member 119 angularly displaceably in reciprocal fashion, a size sensor 213 for discriminating the type of the paper cassette 29, the thermistor 147 of the fixing unit 46, and the detection switch 110.

Figure 9:
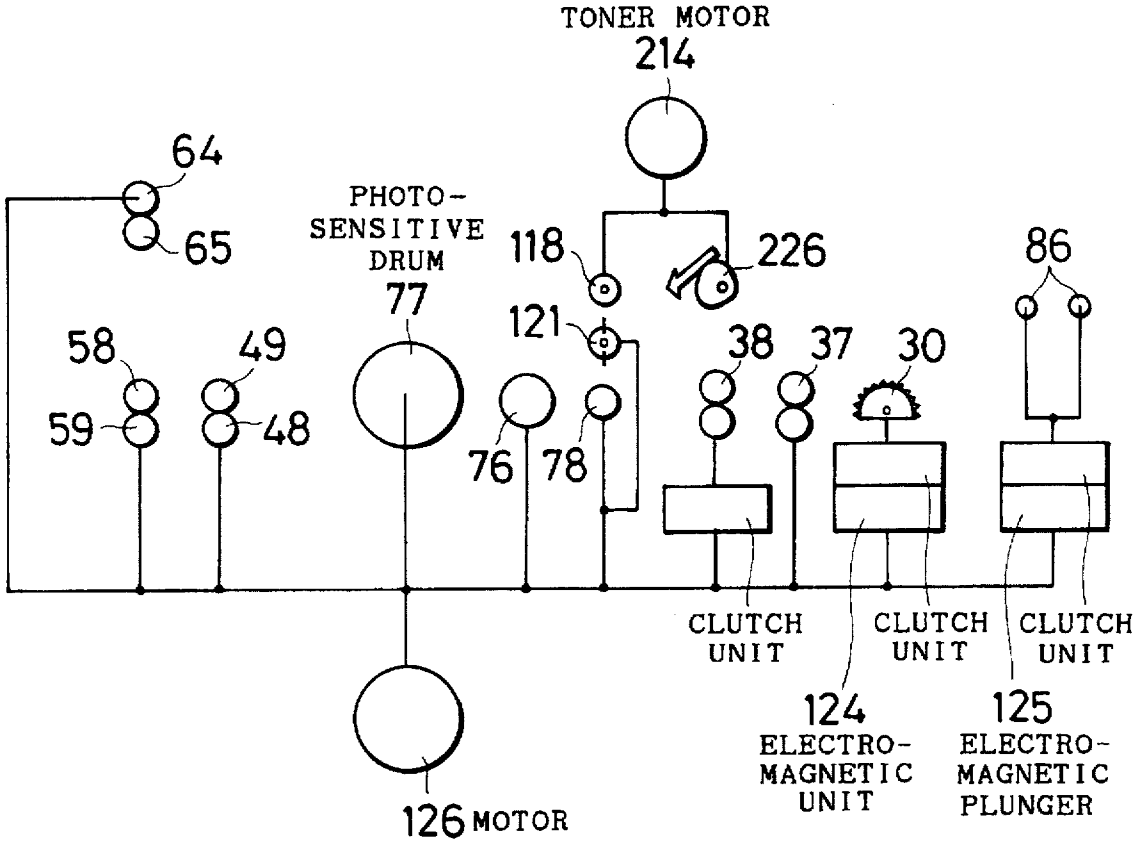
FIG. 9 is a diagram showing a power system for each driving mechanism.

FIG. 9 is a power system diagram of each driving mechanism described above.

The controller 122 of the LED printer 21 is connected with a host computer 127, so that signals required for the operation of the LED printer 21 are supplied from the host computer 127 to the controller 122 by a key input unit 128 connected to the host computer 127. The controller 122 is also connected with a display unit 129 comprising liquid crystal display elements or the like for indicating, for example, the number of sheets of the recording paper staying stagnant inside in case of paper jam which may occur during the printing operation of the LED printer 21. The controller 122 is also connected with a print key 229 for starting the printing operation.

The controller 122 comprises an image controller 130 supplied with a clock signal CK2 from an oscillator 168, and an engine controller 131 supplied with a clock signal CK3 from an oscillator 228 for controlling the operation of each driving mechanism and the light-emitting operation of the LED head 82. The engine controller 131 comprising a timer 132, a first general counter 215 and a second general counter 216 is connected with a ROM (read-only memory) 133 for storing programs for regulating the operation thereof. Various control signals from the engine controller 131 are applied to the LED head 82 and the like through a gate array 134 structured as described later.

Figure 10:
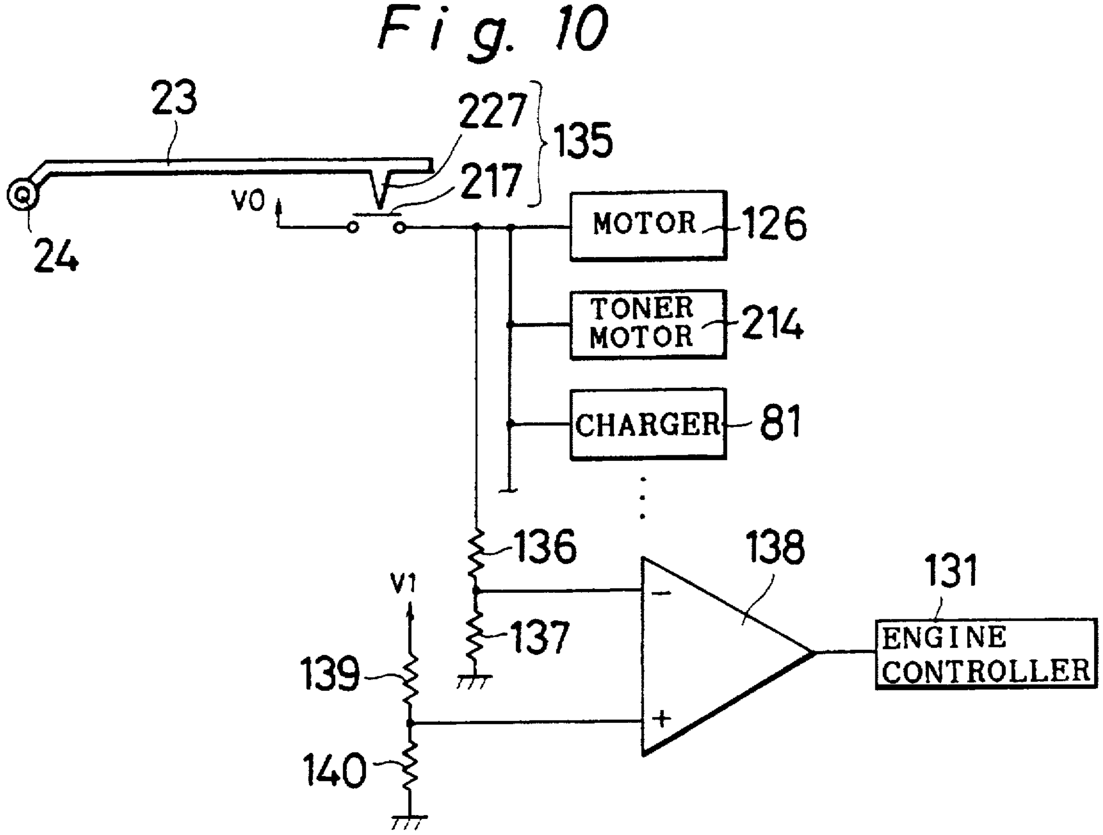
FIG. 10 is a block diagram relating to a cover switch 217.

FIG. 10 is a block diagram showing a configuration for detecting the open/close operation of the upper housing 23. According to the embodiment under consideration, a cover switch 217 is turned on/off in accordance with the open/close state of the upper housing 23. The cover switch 217 turns on/off a source voltage V0 of 24 V, for instance, to be supplied to the motor 126, the charger 81 and the like. An output of the cover switch 217 is applied as a source voltage to the motor 126, etc., while being voltage-divided by resistors 136, 137 and connected to an inverted input terminal of a comparator 138. A non-inverted input terminal of the comparator 138 is supplied with a source voltage V1 (+5 V, for instance) divided by resistors 139, 140 as a reference voltage.

More specifically, the comparator 138 compares the voltage (substantially 0 V, for example) from the cover switch 217 with the upper housing 23 open, with the reference voltage as a set voltage, thereby detecting that the upper housing 23 changes from closed to open state. In this case, as described later, the engine controller 131 saves various data corresponding to the prevailing operating condition and then stops the operation. Also, when the upper housing 23 is opened and the cover switch 217 is turned off, the driving power supply to the motor 126, the charger 81, etc., connected to the source voltage V0 is cut off. In other words, the cover switch 217 has dual functions when the upper housing 23 is opened; cutting off the driving power supply to various electrical elements and to the driving mechanisms such as the motor 126 on the one hand, and sending a detection signal associated with the open state of the upper housing 23 to the engine controller 131 on the other hand.

Figure 11:
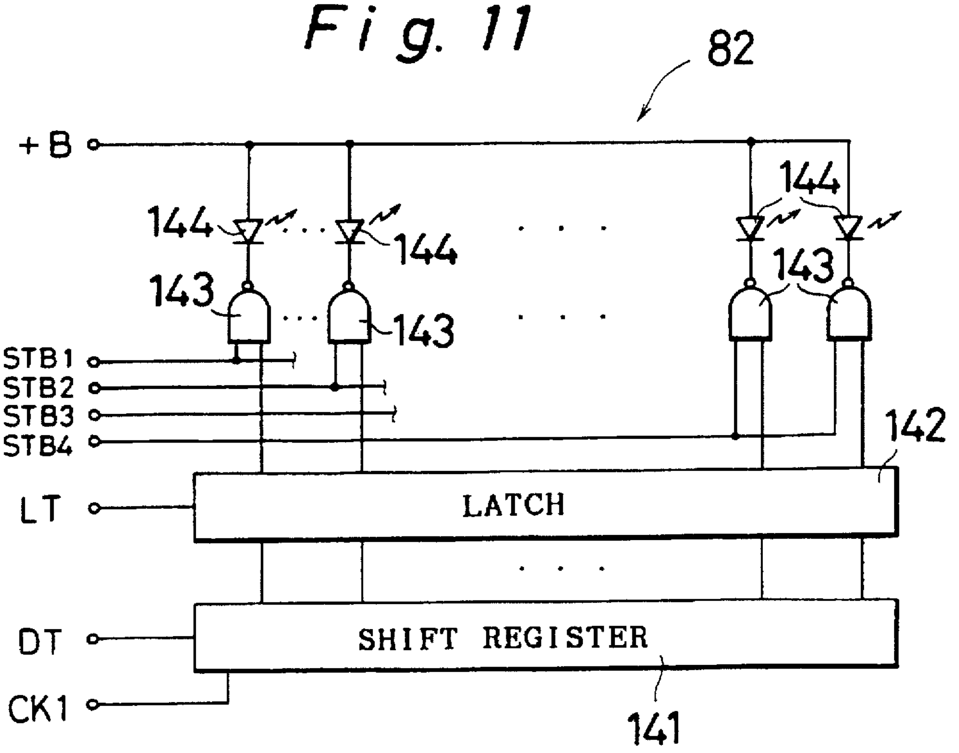
FIG. 11 is a block diagram showing an electrical configuration of an LED head 82.

FIG. 11 is a block diagram showing an electrical configuration of the LED head 82. The LED head 82, as shown in FIG. 1, is supplied with a source voltage +B, strobe signals STB1 to STB4, a latch signal LT, a clock signal CK1 and an image data DT in serial form from the engine controller 131 through the gate array 134 thereby to realize the light-emitting operation corresponding to the image data DT. The image data DT and the clock signal CK1 are applied to a shift register 141 having as many bits as the LED elements 144 in the LED head 82. After complete input of the image data DT comprising the number of bits, the latch signal LT is applied so that the image data DT in the shift register 141 is stored in a latch circuit 142 having the same number of bits as the shift register 141.

A bit-by-bit output of the latch circuit 142 is applied to AND gates 143, which are also supplied with the strobe signals STB1 to STB4. An output terminal of each AND gate 143 is connected with a cathode of the LED 144, an anode of which is connected to the source voltage +B. In this circuit, when the strobe signals STB1 to STB4 go high when a high level is maintained of a trigger signal after produced in the logic level "0" from the latch circuit 142, current flows in a corresponding LED element 144 thereby to emit light.

Figure 12:
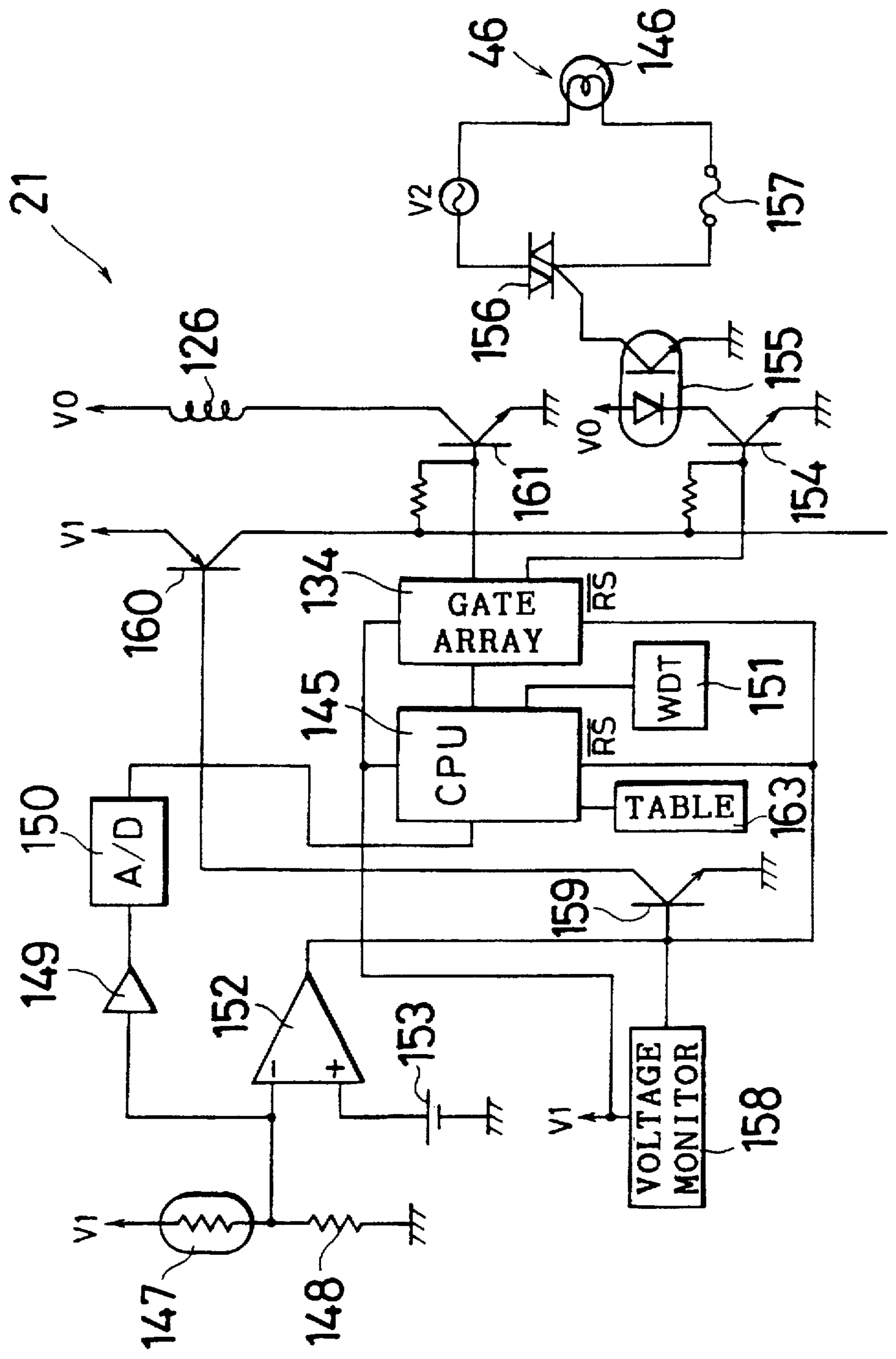
FIG. 12 is a block diagram showing a configuration relating to the temperature control of a fixing unit 46 of the LED printer 21.

FIG. 12 is a block diagram showing a configuration relating to the temperature control of the fixing unit 46. In LED printer 21 according to this embodiment, the temperature control of the fixing unit 46 is carried out by software as described later. In the event of runaway of the CPU (the central processing unit including a microprocessor) 145 in the engine controller 131, however, temperature control of the fixing unit 46 by software becomes impossible, with the result that a heater (halogen lamp) 146 shown in FIG. 12 incorporated in the heating roller 49 of the fixing unit 46 rises up to an extremely high temperature, often causing thermal damage, smoking or a fire. According to the LED printer 21 of this embodiment, therefore, the temperature of the heater 146 is detected by the configuration as shown in FIG. 12, and when an abnormally high temperature is indicated, the CPU 145 is forcibly reset by a circuit operation.

The temperature of the heater 146 is produced as a voltage divided by the thermistor 147 and a resistor 148 supplied with the source voltage V1 (5 V, for example), and through an amplifier 149, to be applied to an analog-to-digital converter 150 where it is converted into a digital data to be fed to the CPU 145.

The divided voltage from the thermistor 147, on the other hand, is applied to the inverted input terminal of the comparator 152, the non-inverted input terminal of which is supplied with a predetermined voltage from a reference voltage generating circuit 153. The reference voltage generated from the reference voltage generating circuit 153 is selected at a voltage level corresponding to the abnormally high temperature of the heater 146.

When the thermistor 147 detects a proper temperature range, the engine controller 131 applies a temperature control signal from the gate array 134 to a transistor 154. This control signal is further applied through a photo coupler 155 to a triac 156 connected in series to a circuit comprising the heater 146 connected to the source voltage V2 (100 V AC, for example). This series circuit includes the thermal fuse 157 mounted on the heating roller 49 of the fixing unit 46.

In the configuration shown in FIG. 12, the runaway of the CPU 145 is detected by a well-known watchdog timer circuit 151. This watchdog timer circuit 151, upon detection of a runaway of the CPU 145, generates a reset signal to stop the activation of the engine controller 131. As described later with reference to FIGS. 69, 70 and 71, however, the watchdog timer circuit 151 may fail to detect the runaway condition of the CPU 145 depending on the nature of the particular runaway.

To alleviate this problem, according to the configuration under consideration, in the case of a runaway of the CPU 145 where the heater 146 is abnormally heated, the driving power supply to the heater 146 is stopped before the thermal fuse 157 burns out by the heat of the heater 146. For this purpose, the output of the comparator 152 is applied to the base of a transistor 159, the output of which is applied to the base of a transistor 160. The source voltage V1 is applied through the transistor 160 as a bias voltage to the base of a transistor 161 functioning as a power switch for the motor 126 and to the base of the transistor 154. Also, the output of the comparator 152 is applied to the CPU 145 and the gate array 134 as a low-active reset signal /RS ("/" indicates a negative logic, as applied similarly in all the following cases).

More specifically, as far as the output of the thermistor 147 falls in a proper temperature range, the comparator 152 produces a high-level signal, so that the transistor 159 is energized, and so is the transistor 160. Then, a high-level bias voltage is applied to the transistors 161, 154, and a control signal from the gate array 134 under the control of the CPU 145 is applied to the transistor 161 or the transistor 154, thus driving the motor 126 or the heater 146.

When the output of the thermistor 147 exceeds an upper limit of 230° C. set by the reference voltage generating circuit 153, the comparator 152 produces a low-level signal, cuts off the transistors 159, 160, and the CPU 145 and the gate array 134 are forcibly reset by the reset signal /RS. Thus, the control signal from the gate array 134 is stopped, thereby turning off the transistors 161, 154 to halt the motor 126 and the driving power supply to the heater 146. The reset signal stops the runaway of the CPU 145, and initializes the gate array 134.

According to the LED printer 21 having the above-mentioned configuration, at the time of runaway of the CPU 145 when the heater 146 is increased to an abnormally high temperature, the CPU 145 and the gate array 134 are reset, while at the same time stopping the activation of the heater 146. As a consequence, even in the case where the heater 146 increases to an abnormally high temperature, the heater 146 stops increasing in temperature before the thermal fuse 157 burns out, thereby preventing thermal damage, smoking or a fire which otherwise might be caused by heat. Also, preventing the burnout of the thermal fuse 157 enables the apparatus to be restarted in a short time.

A designed operation of the CPU 145 and the gate array 134 is realized when the input source voltage V1 is in the proper range within ±1% of the proper operating voltage 5

VDC as an example. In contrast, the CPU 145 fails to be supplied with a proper source voltage during a transient period before the source voltage V1 reaches the proper voltage range at power on or when the source voltage V1 becomes less than the proper voltage range at power off in the LED printer 21. This causes a malfunction of the CPU 145.

In order to prevent the malfunction of the CPU 145 during the transient period of the source voltage described above, according to the embodiment under consideration, an output of the voltage monitor circuit 158 is connected to the output terminal of the comparator circuit 152, thereby performing equivalently to the operation that the transistor 159 is turned on/off by the output of the comparator 152 or a reset signal is applied to the CPU 145 and the gate array 134.

Figures 13, 14:
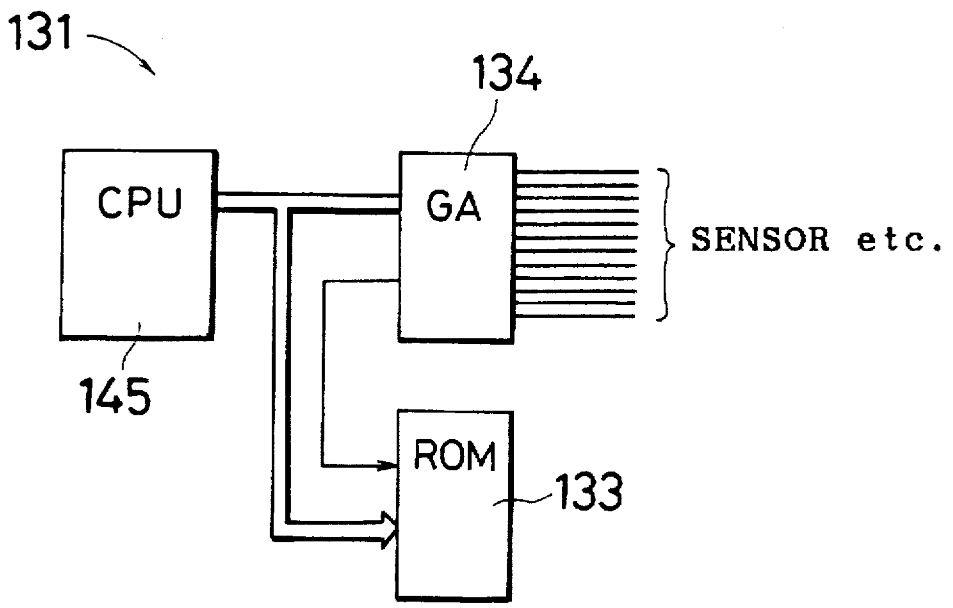
FIG. 13 is a diagram showing the contents stored in a duty table 163.
FIG. 14 is a block diagram showing a configuration relating to an engine controller 131.

FIG. 13 is a diagram showing a part of the contents stored in the ROM 133. As explained above, the temperature of the fixing unit 46 is program controlled by the CPU 145 shown in FIG. 12. The embodiment is characterized in that two operating modes are set to program control the temperature of the heater 146.

The first operating mode is a temperature increase mode to be used when the temperature increases to a predetermined holding temperature at power of the LED printer 21 or when the temperature further increases to a driving temperature for printing operation.

A duty table 163 stored in the ROM 133 is used in the temperature increase mode described above for storing duty data Dd=μ1/50, μ2/50.. . . μn/50 corresponding to the temperature T of 100° C., 110° C., 120° C., . . . 170° C. In the LED printer 21 according to this embodiment, the energization period of the heater 146 is set to one second, for example, and this one-second period is divided into fifty equal portions thereby to set the data μi (i=1, 2, . . . ) to such values as 50, 25, 22, 20, . . . . During the one-second energization period of the embodiment, therefore, the duty is reduced with an increase in the temperature T from 50/50 seconds=100% duty. In other words, the embodiment is intended to assure that the lower the present temperature T, the higher the rate of temperature increase and that the temperature increase is slower with the approach of the temperature T to the driving temperature. In this manner, the fixing unit 46 is prevented from an overheat which might be caused by an overshoot of temperature during the temperature-increasing operation.

The second operation mode is a temperature holding mode. The turning on/off of the triac 156 is controlled in such a manner that the temperature of the heater 146, i.e., the temperature detected by the thermistor 147 is retained at the holding temperature described above.

Figure 15:
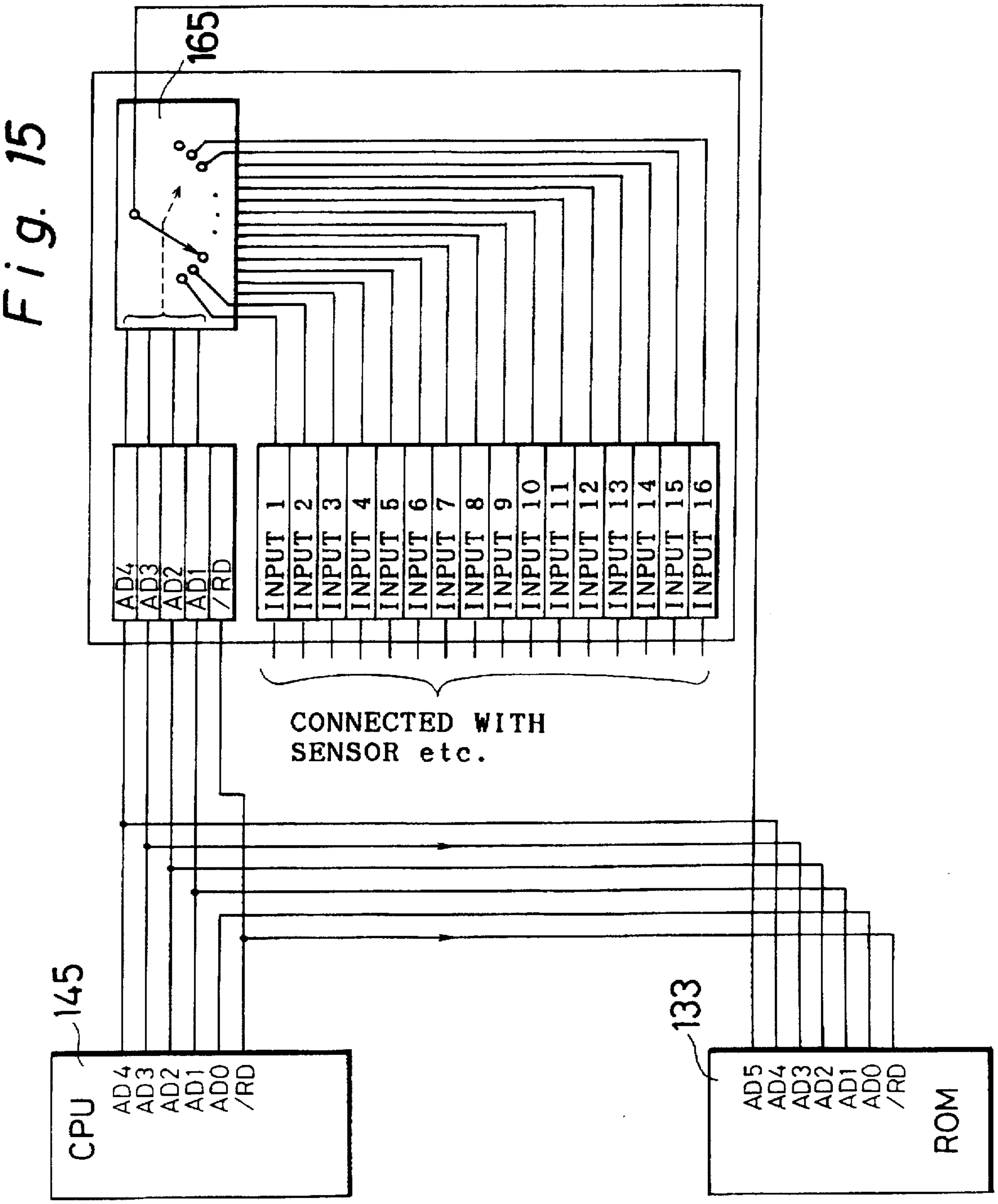
FIG. 15 is a block diagram showing a detailed configuration relating to the engine controller 131.
Figure 16:
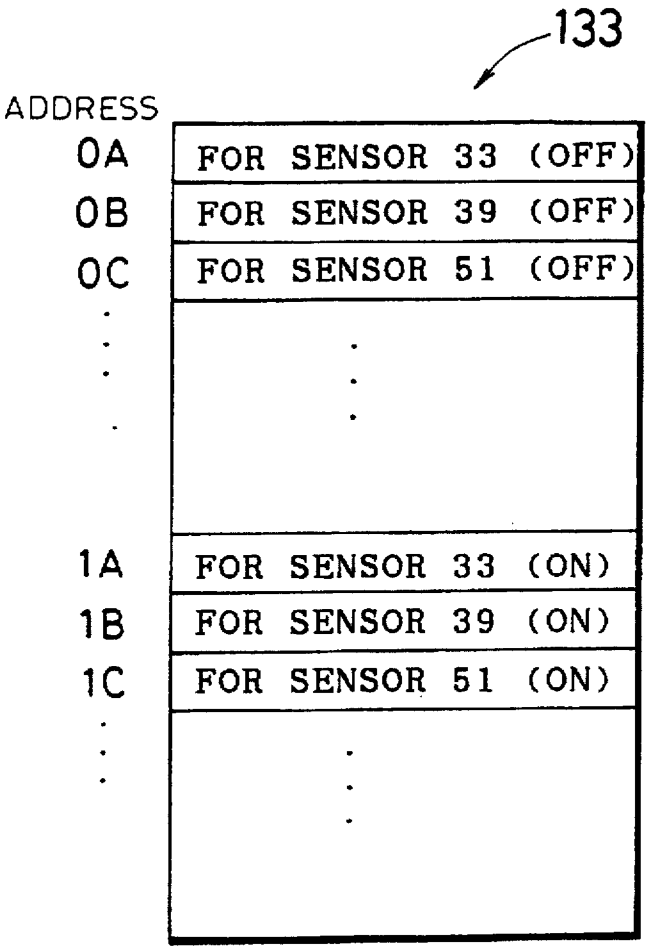
FIG. 16 is a diagram showing the contents stored in a ROM 133.

FIG. 14 is a system diagram showing a configuration relating to the operation of reading signals from the sensors 33, 39 and 51, FIG. 15 is a block diagram showing a specific example of the same configuration, and FIG. 16 is a diagram showing an example of the contents stored in the ROM 133. According to this embodiment, signals from the sensors 33, 39, 51, 87 or from the thermistor 147 are read into the CPU 145 through the gate array 134. A processing routine corresponding to the signal state is read out from the ROM 133 and executed. This embodiment can improve the speed of such an operation.

The ROM 133 stores address data comprising six bits, and the CPU 145 produces residual five-bit address data AD4 to AD0 other than the most significant bit AD5 of the six-bit address data AD5 to AD0. The gate array 134 includes a plurality of input ports 164 supplied with signals from various sensors. A signal from each input port 164 is applied to a data selector 165 for selecting one of them. The selected signal is inputted as the most significant bit AD5 of the address data of the ROM 133.

A signal to be selected is designated by the address data AD4 to AD1 representing the upper four bits of the five-bit address data AD4 to AD0 produced by the CPU 145. In other words, the use of the four-bit address data AD4 to AD1 makes it possible to select one of sixteen signals from the various sensors.

For example, the processing routines corresponding to the off state of the sensor 33 are written into the ROM 133 from the address 0A, and the processing routine corresponding to the off state of the sensor 39 from the address 0B. In similar fashion, the processing routine corresponding to the off state of each sensor is written from a corresponding address. The processing routine corresponding to the on state of the sensor 33, on the other hand, is written from the address 1A. In similar fashion, the processing routines corresponding to the on state of the sensors 39, 51 are written from the addresses 1B, 1C respectively. It is noted that the addresses 0A, 0B, 0C and 1A, 1B, 1C are not symbols in hexadecimal notation but a symbol representing the five-bit address data AD4 to AD0 respectively. The address data AD4 to AD1, four bits of the 6-bit address data AD5 to AD0 in the ROM 133 serve as data for discriminating the sensors 33, 39, 51, . . . . Also, each processing routine is executed one by one with a return instruction added to the last portion of an instruction. According to the embodiment under consideration, each processing routine consists of two bytes.

More specifically, when the CPU 145 produces the five-bit address data AD4 to AD0 corresponding to the addresses A, B, C, the upper four bits AD4 to AD1 are applied to the gate array 134, thereby selecting a corresponding input port 164 by the data selector 165. As an example, the input port 164 which is fed with a signal of the sensor 39 may be selected. In this case, the address data AD4 to AD0, the lower five bits of the six-bit address data AD5 to AD0 in the ROM 133 correspond to the address data AD4 to AD0 produced from the CPU 145 respectively. Further, the most significant bit address data AD5 of the ROM 133 corresponds to a high-level or a low-level signal fed from a corresponding input port 164 through the data selector 165.

Accordingly, where the CPU 145 attempts to read a signal from the sensor 39, either the address 0B or the address 1B shown in FIG. 16 is determined in correspondence with the high or low level signal from the data selector 165. In other words, in the case where the CPU 145 tries to read a signal from the sensor 39, the instruction:

GOTO LOWER FIVE-BIT DATA OF PROCESSING ROUTINE ADDRESS is executed, whereby the processing routine corresponding to the high or low level of the output of the sensor 39 is automatically executed. In this way, the signals from other sensors can be read by sequentially changing the address data AD4 to AD0 produced from the CPU 145 into corresponding contents.

In an example compared with the this embodiment, where the CPU 145 reads an output signal of a sensor or the like from one of the input ports 164 through the gate array 134 to execute a processing routine of the ROM 133 corresponding to the state of the output signal, the CPU 145 has to execute a plurality of instructions:

READ A, PORT

TEST 1, A

GOTO ON, PROCESSING ROUTINE ADDRESS

In such a case, the number of instruction steps required for executing the processing increases, thereby decreasing the data processing speed.

According to the this embodiment, the CPU 145 produces a different address data corresponding to each sensor, and on the basis of this address data, the data selector 165 applies a signal fed from a corresponding sensor to the ROM 133 as a portion of the address data. Therefore, the processing routines based on the output signals of the sensors 33, 39, 51, etc., shown in FIG. 16 are executed individually.

Figure 17:
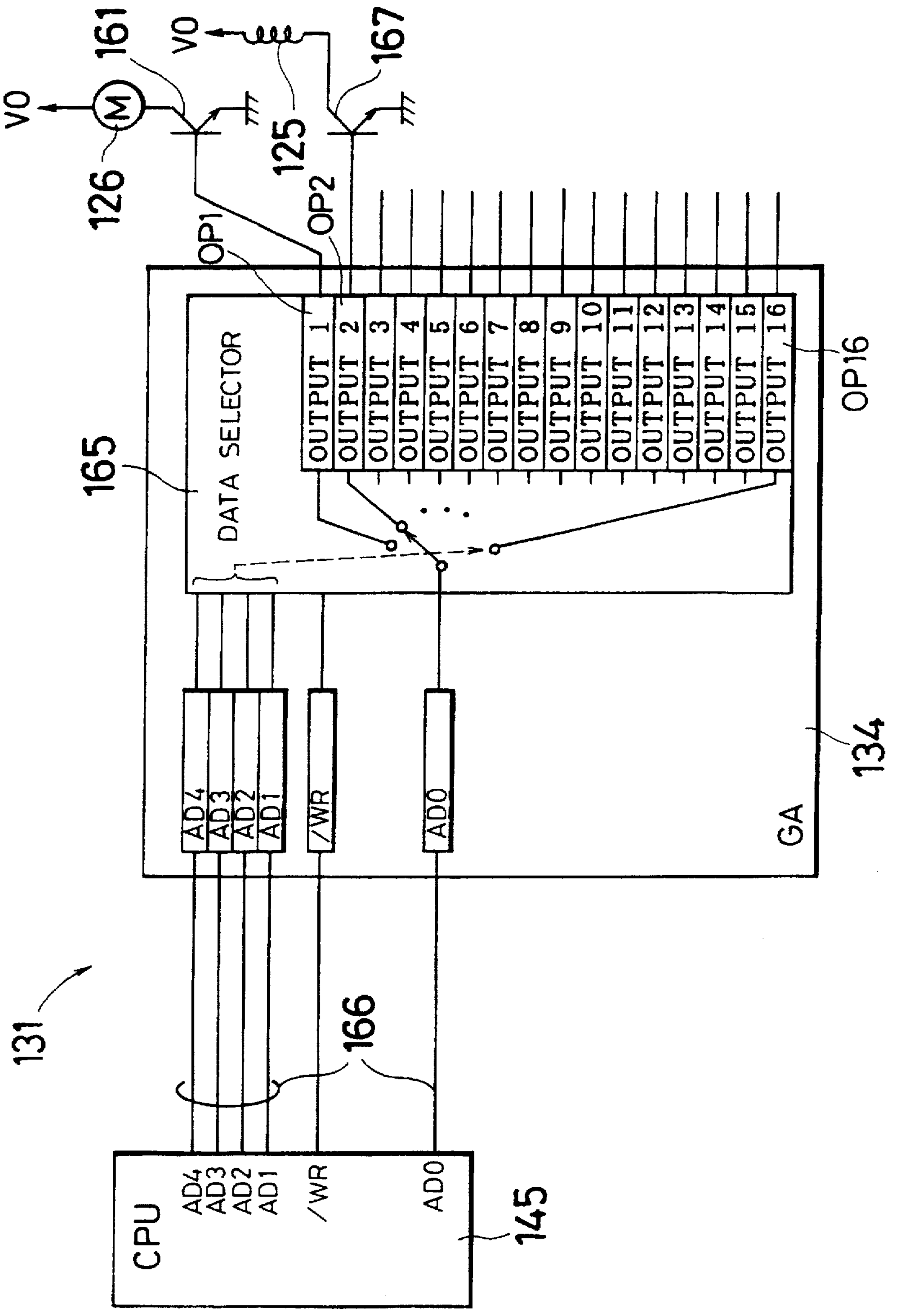
FIG. 17 is a block diagram showing a configuration relating to the output operation of signals to each component element in the engine controller 131.
Figure 18:
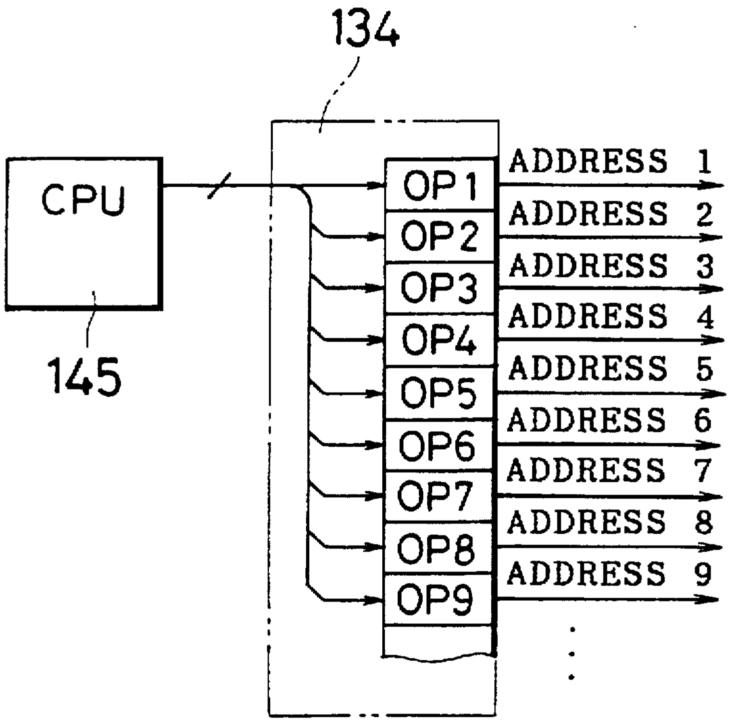
FIG. 18 is a block diagram for explaining the operation in FIG. 17.

FIG. 17 is a system diagram showing a configuration for producing a signal to the electromagnetic plunger 125 or the electromagnetic unit 124 of the LED printer 21. FIG. 18 is a diagram for explaining the write operation. Generally, when a CPU produces a high-level or a low-level signal outside, a single address is set to an output port or output integrated circuit device of an electronic system including the CPU. The CPU designates the particular address and sets a plurality of bits of data on a data bus, so that a plurality of bits of data is set In the output port or output integrated circuit device and each bit of data is thus applied to different destinations including a solenoid or motor switch.

In this case, it is necessary to set a plurality of bits of data with predetermined bits at high or low level in a general register of the CPU. This might undesirably rewrite bits other than intended bits. The CPU is therefore required to separately store the data of the output port or output integrated circuit device before change and to perform AND or OR operation.

In contrast, according to this embodiment, the CPU 145 applies, as an example, five-bit address data AD4 to AD0 through an address bus 166 to the gate array 134. In the gate array 134, the address data AD4 to AD0 are applied to the data selector 165. The upper four bits representing the address data AD4 to AD1 select one of sixteen-bit output ports OP1 to OP16, as an example, in the data selector 165, and the least significant address data AD0 is produced at a selected output port OPi (i=1 to 16). As an example, the output port OP1 is connected to the base of the transistor 161 for turning on/off the motor 126, and the output port OP2 to the base of a transistor 167 for turning on/off the electromagnetic plunger 125. The remaining output ports OPi are connected, for example, with a high voltage generating circuit for applying a high voltage to the charger 81 or the transfer discharger 100 shown in FIG. 1.

More specifically, when the CPU 145 attempts to write a high or low level signal into any one of the output ports OPi, there is no need of setting data on the data bus. As an example, in the case where a given output port OPi is to be set at a low level, assuming that AD0="0", it is sufficient that the following instructions are executed:

WRITE (AD (OPi)+AD0), Da where AD (OPi) is four-bit address data AD4 to AD1 corresponding to the output port OPi, and Da is a given data.

Also, in the case where the output port OPi is to be set at a high level, assuming that AD0="1", it is sufficient that the instruction shown below is executed:

WRITE (AD (OPi)+AD0), Da

As a result, the necessity of processing multistages as described above is eliminated, and therefore the output operation of a control signal to an external circuit by the CPU 145 is remarkably improved in speed and simplified.

Figure 19:
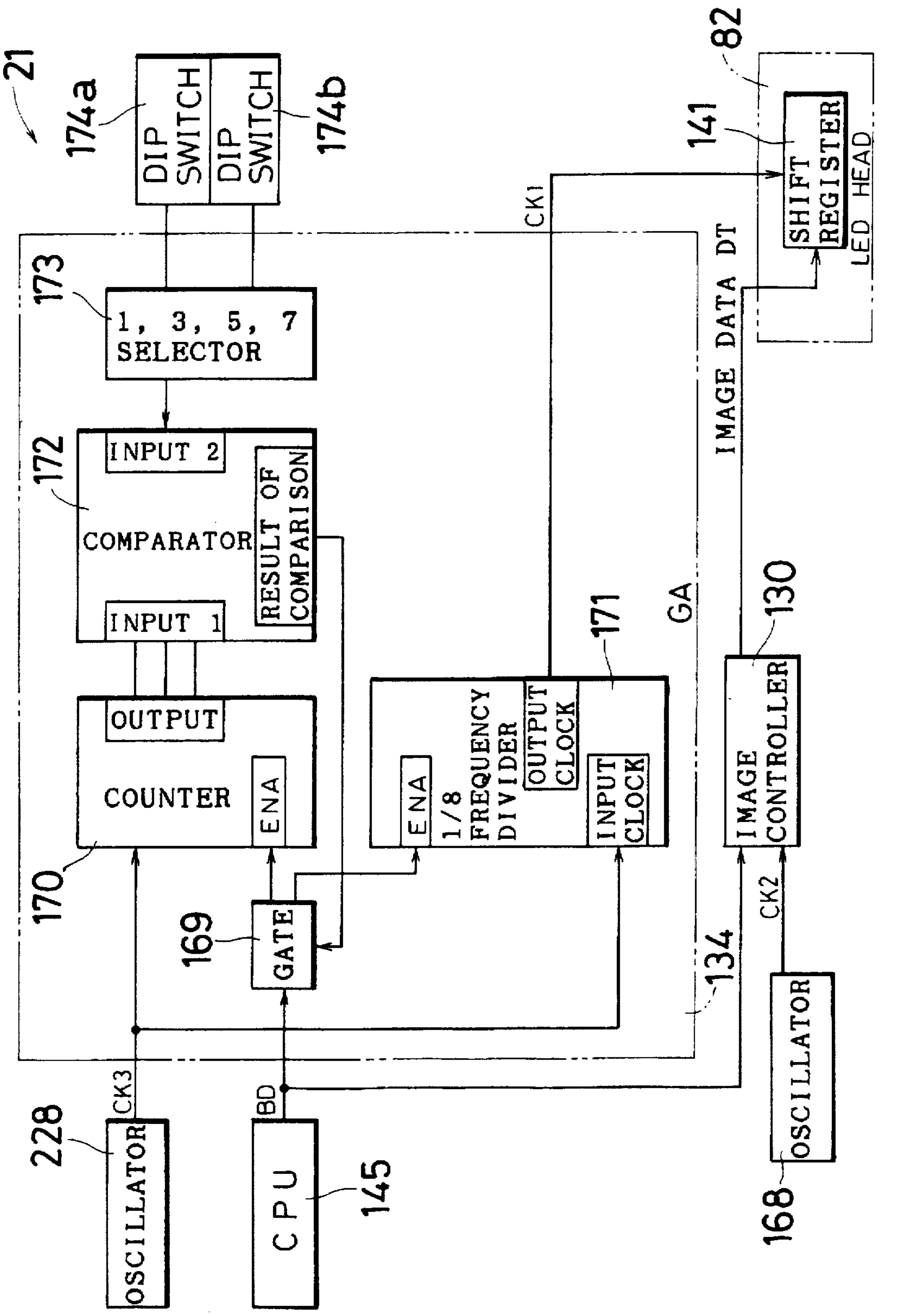
FIG. 19 is a block diagram showing a shift clock regulation mechanism in the LED printer 21.

FIG. 19 is a block diagram showing a configuration for producing an LED clock signal CK1 providing a shift clock signal to the LED head 82 in the LED printer 21. In the LED printer 21 according to this embodiment, the controller 122 for controlling the operation of the LED head 82, as shown in FIG. 1, includes the image controller 130 and engine controller 131. As already described, the image controller 130 is supplied with a clock signal CK2 of an oscillation frequency f1=14.9 MHz from the oscillator circuit 168 including a crystal oscillator or the like. The image controller 130 operates on the basis of this clock signal CK2.

The engine controller 131 according to this embodiment, on the other hand, is operated by a clock signal CK3 applied thereto from the oscillator circuit 228. In this case, the CPU of the image controller 130 produces an image data DT for the output operation of the LED printer 21. This image data is generated and produced independently of the timing of generating the clock signal CK3. As a result, in the case where the clock signal CK3 is divided to prepare the shift clock CK1 for the LED head 82 according to this embodiment, there may be a case in which the shift clock CK1 is not appropriately synchronized with the image data DT produced. The configuration shown in FIG. 19 is intended to adjust a phase of the timing of generation of the shift clock CK1 based on the clock signal CK3 in case the appropriate synchronization fails.

Reference is made to FIG. 19. The clock signal CK3 is applied to a counter 170 as a count clock and to a frequency divider 171 as a clock signal for holding and dividing the frequency of the clock signal CK3. A count value of the counter 170 is applied to one of input terminals of a comparator 172, the other input terminal of which is supplied with numerical data "1", "3", "5" or "7" from a data selector 172. The data selector 173 is supplied with signals from two dip switches 174*a*, 174*b* externally connected to the gate array 134 as an example.

More specifically, setting the dip switches 174*a*, 174*b* to the on or off state independently of each other gives an instruction to select any of the four numerical data described above in the data selector 173. This instruction is applied to the three-bit comparator 172. The comparator 172 compares the count value of the counter 170 with the numerical data set in the data selector 173, and each time when both coincide with each other, applies a control signal to the gate circuit 169 to start the frequency-dividing operation.

Figure 20:
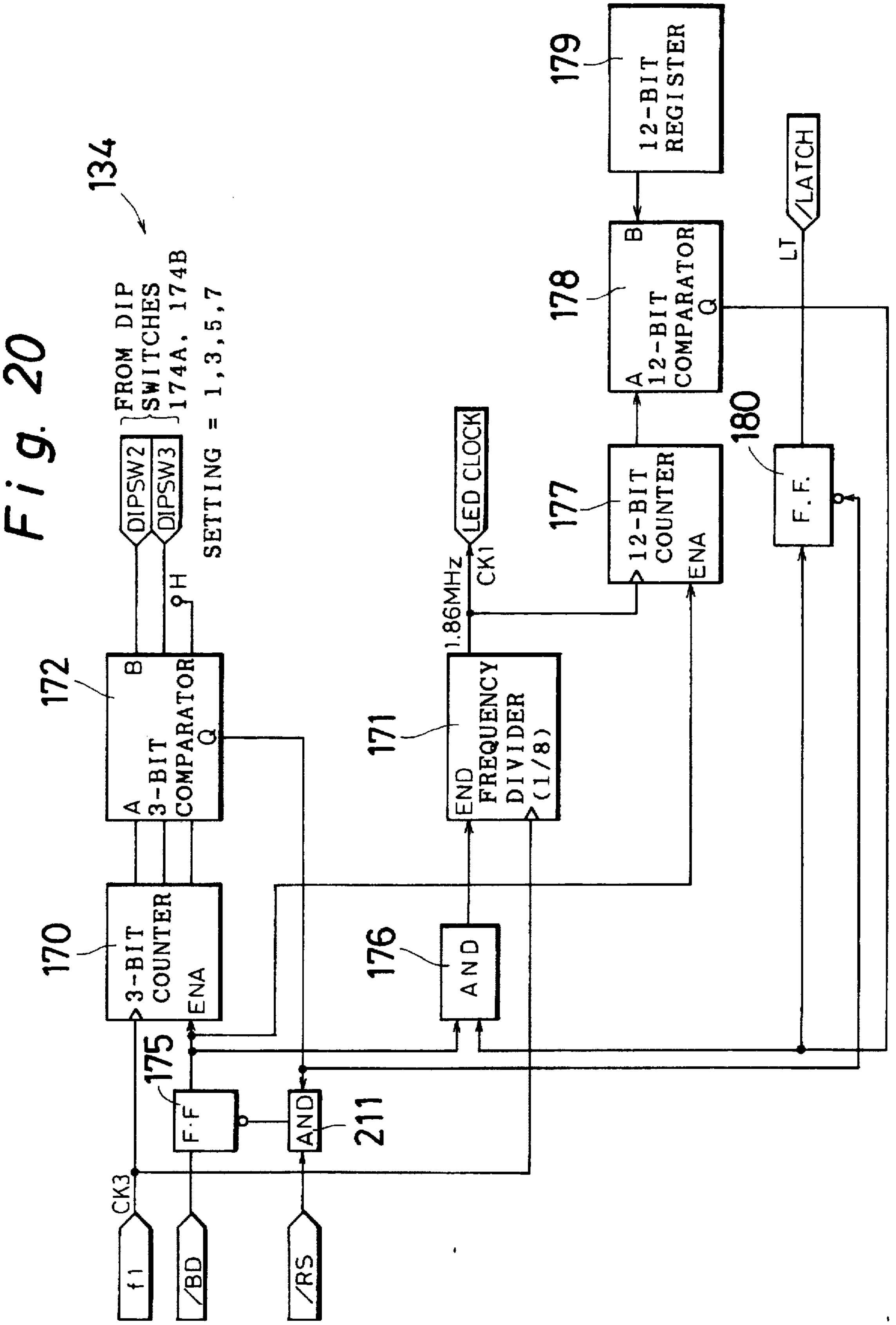
FIG. 20 is a block diagram showing a detailed configuration in FIG. 19.

FIG. 20 is a block diagram showing a specific example of the configuration of FIG. 19. In FIG. 20, the gate circuit 169 shown in FIG. 19 is illustrated in detail. The counter 170 is realized as a three-bit counter, and the comparator 172 as a three-bit comparator with the dip switches 174*a*, 174*b* and a high-level terminal input.

An output of the flip-flop circuit 175 is applied to an enable terminal of the counter 170 to start the counter 170, while at the same time being applied to an AND circuit 176. An output of the AND circuit 176 is applied to an enable terminal of the frequency divider 171. The flip-flop circuit 175, the AND circuit 176 and the AND circuit 211 constitute the gate circuit 169 in FIG. 19. The clock signal CK1 that is an output of the frequency divider 171 is applied to a twelve-bit counter 177, the output of which is applied to one of input terminals of a twelve-bit comparator 178. The other input terminal of the comparator 178 is supplied from a twelve-bit register 179 with data thereof set by the CPU 145. The result of comparison made at the comparator 178 is applied to one input terminal of a flip-flop circuit 180 and to the other input terminal of the AND circuit 176. The other input terminal of the flip-flop circuit 180 is supplied with the result of comparison from the comparator 172, so that the flip-flop circuit 180 produces the latch signal LT explained above with reference to FIG. 11.

The gate array 134 in FIG. 20 is supplied with a reset signal RS, which can reset the counters 170, 177 and the frequency divider 171 through the AND circuit 211.

Figure 21:
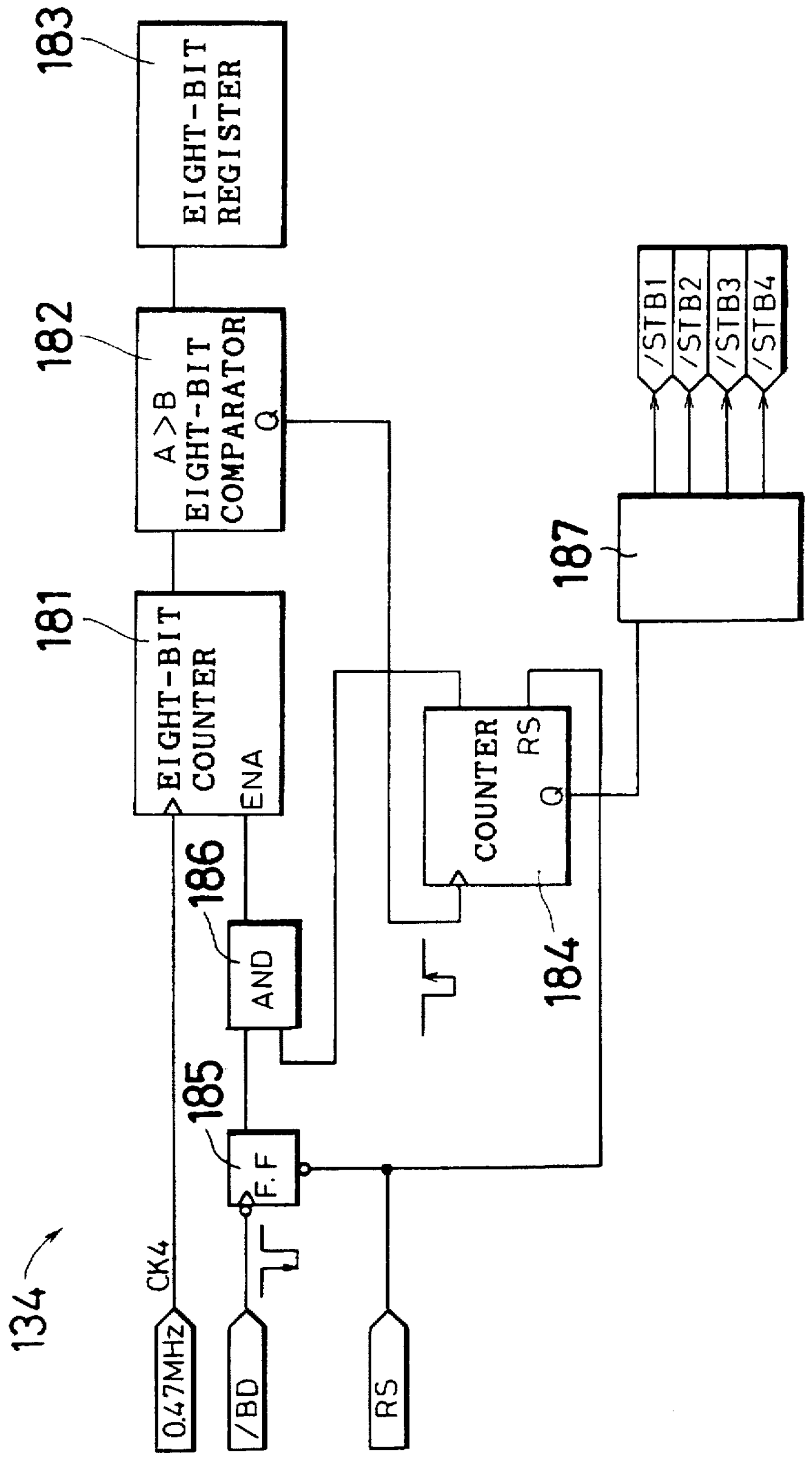
FIG. 21 is a block diagram showing a configuration of a gate array 134.

FIG. 21 is a block diagram showing an example of configuration of the gate array 134 for generating four strobe signals STB1 to STB4 described with reference to FIG. 11. This configuration shows an example in which a 0.47 MHz clock signal CK4 is obtained by frequency-dividing or otherwise processing the clock signal CK3 produced from the oscillation circuit 228. The clock signal CK4 is applied to an eight-bit counter 181. An output of the eight-bit counter 181 is also applied to one of input terminals of an eight-bit comparator 182, the other input terminal of which is supplied with the data from an eight-bit register 183 into which predetermined data is written by the process taken in the CPU 145.

When the coincidence between the count value of the counter 181 and the set data of the register 183 is detected by the comparator 182, the comparator 182 applies a clock signal to an eight-bit counter 184. The gate array 134 is supplied with the horizontal synchronizing signal BD fed from the CPU 145, which synchronizing signal is applied to a flip-flop circuit 185. The flip-flop circuit 185 performs the toggle operation for switching high and low level outputs at the trailing edge of the horizontal synchronizing signal BD.

The output of the flip-flop circuit 185 is applied to one input terminal of an AND circuit 186, the other input terminal of which is supplied with a low-level signal produced from the counter 184 for each clock input. Upon the arrival of each low-level signal, an output of the AND circuit 186 becomes low, the counter 181 is reset and the count value is returned to "0", for example.

The gate array 134 is supplied with a reset signal /RS, which is applied as a reset signal to the flip-flop circuit 185 and the counter 184. This reset signal /RS is generated in synchronization with every input of four clock signals from the comparator 182 in counting operation of the counter 184. The output of the counter 184 is applied to an output switching circuit 187. The strobe signals STB1 to STB4 are thus sequentially generated for each period corresponding to the period of the clock signals from the comparator 182.

According to this configuration, the generation of the strobe signals STB1 to STB4 are staggered by the output switching circuit 187 which is supplied with the signal from the counter 184. Thus the configuration required for preparing strobe signals is simplified greatly as compared with when the strobe signals STB1 to STB4 having different ON times are prepared by separate circuits.

(3) Transition Between Different Operations

Reference will be made as required to FIGS. 1 to 21 in the description that follows.

Figure 22:
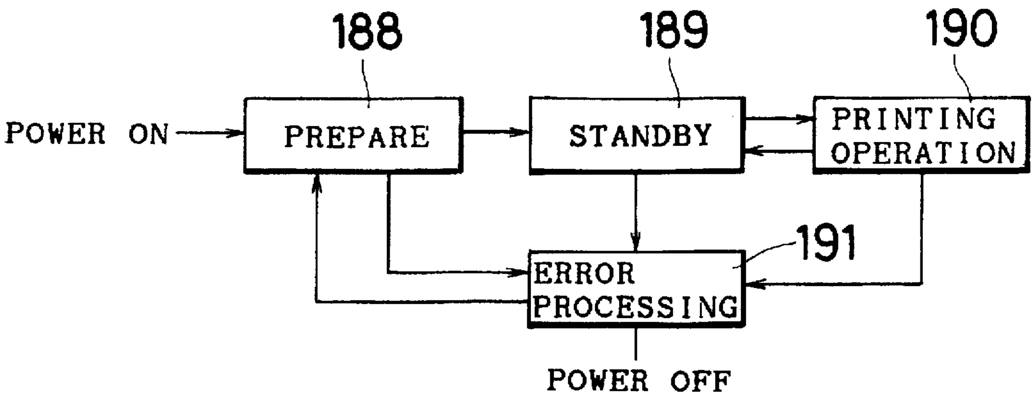
FIG. 22 is a transition diagram for explaining the general operation of the LED printer 21.

FIG. 22 is a transition diagram showing the operation of the LED printer 21 in general from the power on to the completion of the reset operation according to this embodiment. At power on, the LED printer 21 enters a preparatory stage 188 for setting various initial conditions for the image controller 130, the engine controller 131 and the gate array 134. The various initialization processes described later are completed, and the fixing unit 46 shown in FIG. 2 increases to a predetermined standby temperature at the preparatory stage 188. Upon confirmation that the toner concentration in the vicinity of the developing roller 76 in the process cartridge 73 is in a proper range and that the process cartridge 73 is mounted rightly, the LED printer 21 is shifted into a standby stage 189.

In the standby stage 189, the LED printer 21 is ready for printing operation waiting for a printing start signal PRNT from the image controller 130 shown in FIG. 1. Upon arrival of the printing start signal PRNT, the LED printer 21 is shifted into a printing operation stage 190. Upon completion of printing, the standby stage 189 is restored. In the event that an open condition of the upper housing 23 shown in FIG. 2, a paper jam or a fault of the fixing unit 46 occurs in the preparatory stage 188, the standby stage 189 or the printing operation stage 190 described above, the LED printer 21 enters an error processing stage 191 from any of the stages 188 to 190. In the error processing stage 191, after the fault or paper jam is eliminated or the upper housing 23 is closed, the LED printer 21 returns to the preparatory stage 188.

Figure 23:
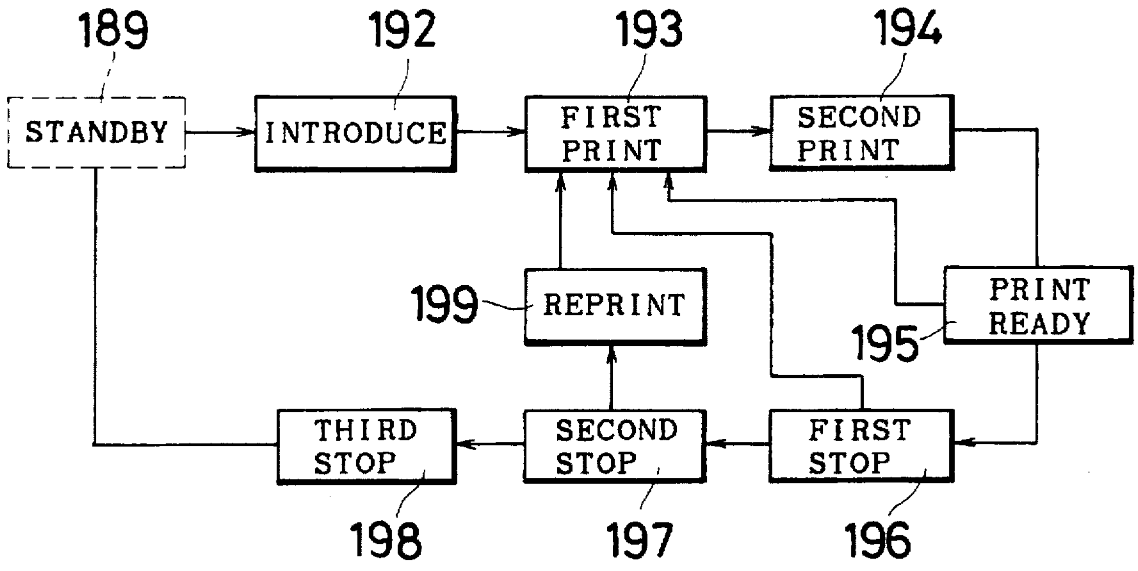
FIG. 23 is a transition diagram for explaining the printing operation of the LED printer 21.

FIG. 23 is a transition diagram showing the printing operation stage 190 in detail. Upon arrival of the printing start signal PRNT from the image controller 130 in the standby stage 189, the operation of the engine controller 131 transfers to an introductory stage 192, where the fixing unit 46 increases to an operating temperature higher than the standby temperature and the motor 126 shown in FIG. 1 for activating the photosensitive drum 77 and the rollers is started and the charger 81 is supplied with power. When the temperature of the fixing unit 46 reaches the operating temperature, the LED printer 21 enters a first printing stage 193. In the first printing stage, the recording paper is taken out from the paper cassette 29 by the paper feed roller 30 or from the manual feed device 83 by rotating the transport roller 86. With the recording paper entrapped and the forward end thereof stopped as it is brought into contact with the resist roller, the control signal VSRQ shown in FIG. 1 is applied to the image controller 130, thereby requesting a page synchronizing signal VSY providing a synchronizing signal for one-page image data.

Upon application of the page synchronizing signal VSY to the engine controller 131 from a image controller 130, the operation stage proceeds to a second printing stage 194, where the recording paper which has remained stationary starts to be transported by the resist roller. The toner image is thus transferred from the photosensitive drum 77 shown in FIG. 2 to the recording paper by the use of the transfer discharger 100. After a lapse of a predetermined length of time in this stage and the recording paper is ready to be fed for printing the next page, the LED printer 21 enters a print standby stage 195. After the printing operation is completed and the transfer discharger 100 stops operating in the print standby stage 195, the LED printer 21 enters a first stop stage 196, where the transferred recording paper is fixed in the fixing unit 46 and discharged outside by the use of the paper discharge rollers 58, 59; 64, 65.

Upon complete discharge of the recording paper in the first stop stage 196, the LED printer 21 enters a second stop stage 197, where the driving power supply to the charger 81 is stopped, and then enters a third stop stage 198, where the motor 126 and the toner motor 214 shown in FIG. 1 are stopped, and the temperature of the fixing unit 46 decreases from the operating temperature to the standby temperature lower than the operating temperature. After the motor 126 stops, the operation of the LED printer 21 returns to the standby stage 189.

When the printing start signal PRNT is applied from the image controller 130 in the print standby stage 195 or the first stop stage 196, the process proceeds to the first printing stage 193 for performing the above-mentioned processes. With the arrival of the printing start signal PRNT from the image controller 130 in the second stop stage 197, the process proceeds to a print restart stage 199. The driving power is supplied again to the charger 81 and the first printing stage 193 is restored to resume the printing operation.

In the LED printer 21 according to this embodiment, four varieties of printing modes are set. In the first printing mode, the printing operation is finished when one sheet of recording paper is printed. The process proceeds to the introductory stage 192, the first printing operation stage 193, the second printing operation stage 194, the print standby stage 195, the first stop stage 196, the second stop stage 197 and the third stop stage 198, and then returns to the standby stage 189.

In the second printing mode, the printing operation is not finished when one sheet of recording paper is printed. The process returns to the first printing operation stage 193 through the print restart stage 199 after the second stop stage 197. This printing mode has the lowest printing speed among the continuous operation modes for printing a plurality of sheets of recording paper continuously.

In the third printing mode, the process transfers to the first printing operation stage 193 after the first stop stage 196. This continuous printing mode is faster than the second printing mode.

The fourth printing mode is the fastest one in printing speed, in which the process is passed to the first printing operation stage 193 immediately after the print standby stage 195.

Figure 24:
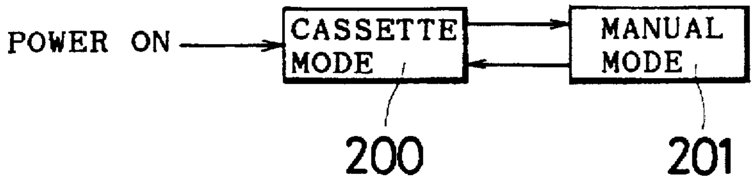
FIG. 24 is a transition diagram for explaining the feed mode of the recording paper in the LED printer 21.

FIG. 24 is a transition diagram for explaining the operation for selecting a paper feed condition of the LED printer 21. When power is supplied to the LED printer 21, the image controller 130 and the engine controller 131 are first set to a cassette mode 200 using the paper cassette 29. Under this operating condition, the sensor 87 in the manual feed device 83 detects the presence or absence of the recording paper loaded in the manual feed device 83. In the case where the recording paper is loaded, the image controller 130 transmits an instruction to the engine controller 131, and a manual feed mode 201 is selected. In the manual feed mode 201, where the sensor 87 detects the absence of the recording paper in the manual feed device 83, the image controller 130 gives an instruction to the engine controller 131 to use the paper cassette 29, whereby the operating condition of the LED printer 21 returns to the cassette mode 200.

FIG. 25 is a transition diagram for explaining the toner-refilling operation in the LED printer 21. When power is thrown in the LED printer 21, the operation is started from the state in which toner is deemed to be full in the process cartridge 73 shown in FIG. 2. In such a toner full stage 202, upon detection of a drop in toner concentration by the toner sensor 104, the process proceeds to a toner refill stage 203. In the toner refill stage 203, the toner supply roller 118 shown in FIG. 2 rotates intermittently to move the toner from the toner box 74 to the agitator 78. In this case, the developing roller 76 and the photosensitive drum 77 are rotated in accordance with the prevailing operating condition, so that the toner in the process cartridge 73 is progressively consumed.

Even after a lapse of a predetermined time length under the toner refill stage 203, in the case where the toner concentration in the process cartridge 73 detected by the toner sensor 104 is low, the process proceeds to the toner supply stage 204, thereby stopping another paper feed operation. Under this stage, the toner supply roller 118 rotates to move toner from the toner box 74 to the agitator 78. In the event that the toner concentration detected by the toner sensor 104 is still insufficient even after a lapse of a predetermined time, the engine controller 131, regarding that the toner has run out in the toner box 74 or the toner box 74 is not installed in the process cartridge 73, passes the process to a toner out stage 205 and makes an indication that the toner has run out.

When the toner concentration detected by the toner sensor 104 is in a proper range under the toner refill stage 203 or toner supply stage 204, the process is returned to the toner full stage 202. More specifically, in the LED printer 21 according to this embodiment, toner is refilled into the agitator 78 from the toner box 74 by rotating the toner supply roller 118 with the photosensitive drum 77 and the developing roller 76 in rotation. When the shortage of toner is still detected even after these refill operations, another paper feed operation is suspended so that toner is supplied as mentioned above.

Thus, this embodiment is designed to take each remedial action corresponding to three conditions, 1) a slow reduction in amount of toner in the process cartridge 73 due to printing pages having large white portions, 2) a rapid reduction in toner amount in the process cartridge 73 due to continuously printing substantial black pages, and 3) emergency conditions such as the installation failure of the toner box 74 or the toner shortage in the toner box 74. Accordingly, proper action can be taken against a toner shortage in the process cartridge 73 thereby to improve the utility of the LED printer 21 remarkably.

FIG. 26 is a transition diagram for controlling the fixing unit 46. When power is thrown in the LED printer 21, the LED printer 21 activates the fixing unit 46 in a temperature increase mode 206. In other words, the temperature of the fixing unit 46 starts to be increased toward the standby temperature by the use of the duty table 163 explained with reference to FIG. 13 above. In the temperature increase mode 206, in the case where the temperature measured by the thermistor 147 of the fixing unit 46 shown in FIG. 12 exceeds a predetermined reference temperature lower than the standby temperature, the process is passed to a threshold mode 207. The threshold mode 207, which will be described in detail later, is an operating condition in which the temperature of the fixing unit 46 is controlled either at the standby temperature or the operating temperature. In the threshold mode 207, when the temperature of the fixing unit 46 is decreased below a second reference temperature still lower than the first reference temperature which is lower than the standby temperature or the operating temperature by a predetermined degrees, the process is passed to the temperature increase mode 206 for increasing the temperature.

In the event that the power for the LED printer 21 is cut off or the upper housing 23 shown in FIG. 2 is opened under the operating condition of the temperature increase mode 206 or the threshold mode 207, the driving power supply to the fixing unit 46 is suspended. In such a case as well as when an error is detected in the control of the fixing unit 46, the LED printer 21 enters the stop mode 208. When the energization of the fixing unit 46 is restarted in the stop mode 208, the process proceeds to the temperature increase mode 206 or the threshold mode 207 on the basis of the temperature measured by the thermistor 147, thereby controlling the temperature of the fixing unit 46.

FIG. 27 is a transition diagram showing the error processing operation of the LED printer 21. In the case where the temperature increase of the fixing unit 46 is excessive or impossible or where a locked condition of the exhaust fan motor 45 is detected, the process transfers to a full stop stage 209 as shown in FIG. 27(1). Under the full stop stage 209, the motor 126 shown in FIG. 1 is stopped and the driving power supply to the charger 81 is cut off, thereby deactivating all the driving mechanisms of the LED printer 21. Nevertheless, some information are saved and stored in memory. Such information include the required number of sheets to be printed and the number of sheets already printed at the time of error detection and the various printing conditions such as the printing density or information associated with the particular error.

Under this condition, an endless loop 210 is configured, waiting for a repair work by servicemen.

When an open state of the upper housing 23 shown in FIG. 2 is detected at power on, the process is passed to the full stop stage 209 as shown in FIG. 27(2). In the case where the upper housing 23 is closed under the full stop stage 209, the process is passed to the preparatory stage 188 explained with reference to FIG. 21, then to the standby stage 189 under the conditions described above. Also, if a paper jam occurs during the operation of the LED printer 21, the process is passed to the full stop stage 209, then to a jam release waiting stage 211, waiting for jam elimination. After the jam is eliminated and the upper housing 23 is closed, the above-mentioned preparatory stage 188 and then the standby stage 189 is restored.

(4) Description of Process Sequence of Operating (4a) General Operation

The operational procedures for realizing the transient stages explained with reference to FIGS. 22 to 27 above will be described below with reference to flowcharts and timing charts.

Figure 28:
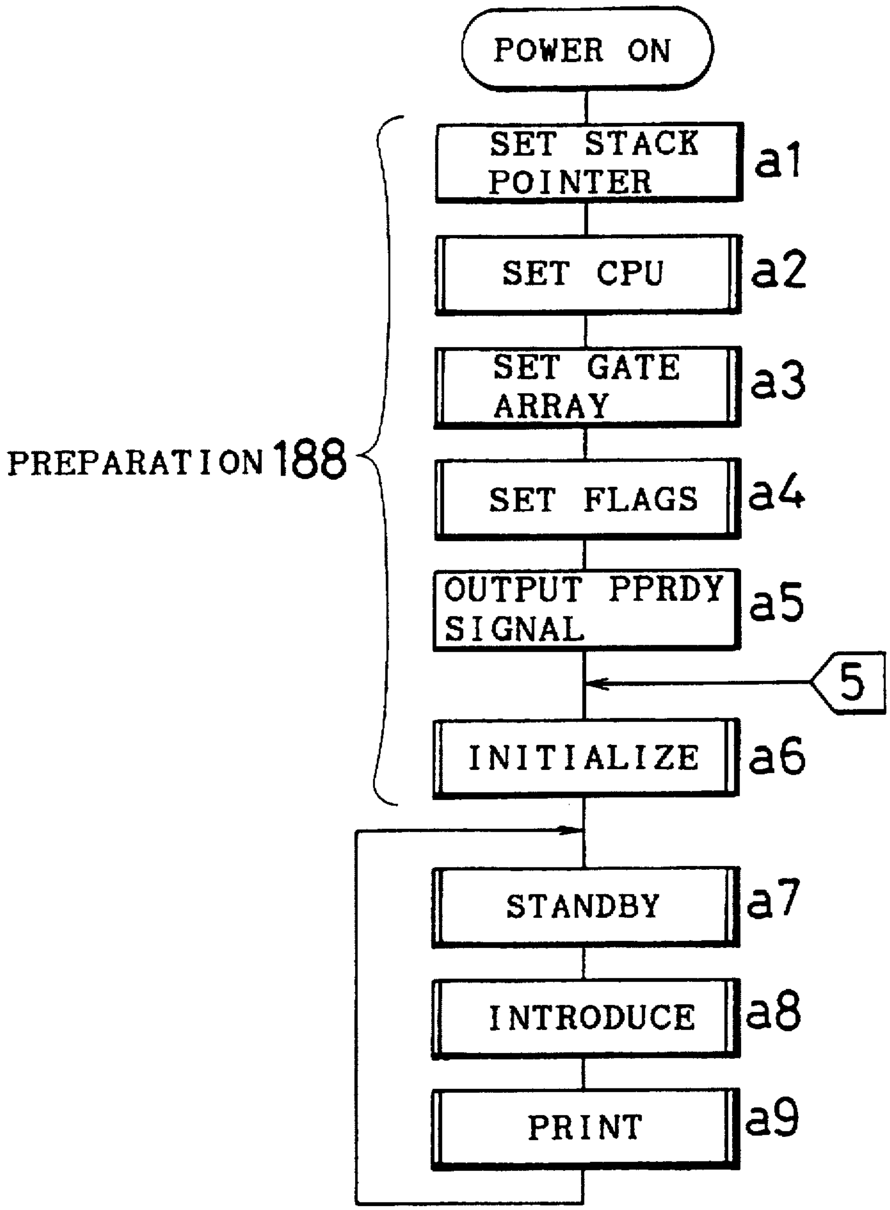
FIG. 28 is a flowchart for explaining the general operation of the LED printer 21.
Figure 29:
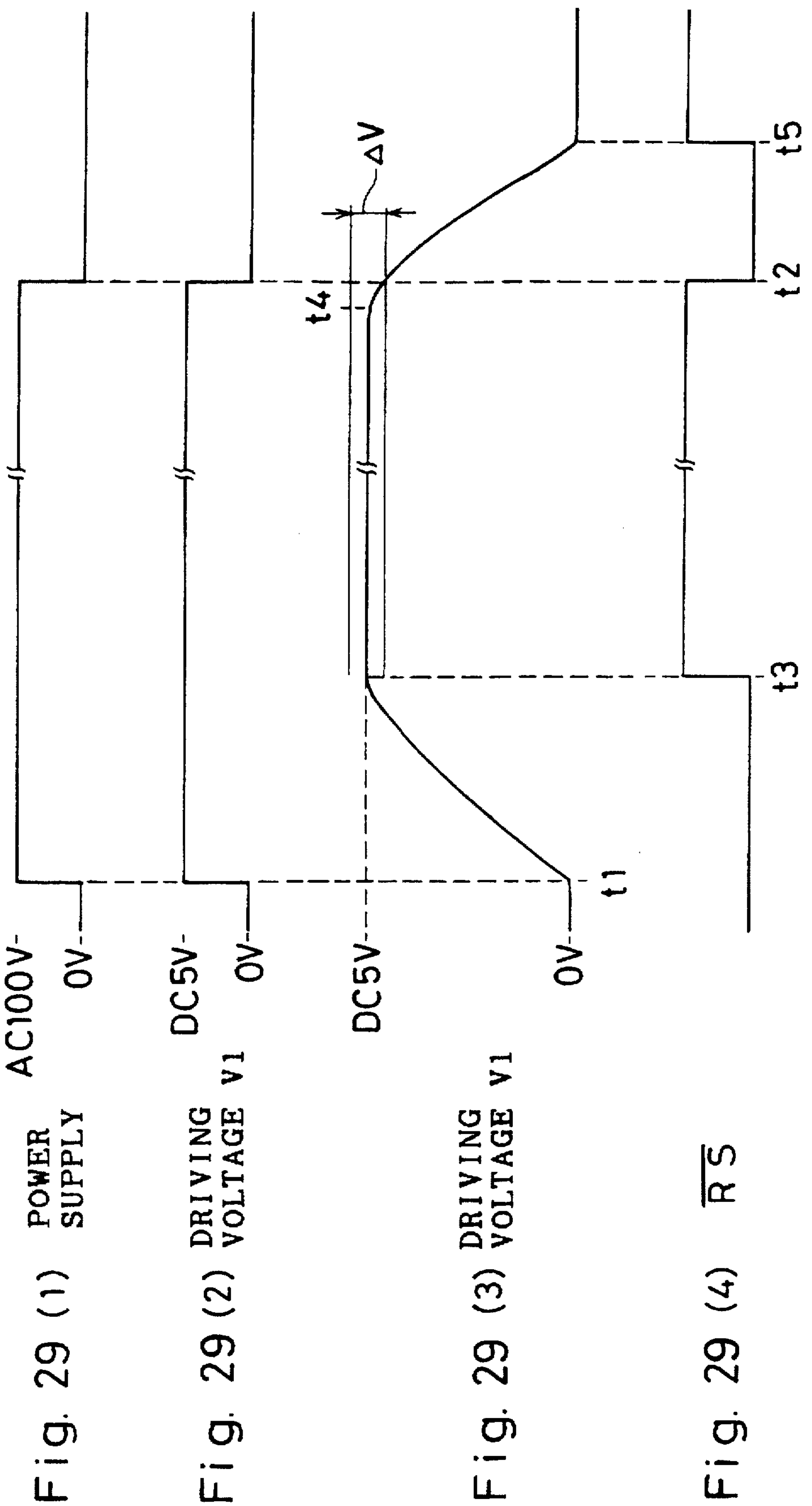

FIG. 28 is a flowchart showing the overall operation from power-on to the execution of the printing operation in the LED printer 21. FIG. 29 is a timing chart for explaining the operation relating to the power-on. When the power is turned on in the LED printer 21, a stack pointer of the engine controller 131 is initialized, and step a2 initializes the CPU of the engine controller 131 as described later. Step a3 initializes the gate array 134 as described later. Step a4 sets various flags of the engine controller 131 as described later. Step a5 causes the engine controller 131 to produce an initialization completion signal PPRDY upon completion of the steps a2 to a4, thereby indicating that the communication with the image controller 132 is available. Step a6 executes an initialization operation as described later. The processing of steps a1 to a6 are executed under the preparatory stage 188 shown in FIG. 22.

Step a7 executes a standby processing described later, and step a8 executes an introductory processing described later. The processes of steps a7 and a8 are executed under the standby stage 189 and the introductory stage 192 shown in FIG. 22. Then step a9 executes a printing operation. The steps a7 to a9 are executed repeatedly until the power for the LED printer 21 is cut off.

(4b) Circuit Protection Under Transient Conditions

In the power-on operation as mentioned above, the power is turned on at the time t1 as shown in FIG. 29(1), so that a source voltage of 100 VAC is applied to the LED printer 21, for example. At the same time, as shown in FIG. 12, the CPU 145 and the gate array 134 are supplied with a circuit driving voltage V1 (5 VDC, for instance). Also, when the power supply is cut off at the time t2, the driving voltage V1 is cut off. The change in the driving voltage V1 in FIG. 29(2) is shown in detail in FIG. 29(3). More specifically, even though the power switch is turned on at the time t1, the driving voltage V1 actually increases in ramp form and at the time t3 enters a voltage range ΔY in which the CPU 145, etc. are operable. The voltage range ΔV is selected at about 5 V±5%, for example. When the power supply is cut off at the time t4, the driving voltage V1 decreases below the voltage range ΔV at the time t2 somewhat delayed behind the time t4, and steadily decreasing in ramp form to 0 V at the time t5.

In the LED printer 21 according to this embodiment, the voltage monitor circuit 158 shown in FIG. 12 monitors the variations in the driving voltage V1, and produces a reset signal /RS when the driving voltage V1 is out of the voltage range ΔV, while releasing the reset signal /RS when the driving voltage V1 is in the voltage range ΔV. This reset signal /RS is applied as a low-active signal. As a result, the CPU 145 and the gate array 134 shown in FIG. 12 are reset, the transistor 159 is turned off, and the heater 146 of the fixing unit 46 and the motor 126 are deenergized. More specifically, in the case where the driving voltage V1 is out of the voltage range for properly activating integrated circuit elements such as the CPU 145, these elements are reset to prevent a erroneous operation.

(4c) Synchronizing

As explained above with reference to FIGS. 1 and 19, the clock signal CK3 for regulating the operation of the engine controller 131 is supplied from the oscillator circuit 228 connected to the engine controller 131. The engine controller 131 applies the horizontal synchronizing signal BD to the image controller 130. The image controller 130, upon receipt of the horizontal synchronizing signal BD, applies a line of image data DT to the engine controller 131. The engine controller 131, on the other hand, applies the horizontal synchronizing signal BD and the clock signal CK3 to the gate array 134. The gate array 134, featuring the configuration and the operation explained above with reference to FIGS. 19 and 20, applies to the LED head 82 the shift clock signal CK1 obtained by frequency-dividing the clock signal CK3 by a factor of eight, as well as the image data DT, the latch signal LT and the strobe signals STB.

Figure 30:
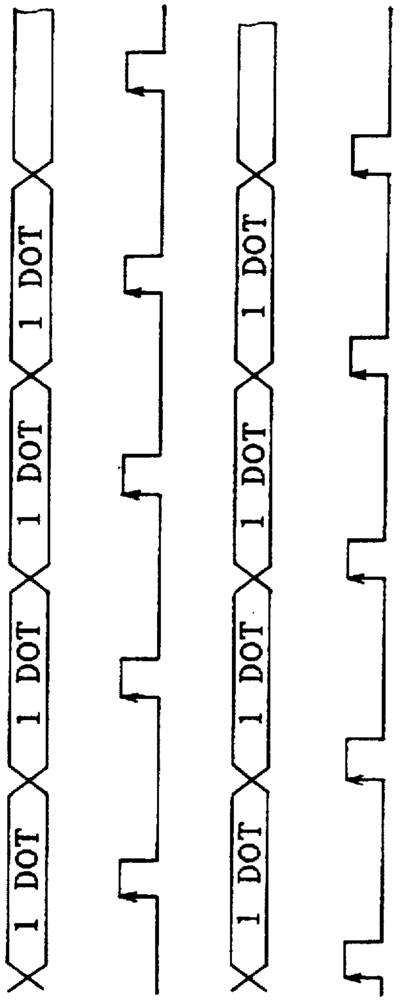
FIG. 30 is a timing chart for explaining the synchronization adjustment of the shift clock.

In the LED printer 21 according to this embodiment, the image data DT is prepared not by the engine controller 131 but by the image controller 130. When the engine controller 131 applies the image data DT from the image controller 130 to the LED head 82 through the gate array 134, proper data is stored in the shift register 141 of the LED head 82 shown in FIG. 11 as far as the leading edge of the shift clock CK1 generated in the gate array 134 occurs when data for each bit is definite as shown in FIG. 30(1). As shown in FIG. 30(2), to the contrary, in the case where the image data DT is not settled in a logic level "0" or "1" and the shift clock signal CK1 is generated during such transient time, the image data DATA is stored in the shift register 141 in an unstable logic condition, thereby sometimes causing a printing error.

According to the this embodiment, in order to alleviate this problem, as described with reference to FIG. 19, one of the numerical data "1", "3", "5" and "7" is selected by the data selector 173 using two dip switches **174*a*, 174*b*. In this case, the counter 170 shown in FIGS. 19 and 20 is supplied with the clock signal CK3. The counter 170 is reset when the horizontal synchronizing signal BD is at low level. When the horizontal synchronizing signal BD rises to high level, the flip-flop circuit 175 produces a high-level signal to the counter 170**, which becomes thus operable.

As a result, the counter 170 performs the counting operation in response to the clock signal CK3, and the comparator 172 compares the count value with one of the numerical data "1", "3", "5" and "17" set in the data selector 173. Upon coincidence with the numerical data, the comparator 172 produces a low-level signal to reset the flip-flop circuit 175 and halt the counter 170. At the same time, the flip-flop 180 is supplied with a low-level signal.

The comparator 178 compares the twelve-bit counter 177 for counting the shift clock signal CK1 of 1.86 MHz from the frequency divider 171 with data that are set by CPU 145 in the register 179 where the number of bits of the shift register 141 is stored. When the two data coincide with each other, the flip-flop circuit 180 and the AND circuit 176 are supplied with a low-level signal, with the result that the frequency divider 171 is reset.

When the output of the comparator 178 is at high level, the AND circuit 176 is in the on state, and the frequency divider 171 is set operable by a high-level output of the flip-flop circuit 175. The frequency divider 171 is capable of producing any of the shift clock signals CK1 of 1.86 MHz each having a shifted start timing of dividing operation by two clocks to each other as shown in FIGS. 31(3) to (6) in response to the numerical data set by the data selector 173 shown in FIG. 19.

Figure 31:
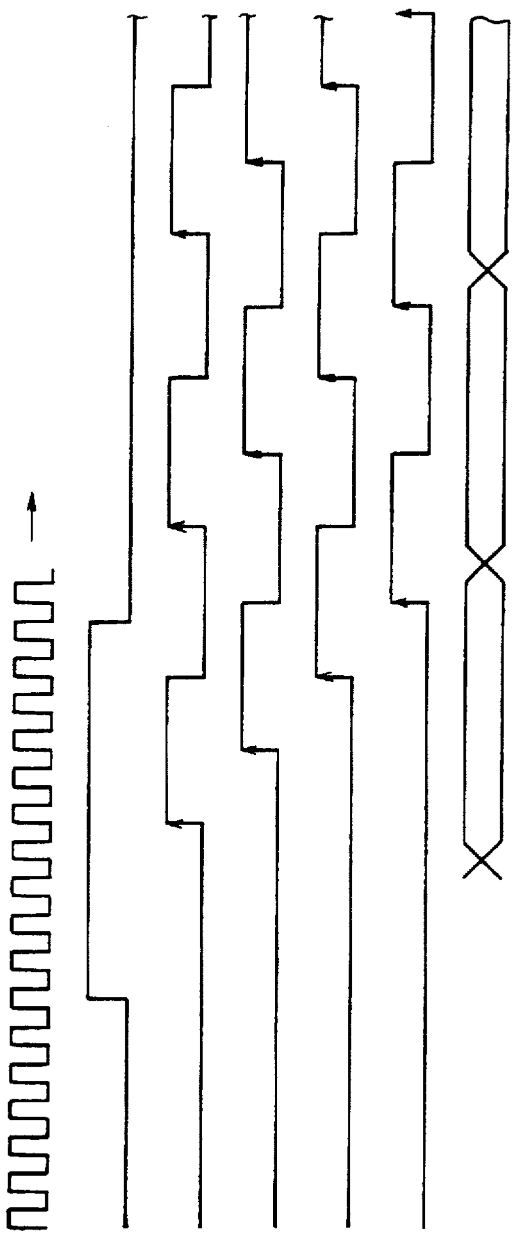
FIG. 31 is a timing chart for explaining the synchronization adjustment in detail.

More specifically, the shift clock signal CK1 of either FIG. 31(4) or FIG. 31(5), for instance, is preferably selected for the image data DT supplied from the image controller 130 to the engine controller 131, as shown in FIG. 31(7). In general, in an electronic circuit receiving a signal and generating another signal to be synchronized with the given input signal, the generated signal may be not synchronous with the input signal, causing an out-of phase condition. This is effectively eliminated according to the invention.

(4d) Simplification of strobe signal generating mechanism

Figure 32:
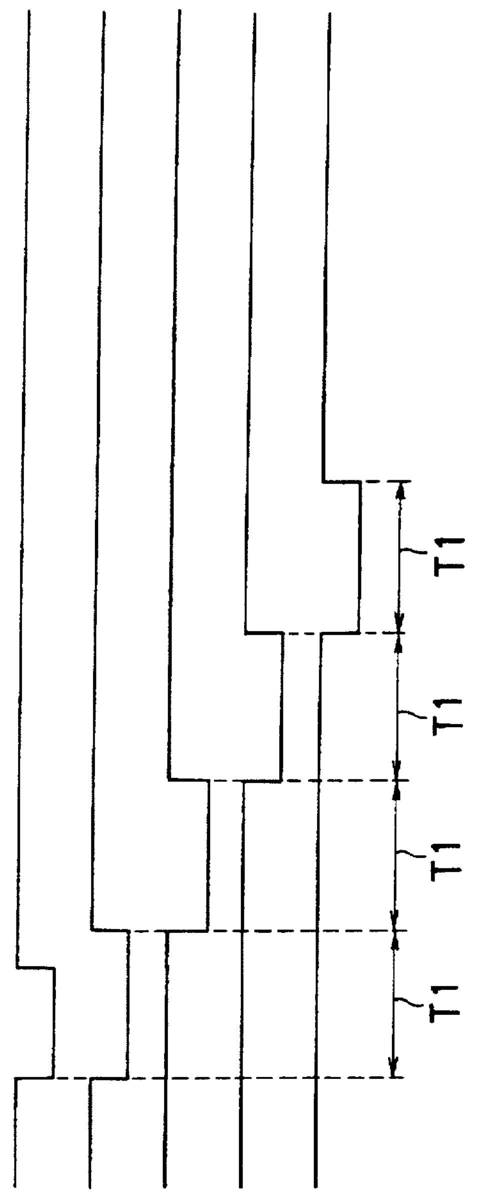
FIG. 32 is a timing chart for explaining a mechanism for generating a strobe signal according to an embodiment.

FIG. 32 is a timing chart showing the operation of the gate array 134 having the configuration as shown in FIG. 21. The gate array 134 is supplied with a 0.47 MHz clock signal CK4, the horizontal synchronizing signal BD and the reset signal /RS. With the fall of the low-active horizontal synchronizing signal BD to low level as shown in FIG. 32(1), the output of the flip-flop circuit 185 in FIG. 21 rises to high level thereby to turn on the AND circuit 186. When the output of the counter 184 to the AND circuit 186 is at high level, the counter 181 is activated and performs the counting operation in response to the clock signal CK4.

The count value of the counter 181 is determined by the number of clocks (four clocks, for example) of the clock signal CK4 predetermined in the register 183 corresponding to the input period T1 of the strobe signals STB1 to STB4 shown in FIGS. 32(2) to (5). Specifically, when the counter 181 begins to count, the output of the comparator 182 becomes low in level, and the counter 184 applies a high-level signal to the AND circuit 186 and the output switching circuit 187. The AND circuit 186 thus maintains a conductive state, and the output switching circuit 187 produces a high-level signal.

The output switching circuit 187 successively generates the strobe signals STB1 to STB4 in sequence as shown in FIGS. 32(2) to (5) until the output of the counter 184 is set by the output of the comparator 182.

In this way, after a lapse of the full time length covering all the strobe signals STB1 to STB4, the reset signal RS is applied, so that the counter 184 and the output switching circuit 187 are reset by a low-level reset signal, thereby resetting the flip-flop circuit 185. This completes the operation for generating the strobe signals STB1 to STB4.

In this case, where a single signal is prepared for the four strobe signals STB1 to STB4, the four strobe signals are derived from the single signal by giving a progressive delay to the signal. Thus it becomes unnecessary to provide a separate signal source for each of the strobe signals STB1 to STB4, thereby simplifying the configuration.

(4e) Detailed preparatory operation

Figure 33:
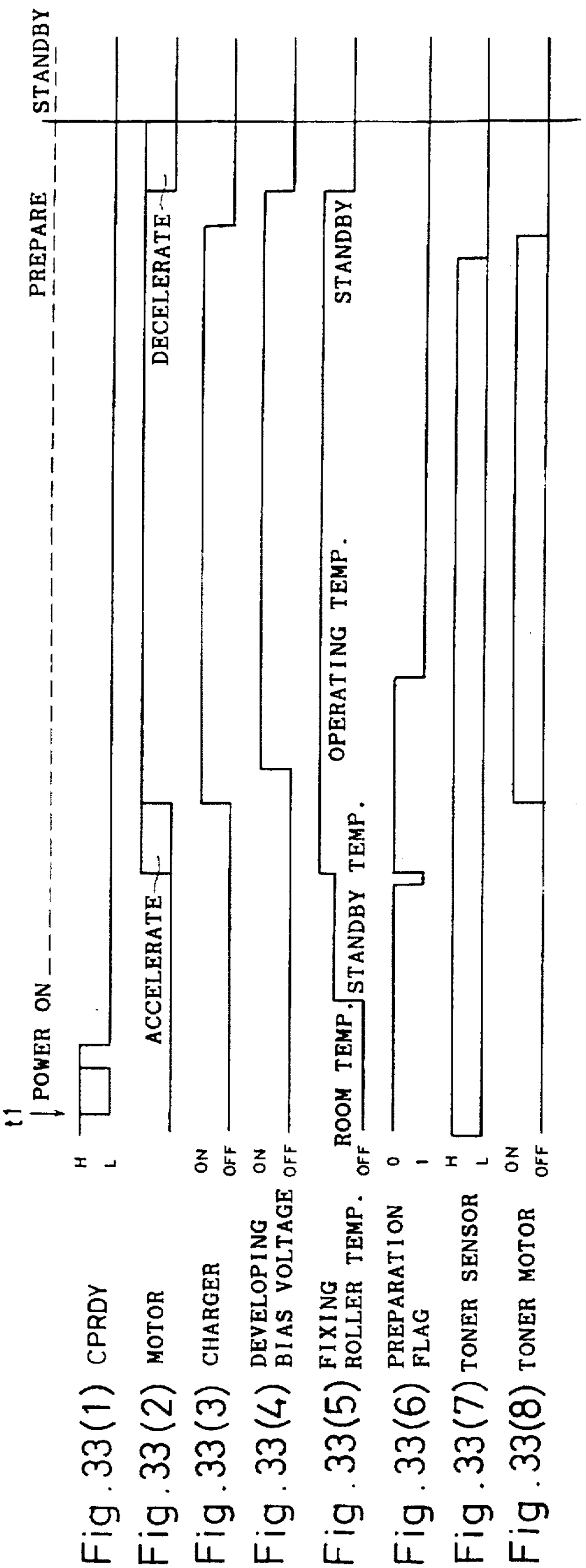

FIG. 33 is a timing chart showing the preparatory stage from steps al to a6 in FIG. 28 after power-on in the LED printer 21 according to the embodiment. When power is turned on in at the time t1 in FIG. 33, the preparatory process in steps a1 to a6 in FIG. 28 are performed as described above.

Figure 34:
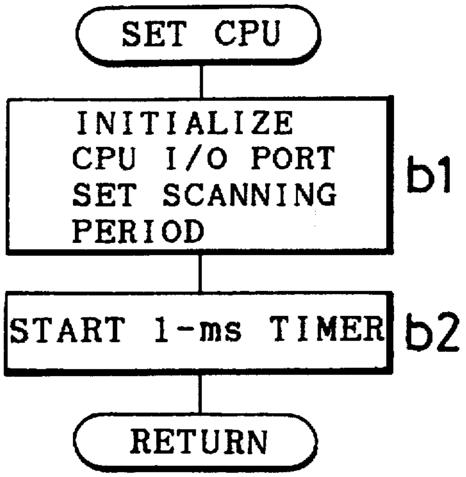
FIG. 34 is a flowchart showing the operation of step a2 in FIG. 28 in detail.

Step a1 initializes each stack pointer for the image controller 130 and the engine controller 131 of the LED printer 21 for executing the subsequent processes. The setting process of step a2 for the CPU 145 is shown in detail in FIG. 34. In FIG. 34, step b1 sets and initializes the input-output port of the CPU 145 and sets the scanning period of each sensor. Step b2 starts the one-millisecond timer 132 of the LED printer 21 shown in FIG. 1.

Figure 35:
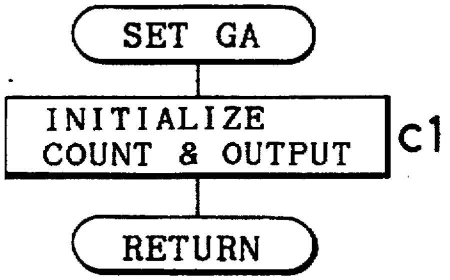
FIG. 35 is a flowchart showing the operation of step a3 in FIG. 28 in detail.
Figure 36:
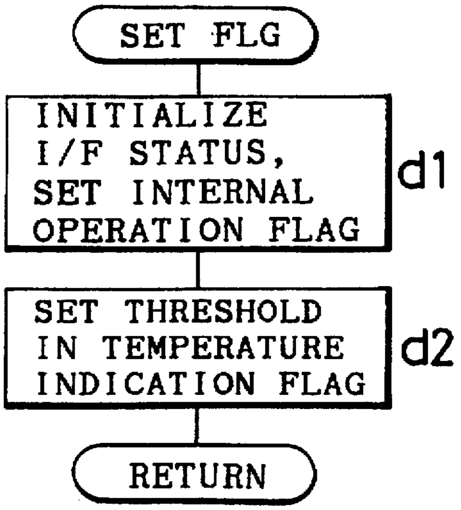
FIG. 36 is a flowchart showing the operation of step a4 in FIG. 28 in detail.

The process for setting the gate array is shown in FIG. 35. Step c1 initializes the output signals from the counters and circuit components described above in the gate array 134. The process for setting the flags in step a4 is illustrated in FIG. 36. Step d1 initializes the transmission conditions of the image controller 130 in FIG. 1 with the host computer 127, the mutual communications between the image controller 130 and the engine controller 131, or in particular, sets internal operation flags and initializes each input/output signals of the CPU 145 mounted in the image controller 130. Step d2, to control the temperature of the fixing unit 46 in the LED printer 21, sets a threshold value at each break point within the range of temperature measured in the fixing unit 46 as described later, i.e., a threshold value providing the standby temperature and the operating temperature described above.

Figure 37:
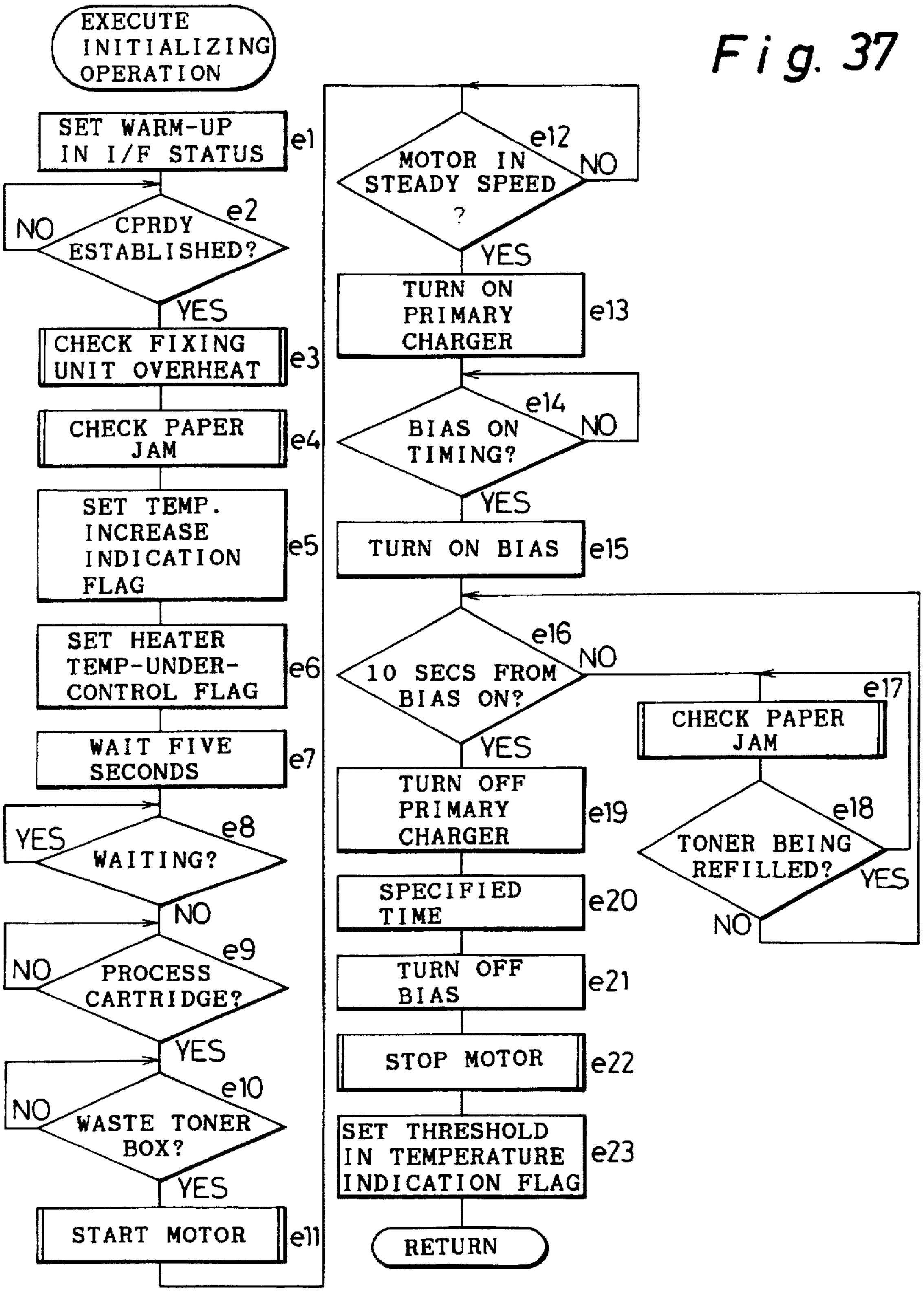
FIG. 37 is a flowchart showing the operation of step a6 in FIG. 28 in detail.

FIG. 37 is a flowchart showing the initializing operation carried out at step a6 in FIG. 28. In FIG. 37, step e1 sets various power-on parameters and characteristics such as a data on warm-up conditions in the memory area relating to external communication of the engine controller 131. Step e2 judges whether a communication ready signal CPRDY from the image controller 130 has been established or not. The communication ready signal CPRDY indicates that the initialization of the image controller 131 has been completed and that the communication with the engine controller 131 is now available. The image controller 131 is ready to send out an instruction signal to the engine controller 131. Then the engine controller 131 is ready to produce a status signal corresponding to the instruction signal.

When the judgment at step e2 is affirmative, the process is passed to step e3 for checking for any overheat or abnormally heated condition of the fixing unit 46. In the case where the fixing unit 46 is overheated due to the runaway of the program as described above, the runaway of the CPU 145 is stopped by a reset signal generated from the comparator 152. The starting routine is restored to check whether an abnormal heating has occurred or not.

In the case where no abnormal heating of the fixing unit 46 is detected by the check conducted in step e3, the process proceeds to step e4 to check for any paper jam in the LED printer 21 as described later. Step e5 sets a data in a temperature indication flag set in the engine controller 131 indicating that the temperature is increasing. Step e6 sets an in-control flag indicating that the temperature of the heater 146 (referring to FIG. 12) of the fixing unit 46 is under control. Step e7 causes the LED printer 21 to wait for five seconds in the current operating conditions.

Subsequently, step e8 judges whether the prevailing operating condition is in the preparatory stage described above including steps a1 to a6 shown in FIG. 28. At the end of the preparatory stage, the process is passed to step e9. Step e9 judges whether the process cartridge 73 is mounted on the upper housing 23 shown in FIG. 2. When the process cartridge 73 is mounted, the process is passed to step e10 to wait for the mounting of the waste toner box 99. Step e11 starts the motor 126. Specifically, a flag indicating that the rotational speed of the motor 126 is increasing is set in the CPU 145, and a control signal is produced for driving the motor 126 under this operating condition.

Step e12 waits until the rotational speed of the motor 126 becomes steady, and step e13 applies power to the charger 81. In other words, the photosensitive drum 77 is set in a state with a white original image formed thereon. Although the photosensitive drum 77 is activated, the surface thereof is at least partially yet not to be charged, so that toner is attached when the drum 77 passes the developing roller 76, which toner is scratched off by the cleaning unit 80. This is a waste of toner. According to this embodiment, by contrast, such waste of toner is prevented. Step e14 waits for the timing to apply a bias voltage to the developing roller 76. The bias voltage is applied in order to charge the toner in the process cartridge 73 electrostatically in a predetermined polarity. When the application timing is reached, step e15 applies a bias voltage to the developing roller 76.

Step e16 judges whether ten seconds, for example, has passed or not, for example, after application of the bias voltage. If ten seconds has not yet passed, step e17 checks for a paper jam as at step e4, followed by step e18 to judge whether the toner under supply. If the toner is under supply, the process returns to step e17, repeating steps e17, e18 until the toner supply is completed. When step e18 judges that the toner supply is completed, the process returns to step e16.

When the judgment at step e16 becomes affirmative, the process proceeds to step e19, where the power application to the charger 81 is stopped. Step e20 waits for a lapse of a specified time after stopping power application to the charger 81, followed by step e21 to stop the application of the bias voltage to the developing roller 76. Step e22 stops the motor 126. Specifically, a flag corresponding to the control for decreasing the rotational speed of the motor 126 is set in the CPU 145, and the flag indicating that the motor 126 is in steady operation is cleared. After that, step e23 sets a threshold value in a flag for specifying the temperature of the fixing unit 46. This threshold value is set at a predetermined standby temperature immediately after power-on. In the case where the printing operation is started with the temperature held at the standby temperature level, the operating temperature described later higher than the standby temperature is regarded as a specified temperature. The threshold value is thus increased.

Figure 38:
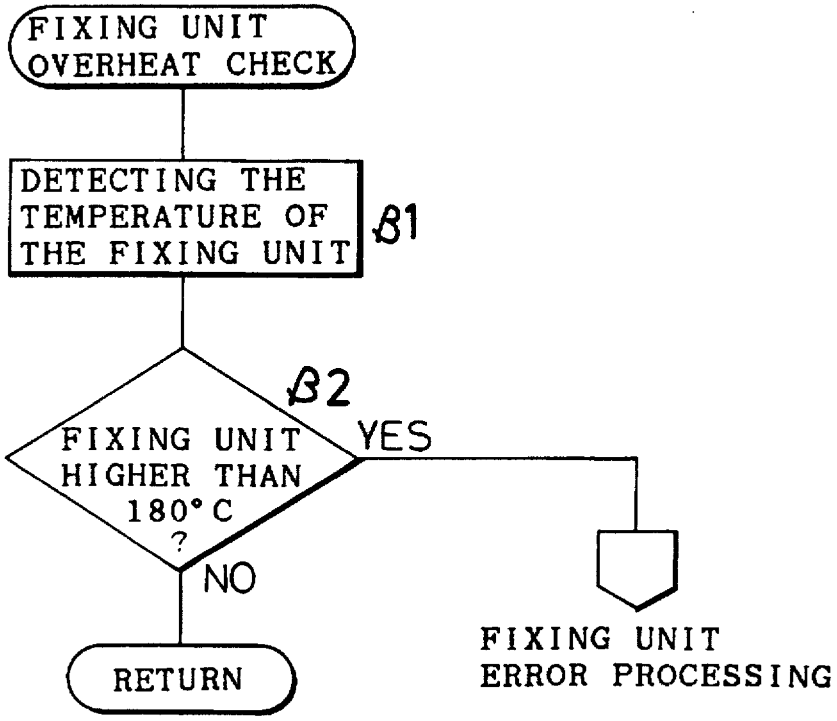
FIG. 38 is a flowchart showing the operation of step e3 in FIG. 37 in detail.

FIG. 38 is a diagram showing detailed processes of step e3 in FIG. 37 for checking the overheat of the fixing unit 46. Step β1 takes a temperature signal from the thermistor 147 to detect the temperature of the fixing unit 46. Step β2 judges whether the temperature of the fixing unit 46 exceeds 180° C. and if overheating is detected, proceeds to a step for repairing the error of the fixing unit 46 described later with reference to FIG. 68.

In the event that the temperature of the fixing unit 46 is lower than 180° C., the particular process is bypassed and the process is returned to the earlier process, FIG. 37.

The reason for setting 180° C. as the criterion for step β2 is to as follows: When the CPU 145 runaways and the temperature exceeds 200° C., the comparator 152 generates a reset signal to stop the power to the fixing unit 46. The reset signal is held during the cooling cycle until the temperature falls below 200° C. When the temperature falls below 200° C., the reset is canceled, and the CPU 145 executes the starting routine again. In this routine, abnormal heating is detected according to the flowchart, therefore it is necessary to set the detection temperature at a level lower than 200° C. and higher than an unlikely temperature (about 170° C.) under a conductive condition.

(4f) Paper jam or other error check

Figure 39:
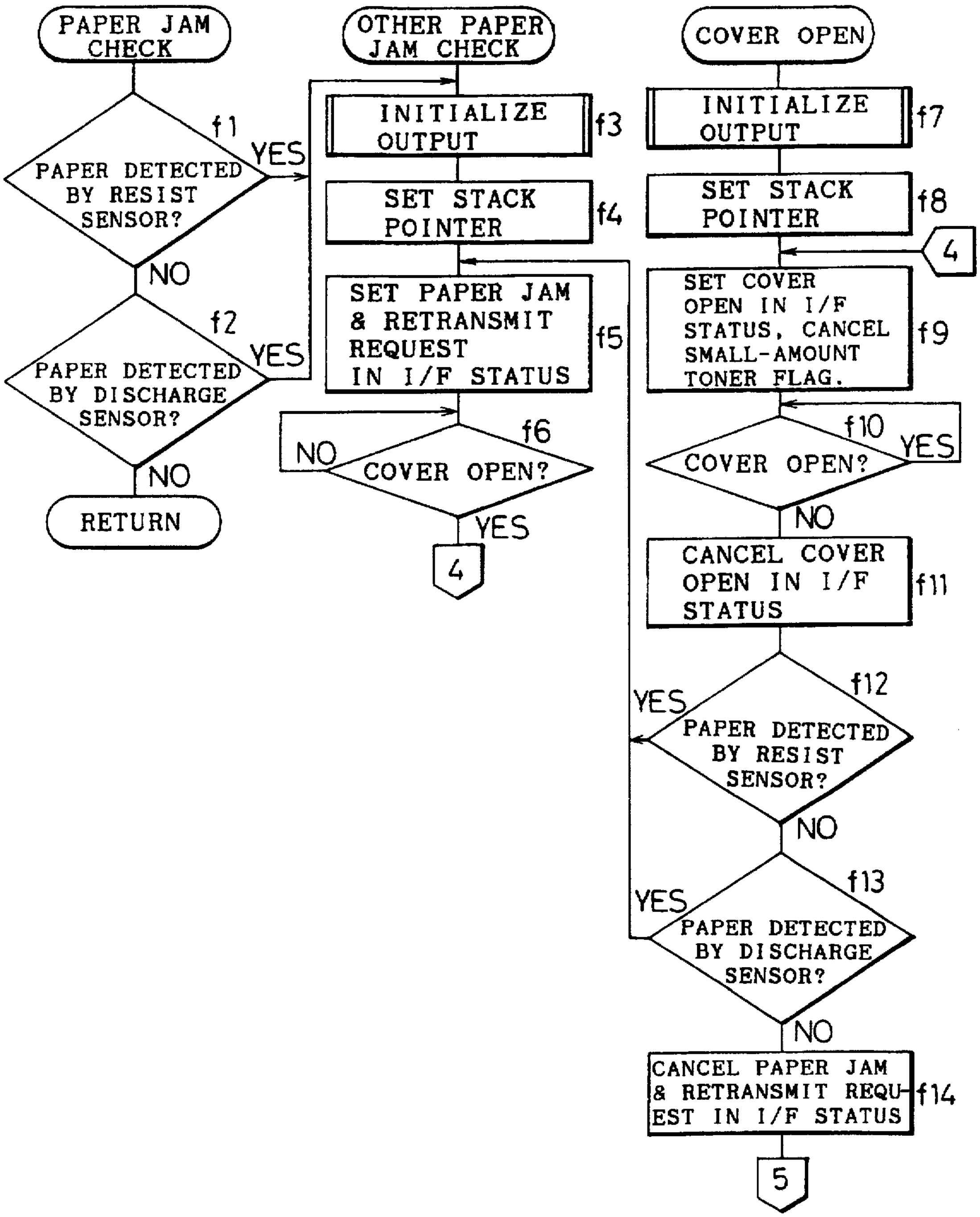
FIG. 39 is a flowchart showing the operation of step e4 in FIG. 37 in detail.

FIG. 39 is a flowchart for explaining the operation for checking a paper jam, etc., at step e4 in FIG. 37. According to the LED printer 21 of this embodiment, a part of the operation for checking a paper jam described later is shared with a checking operation when the paper discharge rollers 58, 59; 64, 65 or the resist roller 38 are stopped and a recovery operation when the upper housing 23 is opened. In FIG. 39, step f1 checks whether the sensor 39 in FIG. 2 has detected a recording paper or not. If the answer is negative, step f2 checks whether the sensor 51 in FIG. 2 has detected a recording paper. If the answer is also negative, the process is ended. In the case where at least one of the decisions at steps f1 and f2 is affirmative, the process is passed to step f3.

Step f3 is the process to be executed even when the resist roller 38 and the paper discharge rollers 58, 59; 64, 65 are stopped. Step f3 initializes the output. Step f3, in the output initialization, stops the motor 126, clears the flag indicating that the general counters 215, 216 of the CPU 145 shown in FIG. 1 are under operation, and sends to the image controller 130 a toner supplying in a status data representing the operating condition of the engine controller 131.

After that, step f4 initializes the stack pointer, and step f5 sets data requesting retransmission of a page data when the printing operation is suspended, together with data on a paper jam, in the status data sent to the image controller 130. Step f6 waits for the recovery process of the opened upper housing 23. Then the process proceeds to step f9 described later.

When the upper housing 23 is opened during the operation of the LED printer 21, the cover-open recovery process is executed. This process is executed in and after step f7 in FIG. 39. Step f7 stops the motor 126 in the same manner as step f3. Step f8 initializes the stack pointer in the same manner as step f4. Step f9 sets cover-open data in the status data sent to the image controller 130 and cancels the flag indicating that the remaining toner is small in amount. Step f10 waits for the operation of closing the upper housing 23, and when the upper housing 23 is closed, the process is passed to step f11, where the cover-open flag in the status data is canceled. Step f12 judges whether the sensor 39 has detected a recording paper. If the judgment is negative, step f13 checks to see whether the sensor 51 has detected a recording paper. If this judgment is also negative, step f14 cancels the paper jam flag and the data retransmission request in the status data. The process then proceeds to step a6 in FIG. 28.

In this way, according to this embodiment, a common program is used as far as possible among various processes against a paper jam, stop of the resist roller 38 or the paper discharge rollers 58, 59; 64, 65 and cover-open. As a result, the need for preparing individual programs including the common contents is eliminated, and therefore both the work load of preparing a program and the capacity of a memory for storing the program are reduced.

(4g) Standby process

Figure 40:
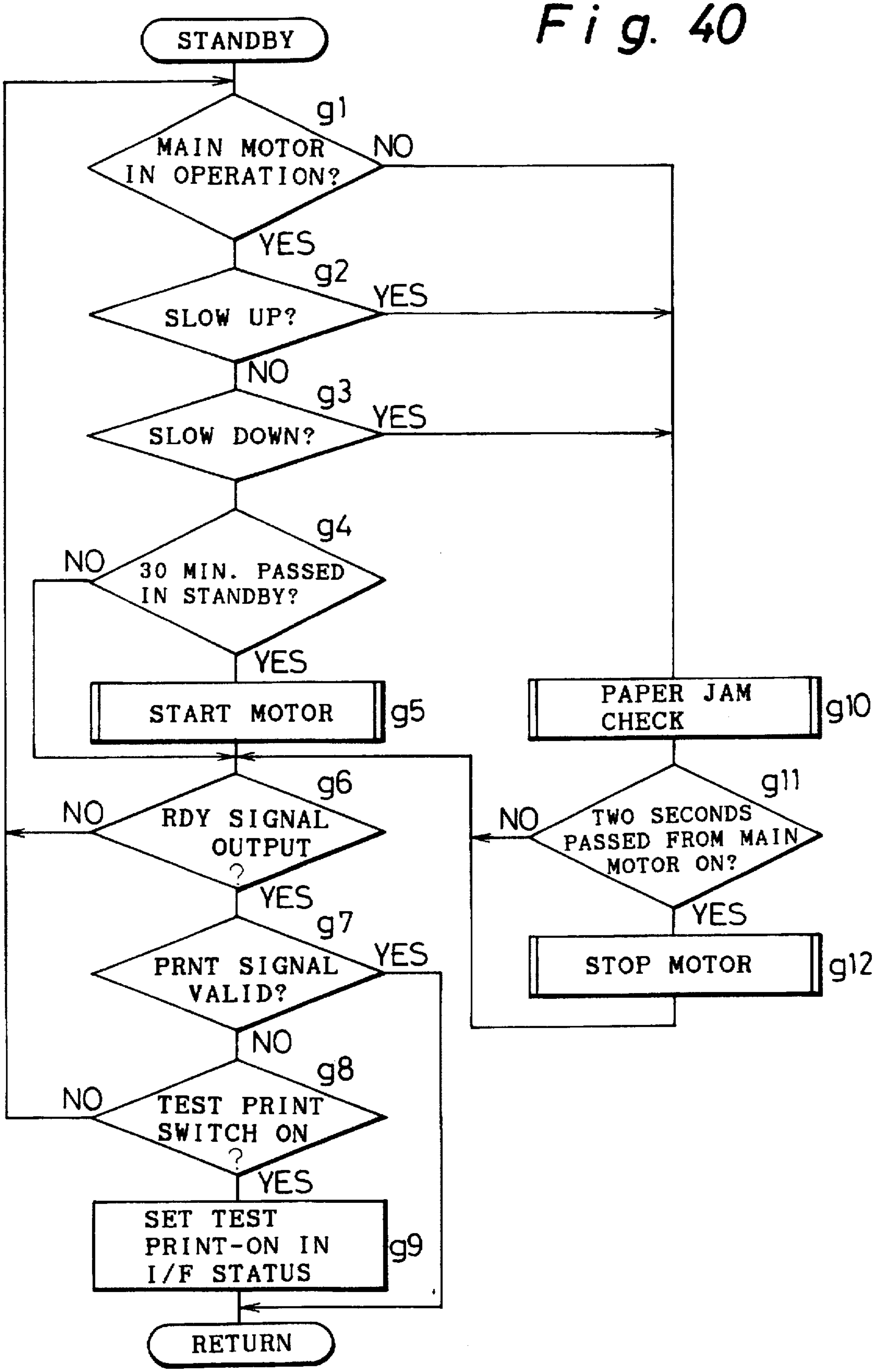
FIG. 40 is a flowchart showing the operation of step a7 in FIG. 28 in detail.

FIG. 40 is a flowchart showing the standby process of step a7 in FIG. 28 in detail. Step g1 judges whether the motor 126 is under operation. If the motor 126 is under operation, step g2 judges whether the speed of the motor 126 is on the increase. If the answer is negative, step g3 judges whether the motor 126 is on the decrease. When this judgment is also negative, step g4 judges whether the standby state continues for 30 minutes as an example without printing operation nor opening of the upper housing 23 for paper jam elimination after power-on. If this judgment is affirmative, step g5 starts the motor 126 in the same manner as step e11 in FIG. 37. Then, the process proceeds to step g6. If the judgment at step g4 is negative, step g5 is not executed but the process is immediately passed to step g6.

More specifically, if the fixing unit 46 remains stationary for a long time without printing operation with the heating roller 49 warmed to about the standby temperature after power-on, the pressure roller 48 may be deformed or peripheral heat distribution of the pressure roller 48 may be greatly varied, thereby often causing a trouble of an insufficient fixing operation in printing. According to this embodiment, upon a lapse of 30 minutes of the stationary condition of the fixing unit 46 during the standby stage, the motor 126 is driven for several seconds to activate the fixing unit 46. This condition is shown in the timing chart of FIG. 41.

Figure 41:
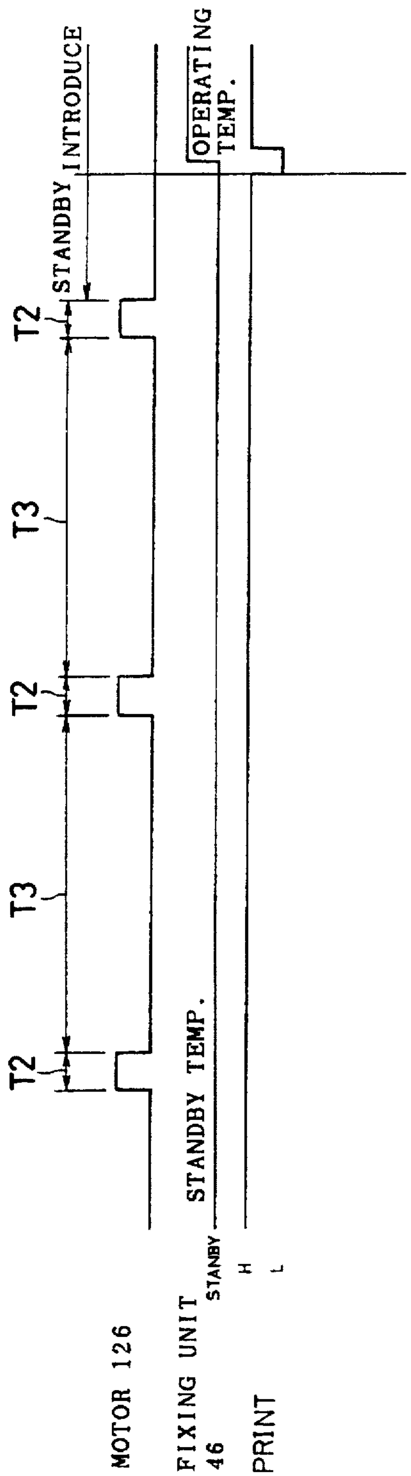
FIG. 41 is a timing chart for explaining the printing operation according to an embodiment.

In other words, the fixing unit 46 is set to a predetermined standby temperature as shown in FIG. 41(2), with the print start signal PRNT not applied to the engine controller 131 from the image controller 130. Under this condition, each time the time T3 (for example, 10 to 30 minutes) passes as shown in FIG. 41(1), the motor 126 is driven for about the time T2 (for example, one or two second) to rotate the pressure roller 48 and the heating roller 49 of the fixing unit 46. When a low-active printing start signal PRNT is applied to the engine controller 131 from the image controller 130, the fixing unit 46, as shown in FIG. 41(2), is increased from the predetermined standby temperature further to the predetermined operating temperature. After that, the process proceeds to step a8 for introduction process in FIG. 28.

Referring to FIG. 40 again, step g5 drives the motor 126, and step g6 judges whether a print ready signal RDY from the engine controller 131 shown in FIG. 1 is outputted or not. The print ready signal RDY is set valid by the engine controller 131 when the following conditions are met:

(1) The initialization-over signal PPRDY is effective, which becomes effective at power-on and ineffective at power-off.

(2) The temperature of the fixing unit 46 is within a specified range in the engine controller 131.

(3) The process cartridge 73 is mounted in the LED printer 21.

(4) The waste toner box 99 is mounted in the LED printer 21.

(5) The paper cassette 29 containing the recording paper of a size designated by the image controller 130 is mounted in the LED printer 21.

(6) The LED printer 21 is not in paper jammed condition.

(7) The print data retransmission request as described above is not outputted from the engine controller 131.

(8) The LED printer 21 is not in test printing operation.

(9) The upper housing 23 is closed in the LED printer 21.

(10) The LED printer 21 is not suspended (not in pause).

(11) The exhaust gas fan motor is running steadily.

(12) The process cartridge 73 and the toner box 74 are not empty of toner.

(13) The operation of the LED printer 21 is not currently in the toner supply mode explained with reference to FIG. 25.

As far as the print ready signal RDY is valid, the process proceeds to step g7, thereby judging whether the print start signal PRNT produced from the image controller 130 is valid or not. The print start signal PRNT causes the image controller 130 to instruct the engine controller 131 to start or continue the printing operation. More specifically, when step g7 decides that the print start signal PRNT is not valid, step g8 judges whether the test print switch 212 shown in FIG. 1 is operated or not. If the switch 212 is operated, step g9 causes the engine controller 131 to set a test print data in the status data to be transmitted to the image controller 130. After that, the LED printer 21 prints a test sample having a predetermined series of characters and symbols. In the case where step g7 decides that the print start signal PRNT is valid, the engine controller 131 receives the printing data from the image controller 130 and performs the printing operation as described later.

In the case where step g6 decides that the print ready signal RDY is invalid, i.e., not produced, or step g8 decides that the test print switch 212 is not operated, then the process returns to step g1 to repeat the steps described above.

In the case where the decision at step g1, g2 or g3 is affirmative, the process proceeds to step g10 for executing the paper jam recovery as explained with reference to FIG. 39. After that, step g11 judges whether the time T2 shown in FIG. 41 has lapsed from the starting of the motor 126, and if so, step g12 stops the motor 126 in the same manner as step e22 in FIG. 37. The process then is passed to step g6. Also when the decision is negative at step g11, the process is passed to step g6.

(4h) Introduction process

Figure 42:
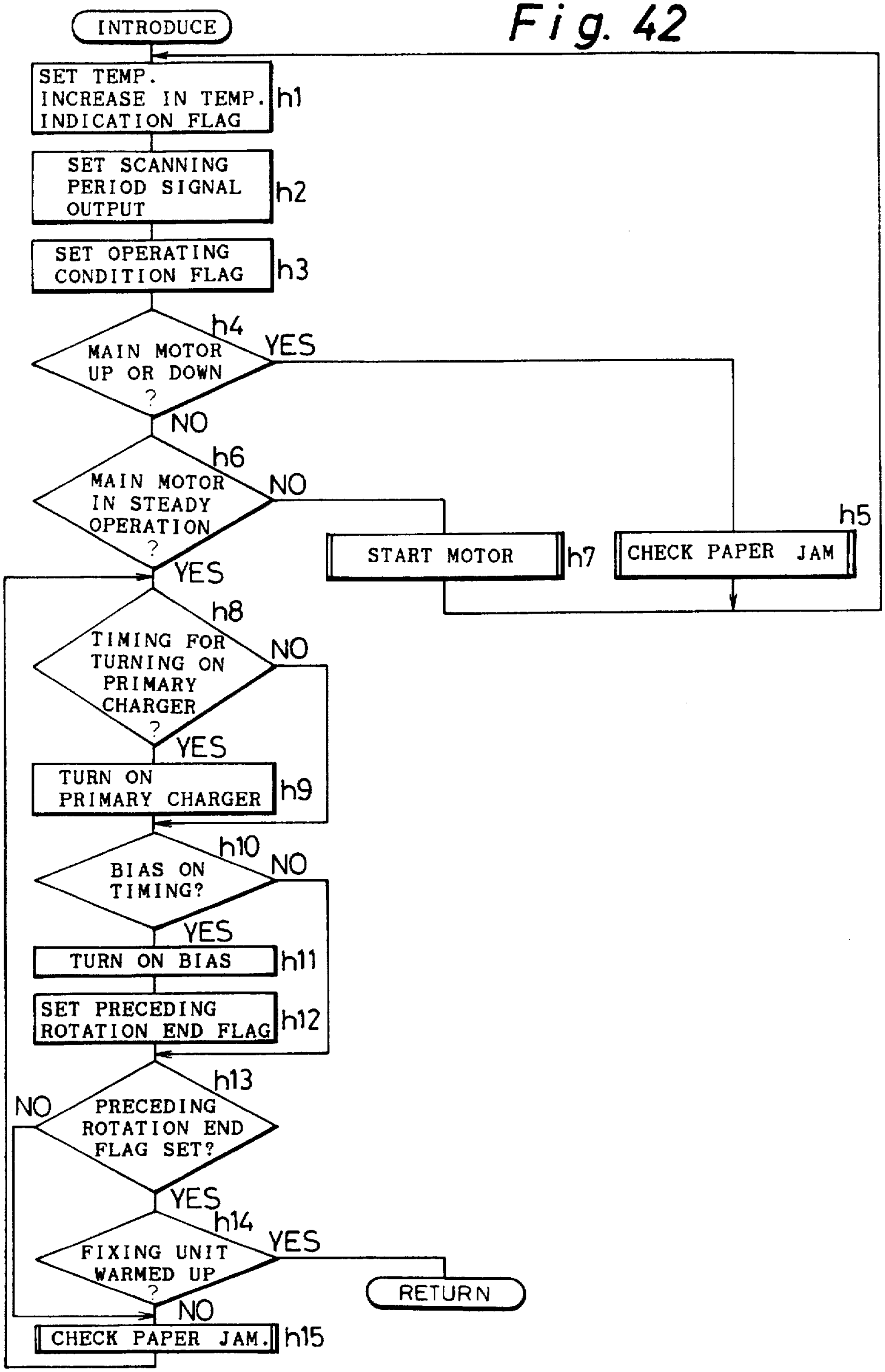
FIG. 42 is a flowchart showing the operation of step a8 in FIG. 28 in detail.

FIG. 42 is a flowchart for explaining the introduction process of step a8 in FIG. 28 in detail. FIG. 43 is a timing chart for explaining the operation of the LED printer 21 for the introduction processes. The introduction process is started when the print start signal PRNT becomes valid during the standby process in FIG. 40 as shown in FIG. 41 and 43(1). Step h1 in FIG. 42 sets a temperature increase data in a temperature indication flag in the status data STS sent to the image controller 130, and step h2 starts the output of the horizontal synchronizing signal BD. Step h3 clears the general counter operation flag and also the rotation end flag set during the preceding printing operation.

Step h4 judges whether the motor 126 of the LED printer 21 is accelerating or decelerating. If the judgment is affirmative, the process proceeds to step h5 to execute the paper jam recovery process explained with reference to FIG. 39, and then returns to step h1.

When the judgment at step h4 is negative, that is, when the motor 126 is running steadily or stationary, the process proceeds to step h6, where judging whether the motor 126 is running at steady speed. If this judgment is negative, the process is passed to step h7 to start the motor in the same manner as step e11 in FIG. 37. This is followed by returning to step h1.

In the case where step h6 decides that the motor 126 is running at steady speed, the process is passed to step h8 for judging whether the timing of the application of the driving voltage to the charger 81 has come. This timing is set by the transmission timing of the image data DT transmitted from the image controller 130 with respect to the peripheral direction of the photosensitive drum 77. If the judgment at step h8 is affirmative, step h9 applies the operating voltage to the charger 81 as shown in FIG. 43(4).

Then, step h10 judges whether the timing of the application of the bias voltage to the developing roller 76 has come. The bias voltage is applied to the developing roller 76 when the portion of the photosensitive drum 77 charged by the charger 81 at step h9 reaches the developing position facing the developing roller 76. This minimizes the attachment of toner or carrier to the photosensitive drum 77 or the like. In the case where the judgment at step h10 is affirmative, step h11 applies the bias voltage as shown in FIG. 43(5). Step h12 sets the preceding rotation-over flag, and step h13 judges whether the preceding rotation-over flag is set or not. Thus, if the judgment at step h8 is negative, step h10 is executed without executing step h9. When the judgment at step h10 is negative, the process proceeds to step h13 without executing steps h11 and h12.

In the case where the judgment at step h13 is affirmative step h14 judges whether the temperature of the fixing unit 46 has reached the operating temperature higher than the standby temperature in the standby condition as shown in FIG. 43(6). If the temperature is still lower than the operating temperature, step h15 executes the paper jam recovery as explained with reference to FIG. 39, and the process returns to step h8. In the case where the judgment at step h14 is affirmative, the process is passed from the introduction step shown in FIG. 42 to the printing step described later.

Through the introduction process, as described above, where the motor 126 is accelerated and the charger 81 is supplied with driving voltage, the LED printer 21 becomes ready for printing, waiting for a recording paper to be supplied from the paper cassette 29 or manual feed device 83.

(4f) Printing operation

Figure 44A:
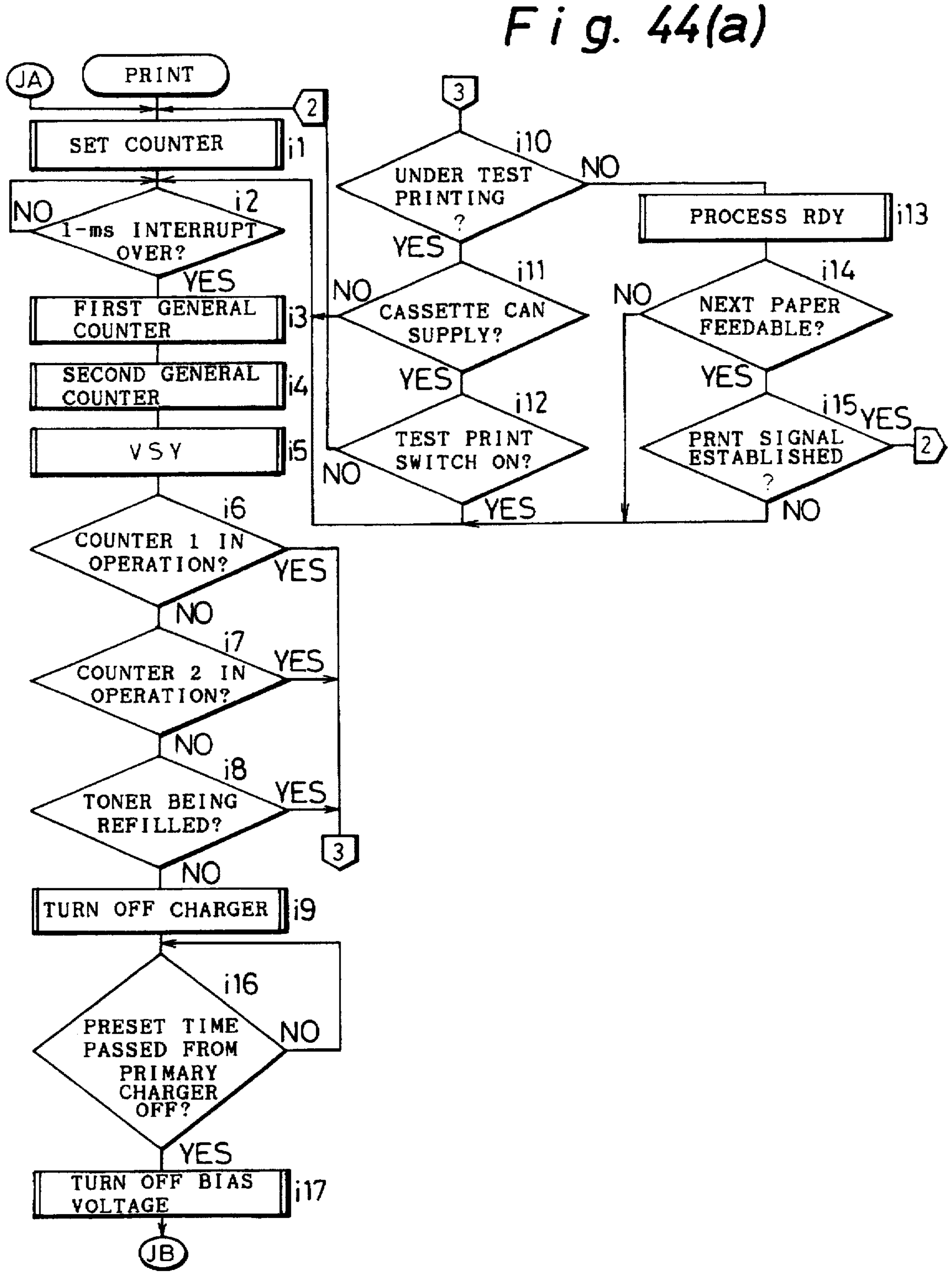
FIGS. 44(*a*) and 44(*b*) are a flowchart showing the operation of step a9 in FIG. 28 in detail.
Figure 44B:
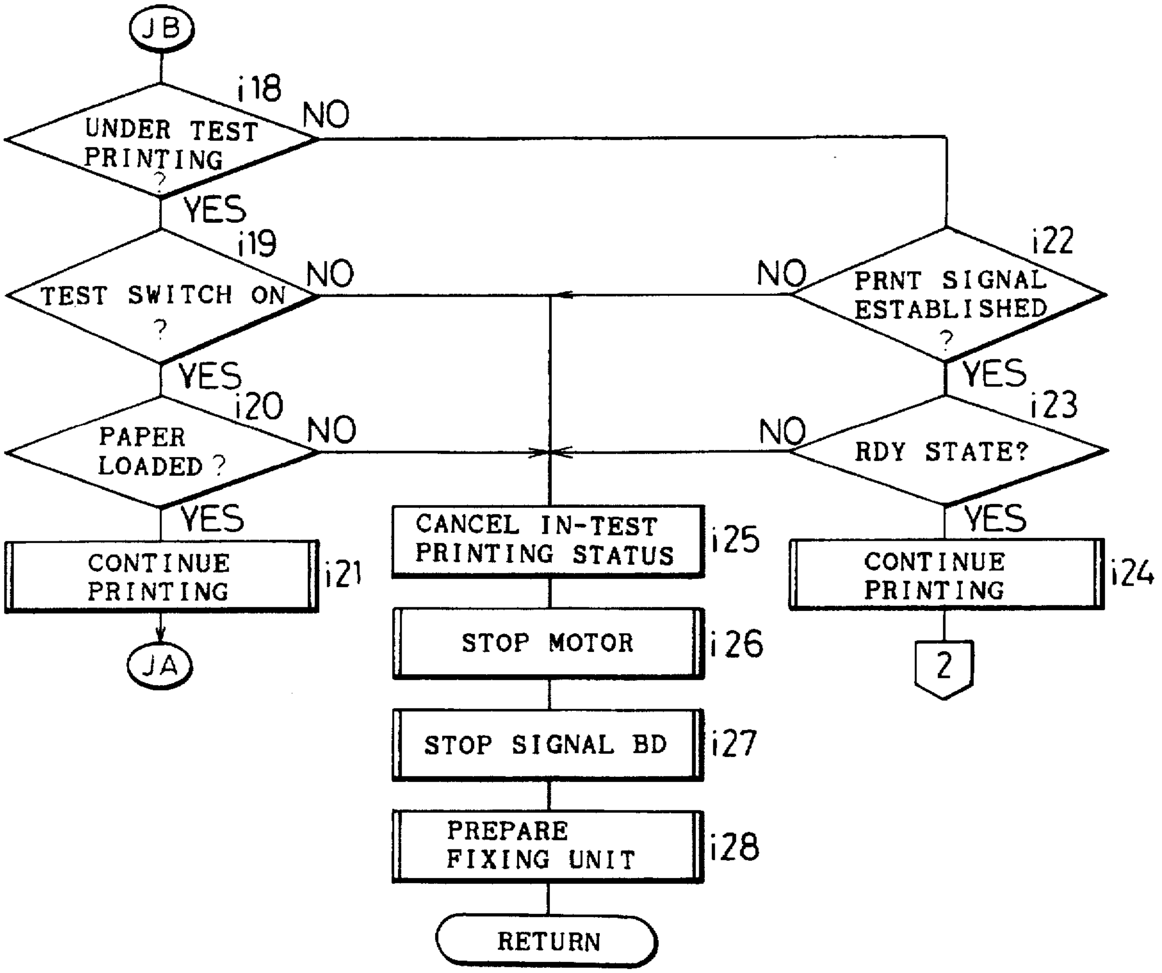
Figure 45:
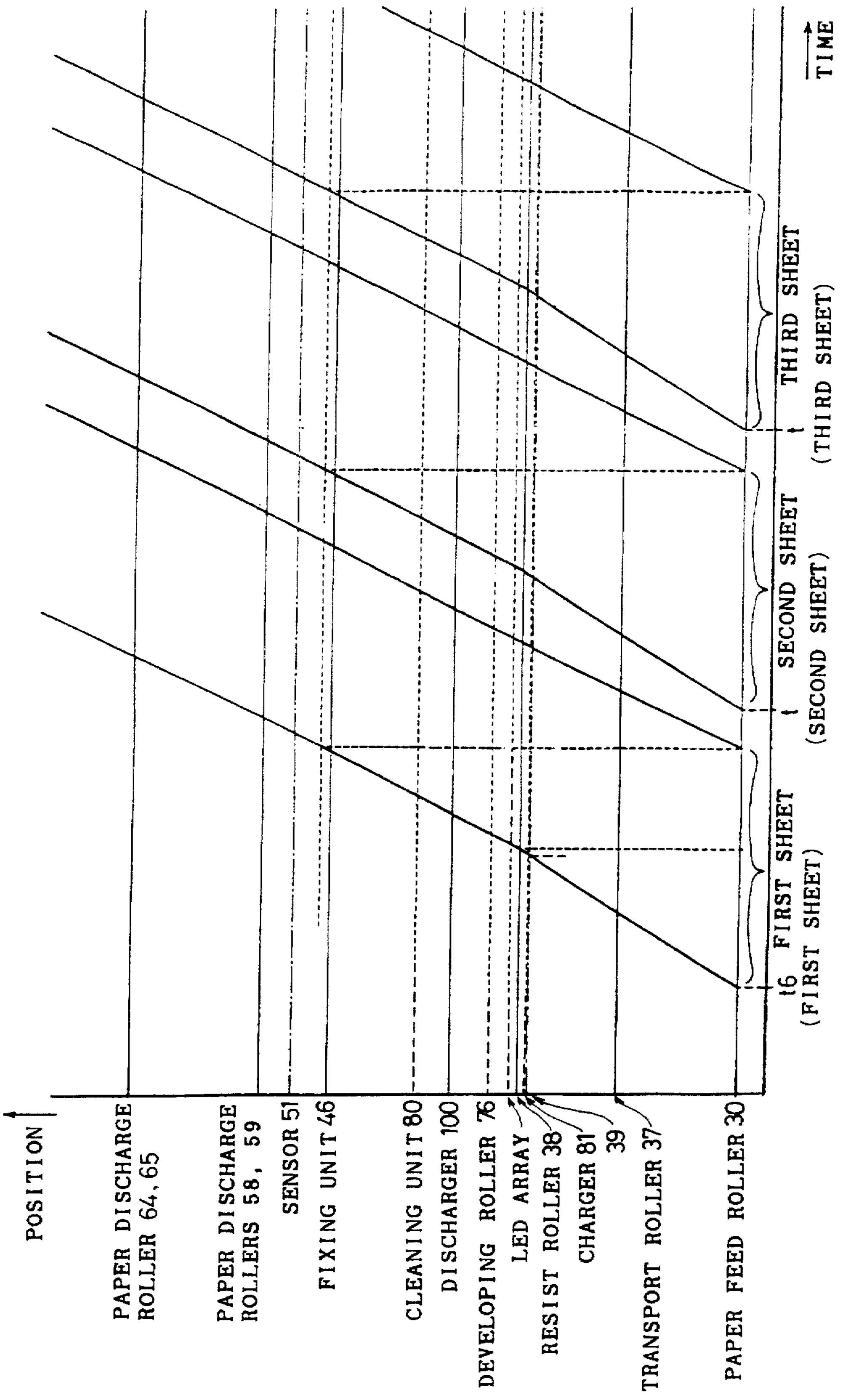
FIG. 45 is a diagram for explaining the transport operation for the recording paper in the LED printer 21.
Figure 46:
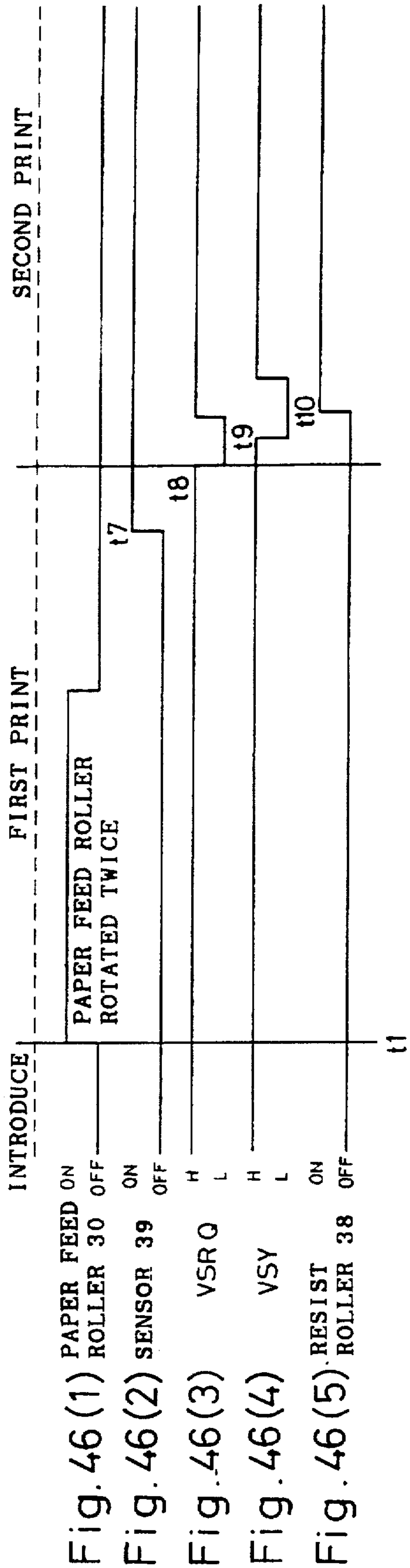
FIG. 46 is a timing chart for explaining the printing operation according to an embodiment.
Figure 47:
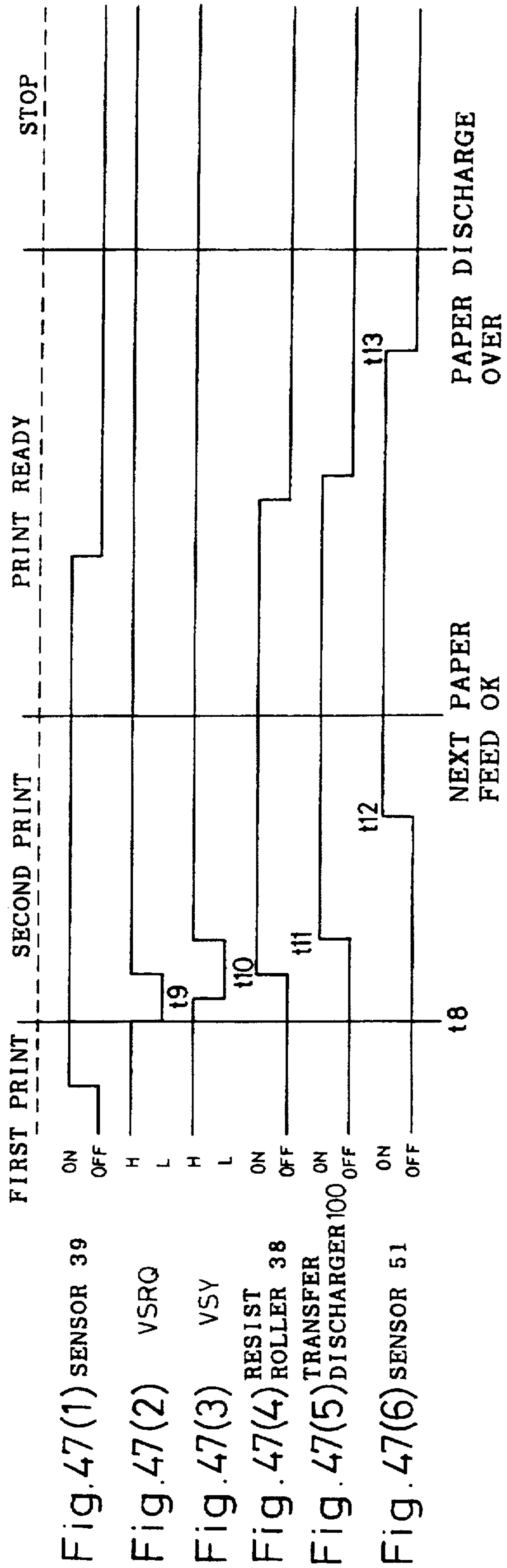
FIG. 47 is a timing chart for explaining the printing operation according to an embodiment.

FIGS. 44(*a*) and 44(*b*) are a flowchart for explaining the printing operation, FIG. 45 is a diagram showing the process associated with the movement of a recording paper in the LED printer 21 during the period of printing operation, FIG. 46 is a timing chart for explaining the operation of the various parts under the printing operation, and FIG. 47 is another timing chart for explaining the operation of the various parts under the printing operation. As illustrated in the transition diagram of FIG. 23 or the timing charts of FIGS. 46 and 47, the printing operation is divided into three stages: the first printing stage 193 after the energization of the paper feed roller 30 in the introductory stage 192, the second printing stage 194 after the output from the engine controller 131 of a control signal VSRQ requesting the image controller 130 to produce a page synchronizing signal VSY synchronized with a one-page image data in the first printing stage 193, and the print ready stage after complete printing of a sheet of recording paper and being ready for another paper insertion.

Figure 48:
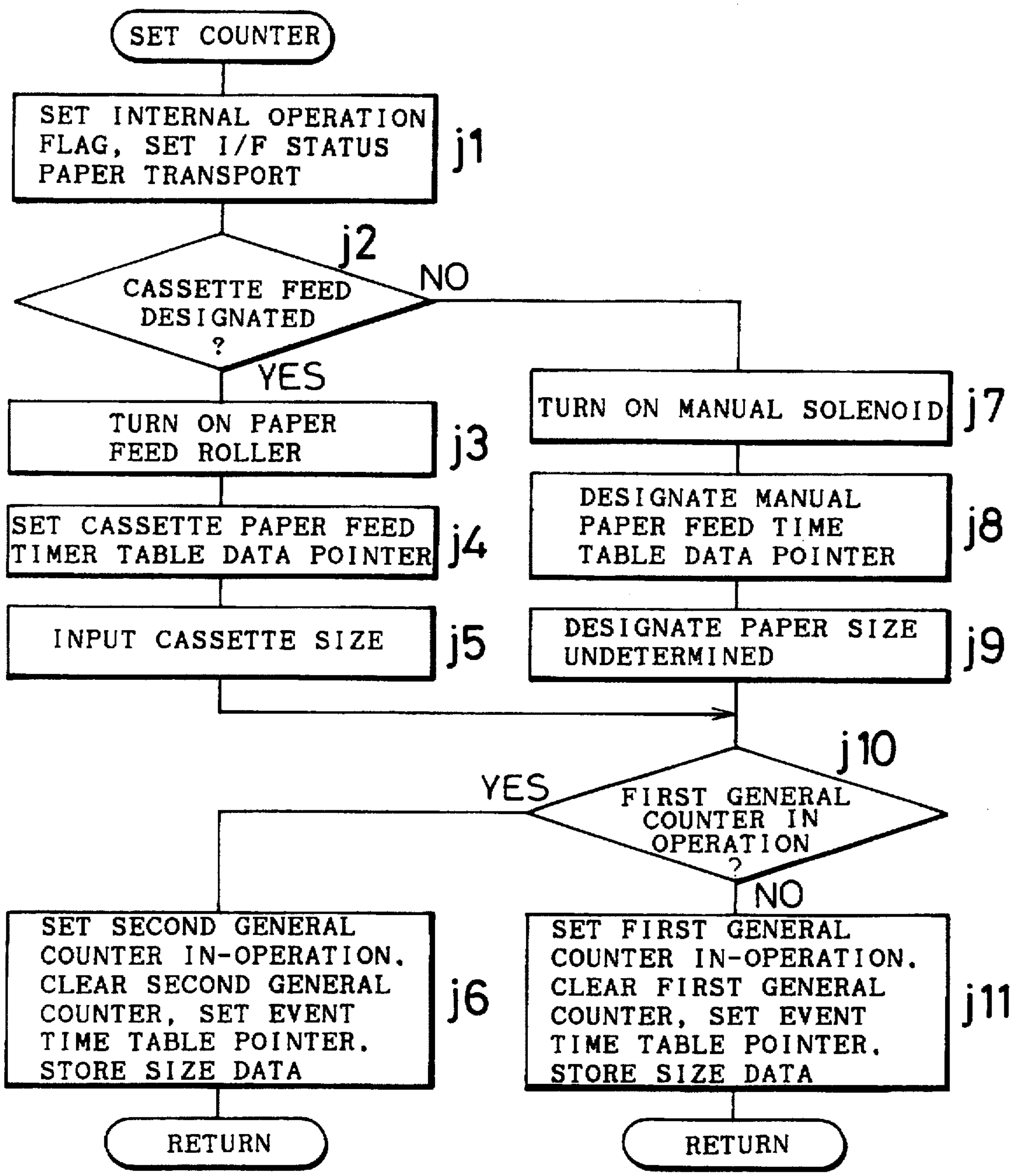
FIG. 48 is a flowchart showing the operation of step i1 in FIG. 44(*a*) in detail.

In FIG. 44(*a*), step i1 sets the counter shown in detail in FIG. 48. Specifically, step j1 in FIG. 48 sets an internal operation flag of the CPU 145 and also sets a paper transport data in the status data sent to the image controller 130. Step j2 judges whether paper is fed from the paper cassette 29 shown in FIG. 2 or manually by the manual feed device 83.

In the case where recording paper is not loaded on the manual feed device 83 and therefore the paper cassette 29 is used, the process proceeds to step j3, where the electromagnetic unit 124 is energized to connect a clutch, supplying power of the motor 126 to the paper feed roller 30. Step j4, in transporting recording paper fed from the cassette into the LED printer 21, designates an address to reading from the ROM 133 shown in FIG. 1 respective pre-measured time data from the start of paper feeding to the time when the paper passes the sensor 39, the resist roller 38, the transfer discharger 100, the fixing unit 46, the sensor 54 and the paper discharge rollers 58, 59; 64, 65. Step j5 reads the size of the paper cassette 29 in use from a size sensor 213 mounted in the lower housing 22. The process then proceeds to step j10.

When it is judged at step j2 that the manual feed mode is selected by the sensor 87 for detecting the recording paper, the process proceeds to step j7, where the electromagnetic plunger 125 is energized to transmit the power of the motor 126 to the transport roller 86. Step j8 designates an address to read from the ROM 133 respective pre-measured time data from the start of paper feeding to the time when the paper passes the sensor 39, the resist roller 38, the transfer discharger 100, the fixing unit 46, the sensor 54 and the paper discharge rollers 58, 59; 64, 65.

Step j9 causes the CPU 145 to designate that the size of the recording paper is uncertain as the manual feed device 83 does not include any sensor for detecting the size of the recording paper. Step j10 judges whether the first general counter 215 shown in FIG. 1 is in operation, and if the counter 215 is in operation, step j6 sets a data indicating that the second general counter 16 is in operation, thereby clearing the second general counter 216. Further, the size data of the recording paper detected at steps j5, j9 is stored in a memory such as a RAM.

In the case where the judgment at step j10 is negative, step j11 sets a data indicating that the first general counter 215 is in operation, clears the first general counter 215, and stores the size data of the recording paper read at steps j5, j9.

Step i2 in FIG. 44(*a*) waits for the completion of a one-millisecond interrupt processing described later. Upon completion of the one-millisecond interrupt, the process proceeds to step i3. Steps i3, i4 perform various operations relating to the first general counter 215 and the second general counter 216 shown in FIG. 1 in the manner illustrated in FIGS. 49 and 50.

Figure 49:
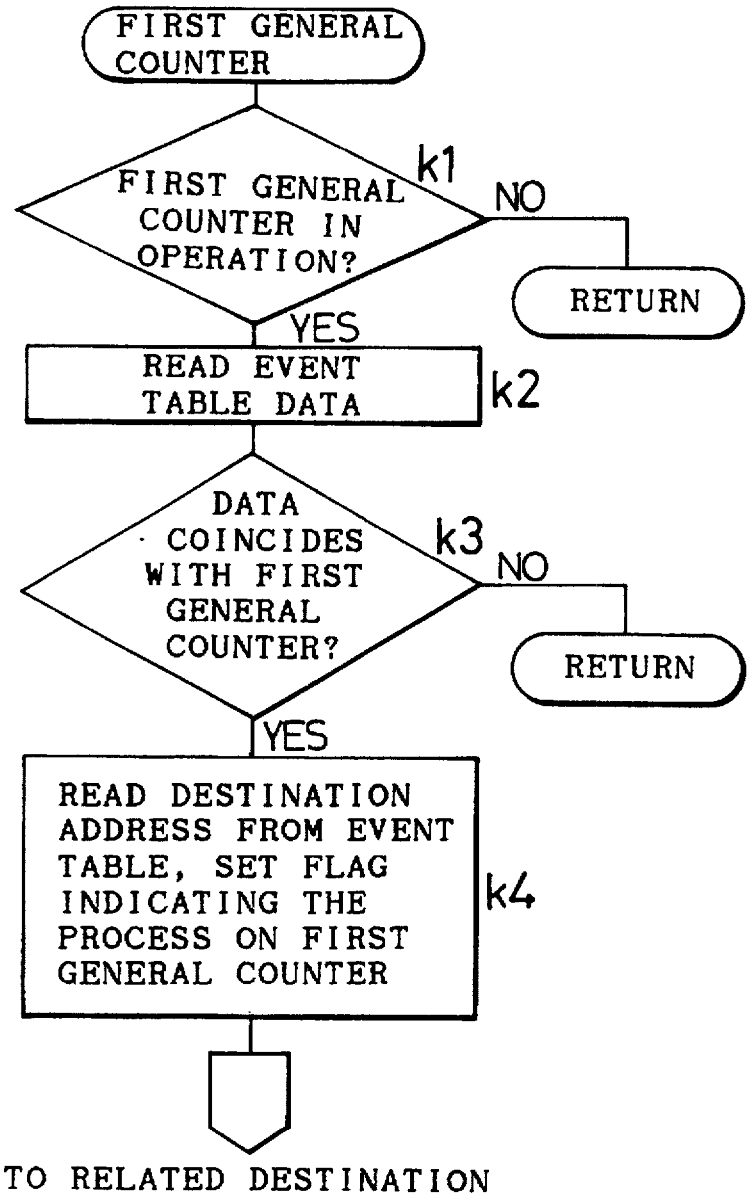
FIG. 49 is a flowchart showing the operation of step i3 in FIG. 44(*a*) in detail.

Step k1 in FIG. 49 judges whether the first general counter 215 is in operation, and if not in operation, ends the process. If the first general counter 215 is in operation, step k2 reads data from an event table that stores a plurality of fixed count values associated with process corresponding to the count value of the first general counter 215 and the head address of the corresponding processing program, and judges whether the data read at step k2 coincides with the count value of the first general counter 215. After that, step k4 reads the address of the processing destination from the event table, and sets a flag indicating the process of the general counter 215.

TABLE 1

| Operation | Reference point (paper feed) clutch on) | B5 (257 mm) | Manual | Remarks |
|---|---|---|---|---|
| Paper feed clutch off | From paper feed clutch on | 3000 | — | Pick-up roller makes two revolutions |
| Sensor 39 on | | 4800 | — | +0.3 sec margin |
| VSRQ output | | 5625 | — | Loop formed on paper |
| Manual feed clutch off (electromagnetic plunger 125 off) | From manual feed clutch on | — | 3700 | |
| Sensor 39 on | | — | 3950 | |
| VSRQ output | | — | 4000 | |
| Resist roller on | From VSY signal | 1 | ← | Head positon adjusted |
| Test data on | | 477 | — | When test data is printed |
| Transfer unit on | | 1255 | ← | Head margin of +5 mm |
| PREQ flag on | | 4050 | — | Next paper feed started |
| Sensor 51 on | | 4550 | ← | |
| Test data off | | 6806 | — | At time of test printing |
| Sensor 39 off | | 7050 | Size determination | +0.25 sec margin |
| Resist roller off | | 7300 | | +0.50 sec margin |
| Transfer unit off | | 8000 | | |
| Sensor 51 off | | 11100 | | Counted stopped. +0.2 sec margin |
| Motor off | | 14500 | | All paper discharged from apparatus |
| B5 size confirmed | From VSY signal | — | 7100 | Size confirmed by sensor |

(Numeral shows example of count value)

Figure 50:
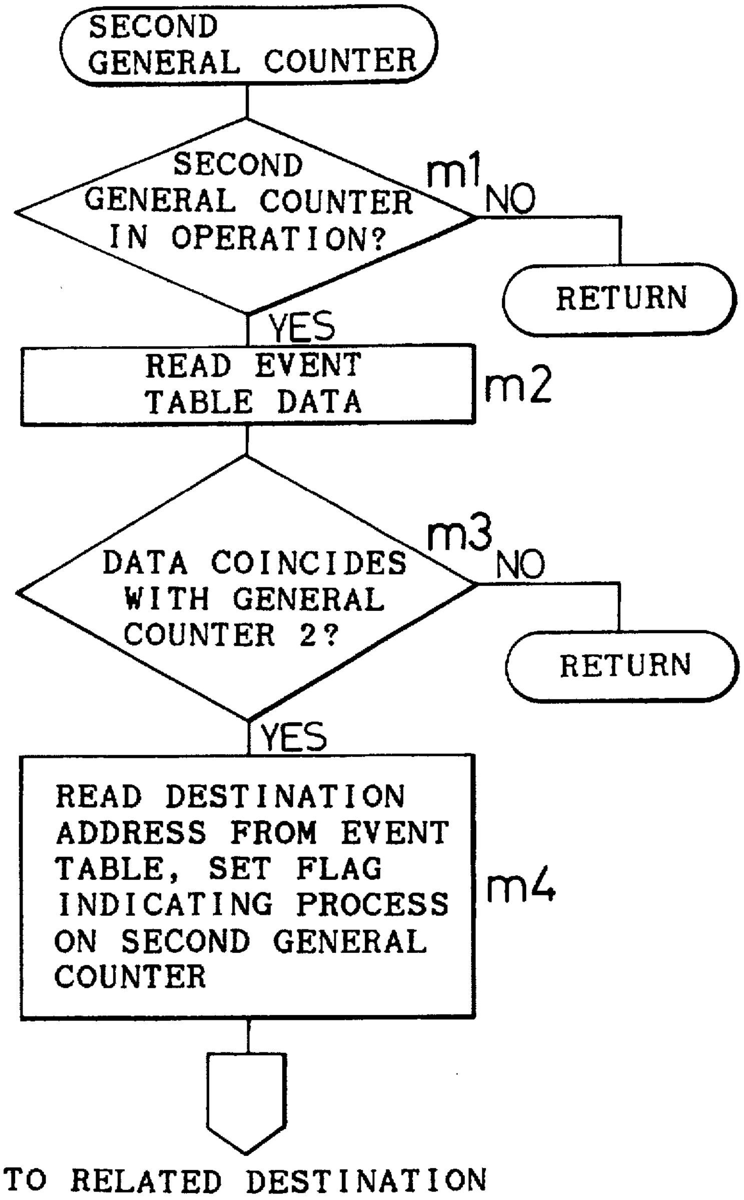
FIG. 50 is a flowchart showing the operation of step i4 in FIG. 44(*a*) in detail.

When the step i3 shown in FIG. 44(*a*), i.e. the process on the first sheet of the recording paper is completed, the process on the second sheet of the recording paper is executed at step i4, as specifically shown in FIG. 50. In FIG. 50, step m judges whether the second general counter 216 relating to the second sheet of the recording paper in the LED printer 21 is in operation. If not in operation, the process is completed. If in operation, on the other hand, step m2 reads the data from the event table. Step m3 judges whether the count data read from the event table coincides with the count data of the second general counter 216. If it does not coincide, the process is completed. If it coincides, on the other hand, step m4 reads the address where the corresponding program is stored from the event table, sets the data at the flag indicating the start of the processing by the second general counter 216, and transmits it to the image controller 130. After that, the process proceeds to the destination address read at step m4.

Figure 51:
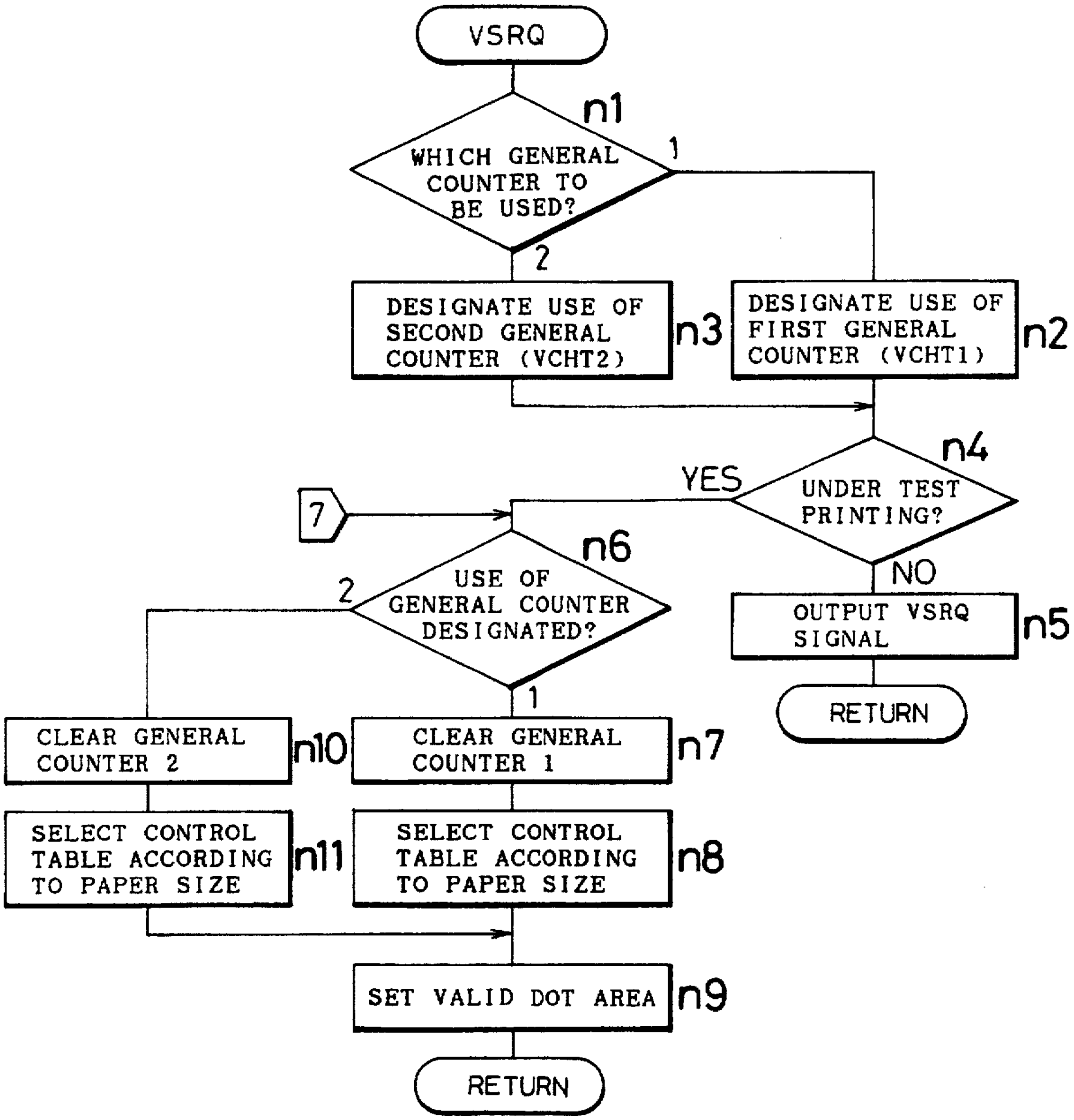
FIG. 51 is a flowchart for explaining the output of the control signal VSRQ from the engine controller 131 to an image controller 130.

An example of the processing taken in FIGS. 49 and 50 is the operation of producing an output of the control signal VSRQ transmitted to the image controller 130 from the engine controller 131. The particular processing is shown in the flowchart of FIG. 51. Step n1 decides which counter should be used, the general counter 215 or 216, for the subsequent operations. In the case where the first general counter 215 is used, step n2 writes the data designating the use of the first general counter 215. Then the process is passed to step n4.

In the case where step n1 decides that the second general counter 216 is to be used, on the other hand, step n3 sets data designating the use of the second general counter 216 and transmits data with the image controller 130. Step n4 judges whether the LED printer 21 is in test printing. If not in test printing, step n5 produces the control signal VSRQ requesting the page synchronizing signal VSY from the image controller 130.

If the judgment at step n4 is affirmative, on the other hand, step n6 judges which general counter, 215 or 216, has been set. When the first general counter 215 has been set, step n7 clears the general counter 215, and step n8 selects a control table corresponding to the size of the recording paper. Step n9 sets an area providing an effective printing range for printing one line, for example. After that, the process ends. In the case where the general counter 216 has been set at step n6, the step n10 clears the general counter 216, followed by step n11 for selecting a control table corresponding to the size of the recording paper. Then the process proceeds to step n9.

The printing process in general will be explained with reference to FIGS. 44(*a*) to 47. Step i1 in FIG. 44(*a*) initializes the counter set for each of two sheets of recording paper and used for ongoing processes each sheet passes though the LED printer 21. Two is the maximum number of sheets which may coexist in the LED printer 21 at a time due to the structure of the apparatus. Step i1 energizes the electromagnetic unit 124 shown in FIG. 1, and at the time t6 in FIG. 45, takes the first sheet of recording paper out of the paper cassette 29. Steps is, i4 recognize the process to be performed in accordance with the count values in the two general counters 215, 216 corresponding to the two sheets of recording paper as described later, and after executing the particular process, performs the operation described later in detail. Step i5, as described later, performs the process relating to the timing at which the page synchronizing signal VSY generated for each sheet of recording paper is applied to the engine controller 131 from the image controller 130.

Step i6 judges whether the first general counter 215 associated with the first sheet of recording paper in the LED printer 21 is in operation. Step i7 judges similarly whether the second general counter 216 for the second sheet of recording paper is in operation. In this way, steps i6, i7 judge whether one or two sheets of recording paper is moving in the LED printer 21. If both judgments are negative, step i8 judges whether the toner supply operation is being performed in the process cartridge 73. When this judgment is also negative, step i9 cuts off power to the charger 81.

Where the judgment at any of steps i6 to i8 is affirmative, on the other hand, the process proceeds to step i10 to judge whether the apparatus is in test printing operation. If the apparatus is in test printing operation, step i11 judges whether the recording paper can be fed from the paper cassette 29, i.e., whether the paper cassette 29 is mounted in the lower housing 22 and the recording paper remains in the paper cassette 29. If this judgment is affirmative, step i12 judges whether the print key 229 shown in FIG. 1 is turned on. When the print key 229 is not on, the process is returned to step i1, repeating the setting operations at step i2 and/or step i3. If the judgment at step i11 is negative or step i12 is affirmative, the process returns to step i2. If the judgment at step i12 is negative, the process is returned to step i1. Where the judgment at step i10 is negative, the process proceeds to step i13 to perform an output process for a print ready signal RDY. Step i14 judges whether the next sheet of recording paper can be fed, and if it can be fed, step i15 judges whether the print start signal PRNT is established. When this judgment is affirmative, the process returns to step i1. If the judgment at steps i14 and i15 is negative, the process proceeds to step i2.

In other words, the operation at steps i1 to i8 and i10 to i15 is made executable at intervals of one millisecond by the operation of step i2. As a result, the operation of steps i3 and i4 is also performed at intervals of one millisecond.

If the judgment at step i8 is negative, step i9 cuts off power supply to the charger 81, and step i16 waits for a predetermined length of time following the cutoff of the charger 81, followed by step i17 to cut off the application of a bias voltage to the developing roller 76 as described in detail later. Step i18 judges whether the apparatus is in test printing, and if affirmative, step i19 judges whether the print key 229 shown in FIG. 1 is on or not. If this judgment is affirmative, step i20 judges whether the recording paper remains in the paper cassette 29 or the manual feed device 83. If this judgment is affirmative, the process proceeds to step i21 to drive the charger 81 as described in detail later thereby to continue the printing operation. After that, the process is returned to step i1.

In the case where the judgment at step i18 is negative, the process is passed to step i22 to judge whether the print start signal PRNT is established or not, and if this judgment is affirmative, step i23 judges whether the print ready signal RDY is valid. When this judgment is affirmative, step i24, as well as step i21, energizes the charger 81 to continue the printing operation, and the process is returned to step i1. If the judgment at steps i22 and i23 is negative, the process proceeds to step i25, so that the data indicating in test printing as in the status data sent to the image controller 130 is canceled. Step i26 stops the motor 126 in the same manner as step e22 in FIG. 37, and step i27 stops the horizontal synchronizing signal BD. Step i28 sets the standby temperature of the fixing unit 46 to about 100° C. as an example.

According to this embodiment, as described above, the operations of steps i1 to i8 and i10 to i15 shown in FIG. 44(*a*) are repeatedly performed during the period from when the recording paper is taken into the LED printer 21 from the paper cassette 29 or the manual feed device 83 until when the recording paper is discharged out of the apparatus after the printing operation. In other words, the electromagnetic unit 124 shown in FIG. 1 is energized to connect the clutch at the time t6 in FIG. 45 thereby to drive the paper feed roller 30. This driving operation, as shown in FIG. 46(1), covers two revolutions, as an example, during which the forward end of the recording paper in the paper cassette 29 moves through the paper feed roller 30 and the transport roller 37 and reaches the resist roller 38, where a paper loop is formed.

When the recording paper is detected by the sensor 39 at the time t7 in FIGS. 45 and 46, the engine controller 131 applies a control signal VSRQ at a predetermined time t8 as described later as shown in FIG. 46(3) requesting the image controller 130 to generate a page synchronizing signal VSY. In response to this, when the page synchronizing signal VSY is applied as shown in FIG. 46(4) from the image controller 130 at the time t9, the resist roller 38 is started at the time t10 as shown in FIG. 46(5).

After the resist roller 38 is started as shown in FIG. 46(5), the transfer discharger 100 is energized at the time t11 as shown in FIG. 47(5) to transfer the toner image on the photosensitive drum 77. Then, upon detection of the recording paper by the sensor 51 at the time t12 as shown in FIG. 47(6), the print standby stage is reached where another sheet of recording paper is allowed to be fed. After a lapse of a predetermined length of time following the detection of the trailing edge of the recording paper by the sensor 51 at the time t13, the apparatus enters a stationary state since the recording paper has been completely ejected.

The details of the operation at step i5 in FIG. 44(*a*) will be explained below.

Figure 52:
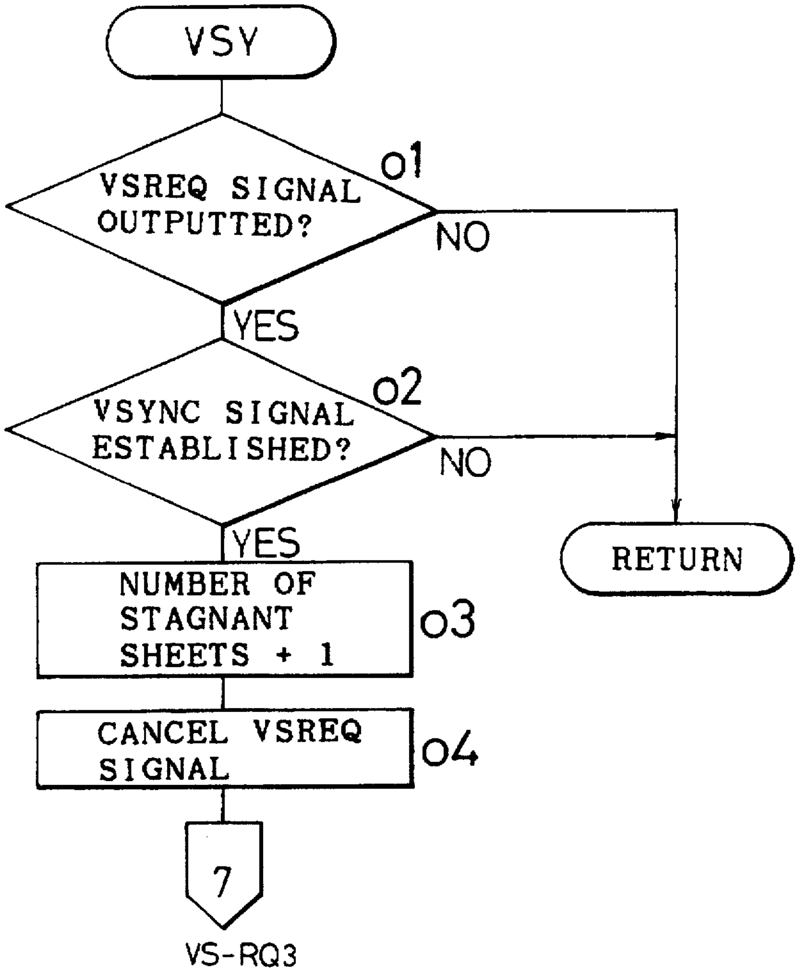
FIG. 52 is a flowchart showing the operation of step i5 in FIG. 44(*a*) in detail.

Step o1 in FIG. 52 judges whether the control signal VSRQ is produced, and if the signal VSRQ is produced, judges whether the page synchronizing signal VSY from the image controller 130 is established. If this judgment is affirmative, as shown in FIGS. 46 and 47, one sheet of recording paper starts to be printed in the LED printer 21. Step o3 counts up the number of sheets staying in the apparatus and adds one to this. Step o4 cancels the control signal VSRQ produced by the engine controller 131. After that, the process proceeds to step n6 in FIG. 51. If the judgment at steps o1 or o2 is negative, the process is returned to step i6 in FIG. 44(*a*).

More specifically, in the operation illustrated in FIG. 44, step i1 starts the general counters 215, 216 as the recording paper is introduced into the LED printer 21, and steps i3, i4 count the number of times this particular step is repeated at intervals of one millisecond. If this count value reaches the count value corresponding to each operation specified in Table 1, the particular operation is executed. By repeating this operation, various checks are made to confirm that the paper feed roller (electromagnetic unit 124) 30 is turned off, the sensor 39 is turned on, the control signal VSRQ is produced, the plunger 125 is turned off, the resist roller 38 is turned on, the test data is on, the transfer discharger 100 is turned on, the control flag PRQ is on, the sensor 51 is turned on, the test data is off, the sensor 39 is turned off, the resist roller 38 is turned off, the transfer discharge 100 is turned off, or the sensor 51 is turned off.

Figure 53:
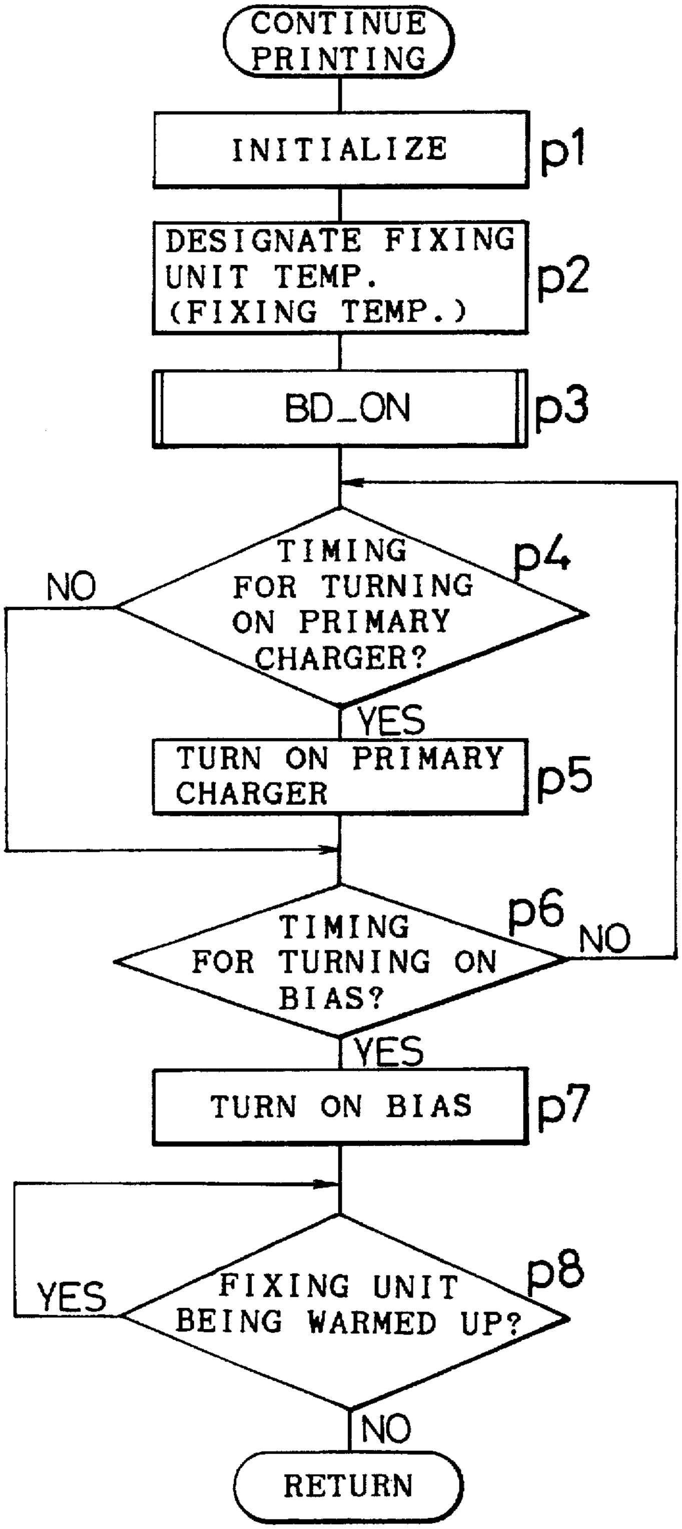
FIG. 53 is a flowchart showing the operation of step i21 in FIG. 44(*b*) in detail.

FIG. 53 is a flowchart showing the details of a continued printing operation at steps i21 and i24 in FIG. 44(*b*). Step p1 initializes the apparatus, and step p2 designates the temperature of the fixing unit 46. Step p3 causes the engine controller 131 to generate a horizontal synchronizing signal BD, and step p4 judges whether the timing has come for supplying power to the charger 81. If the timing has come, step p5 energizes the charger 81.

Step p6 judges whether the timing has come for applying a bias voltage to the developing roller 76. If the judgment is affirmative, step p7 applies a bias voltage to the developing roller 76, followed by step p8 to wait for the warm-up completion of the fixing unit 46. If the judgment at step p4 is negative, step p5 is ignored and the process proceeds to step p6. Step p6 repeats the operations of steps p4 to p6 until the timing comes for applying a bias voltage to the developing roller 76.

The continued printing operation illustrated in FIG. 53 is also executed at either step i21 or i24 in FIG. 44(*b*). Step i21 is for executing the test printing operation, and step i24 for executing the normal printing operation based on printing data.

Figure 54:
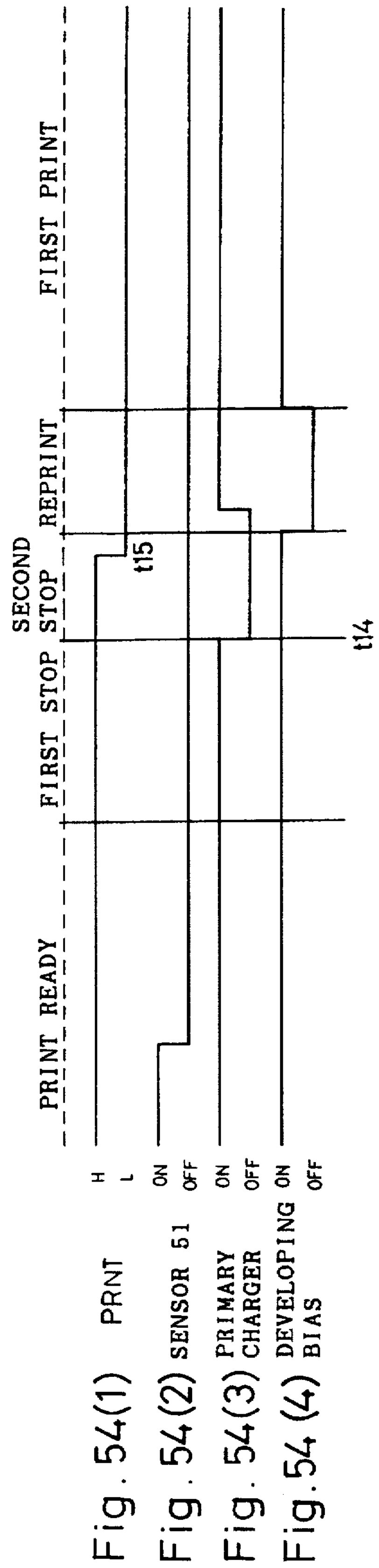
FIG. 54 is a timing chart for explaining the process from the printing operation to the printing stop operation according to an embodiment.

FIGS. 54 to 58 are timing charts showing the relationship between various signals used for the LED printer 21 according to this embodiment. FIGS. 54 to 55 show the signal states before and after the start to the end of the printing. In particular, FIG. 54 shows the slowest continuous printing mode in FIG. 23, and FIG. 55 shows the single printing mode stopping the operation for every sheet of recording paper. In FIG. 54, as shown specifically in FIG. 54(3), the charger 81 is turned off at the start time t14 of the second stop period. When the low-active print start signal PRNT is applied from the image controller 130 to the engine controller 131 at the time t15, however, the charger 81 is energized again to restart the printing operation.

In the case of FIG. 55, on the other hand, the operation is the same as that of FIG. 54 until the power applied to the charger 81 is cut off at the start timing of the second stop period. In FIG. 55, however, the print start signal PRNT is not applied during the second stop period, and the application of the bias voltage to the developing roller 76 is stopped at the time t16, with the result that the motor 126 is stopped and the fixing unit 46 is set at the standby temperature, thereby discontinuing the operation.

FIG. 56 is a timing chart showing the relationship between the print ready signal RDY and the control signals VSRQ, VSY, etc. In FIG. 56(1), the print ready signal RDY becomes low in level to a valid state, and the print start signal PRNT falls to low level at the time t17. Thereafter which the print ready signal RDY rises to high level and becomes invalid. The print ready signal RDY becomes valid again with a lapse of time T2 required for the fixing unit 46 to rise from the standby temperature of about 100° C. to the operating temperature of about 150° to 160° C. following the time t17, as an example. Subsequently, after a lapse of time T3 (say, 5.5 seconds) from the time t18 when the print start signal PRNT becomes valid again, the engine controller 131 applies the control signal VSRQ to the image controller 130 as shown in FIG. 56(3). In response, the image controller 130 validates the page synchronizing signal VSY at the time t19 as a low level signal, while printing data VD corresponding to one-page data to be printed is applied during the invalid periods of the page synchronizing signals VSY generated in time series as shown in FIG. 56(5).

FIG. 57 is a timing chart showing the relationship between the control signal VSRQ and the page synchronizing signal VSY. A shown in FIG. 57(1), with the low-active print start signal PRNT at low level, the engine controller 131 applies the control signal VSRQ to the image controller 131 at the time t20 as shown in FIG. 57(2). The image controller 130 produces the page synchronizing signal VSY at the time t21 to be effective during the valid period T4 (say, 10 to 400 ms) as shown in FIG. 57(3), and produces the printing data VD at the time t22 after a lapse of the time T5 (say, 300 ms or more) from the time t21 as shown in FIG. 57(4).

The engine controller 131, as shown in FIG. 57(5), generates also the horizontal synchronizing signal BD in every horizontal synchronizing period associated with printing operation.

FIG. 58 is a timing chart showing the relationship between the horizontal synchronizing signal BD and the printing data VD. As shown in FIG. 58(1), after the horizontal synchronizing signal BD which is low active in a cycle of T6 (say, 2116 μs) becomes valid at the time t23, upon a lapse of the time T7 (89 to 196.4 μs depending on the paper size), a line of printing data VD is applied to the engine controller 131 from the image controller 130, as shown in FIG. 58(2). The horizontal synchronizing signal BD becomes valid again after a lapse of a predetermined time following the complete application of a line of printing data VD from the image controller 130 to the engine controller 131.

(4j) One-millisecond interrupt

Figure 59A:
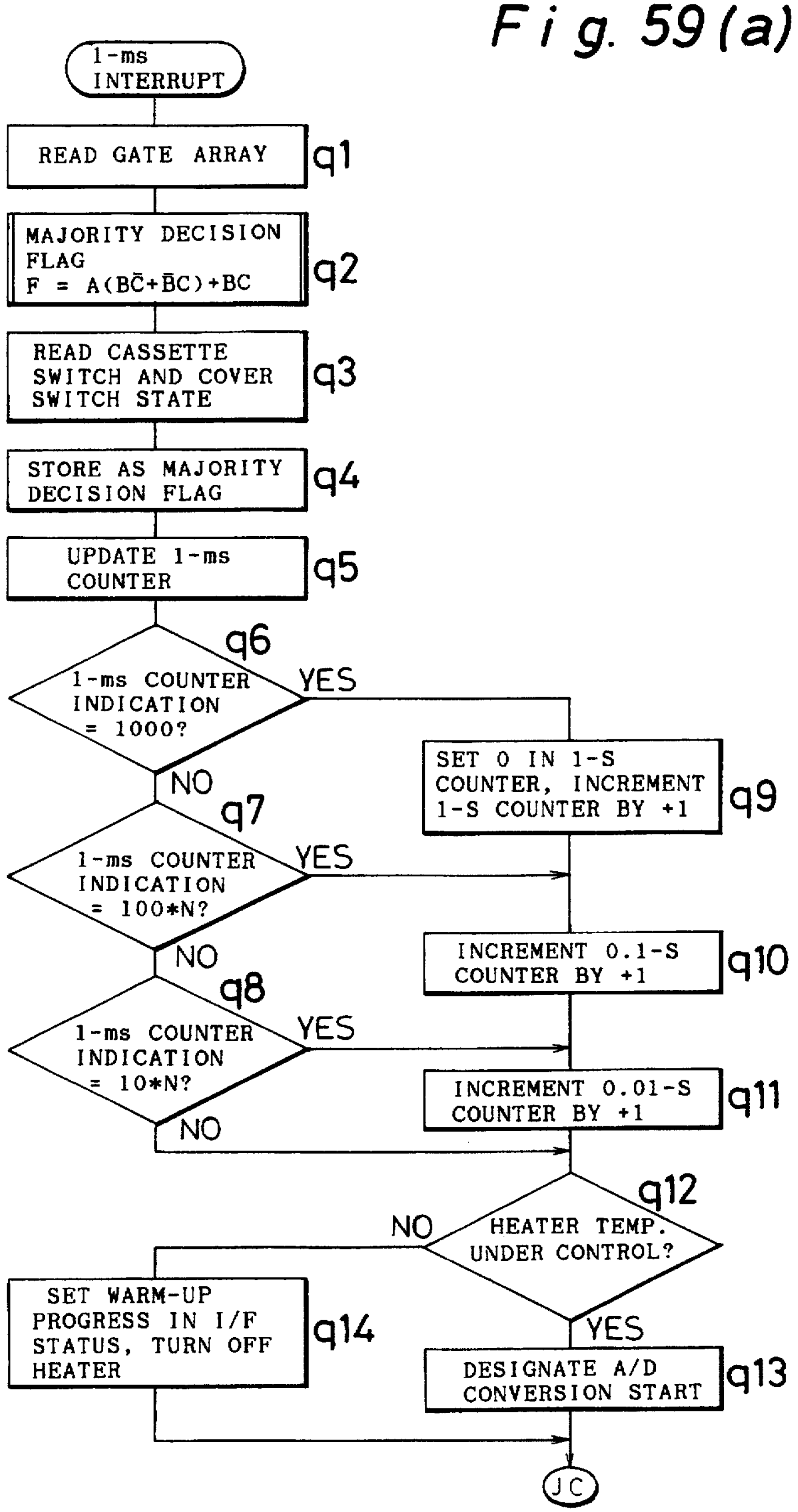
FIGS. 59(*a*), 59(*b*) and 59(*c*) are a flowchart for explaining the operation performed as an interrupt operation every one millisecond according to an embodiment.
Figure 59B:
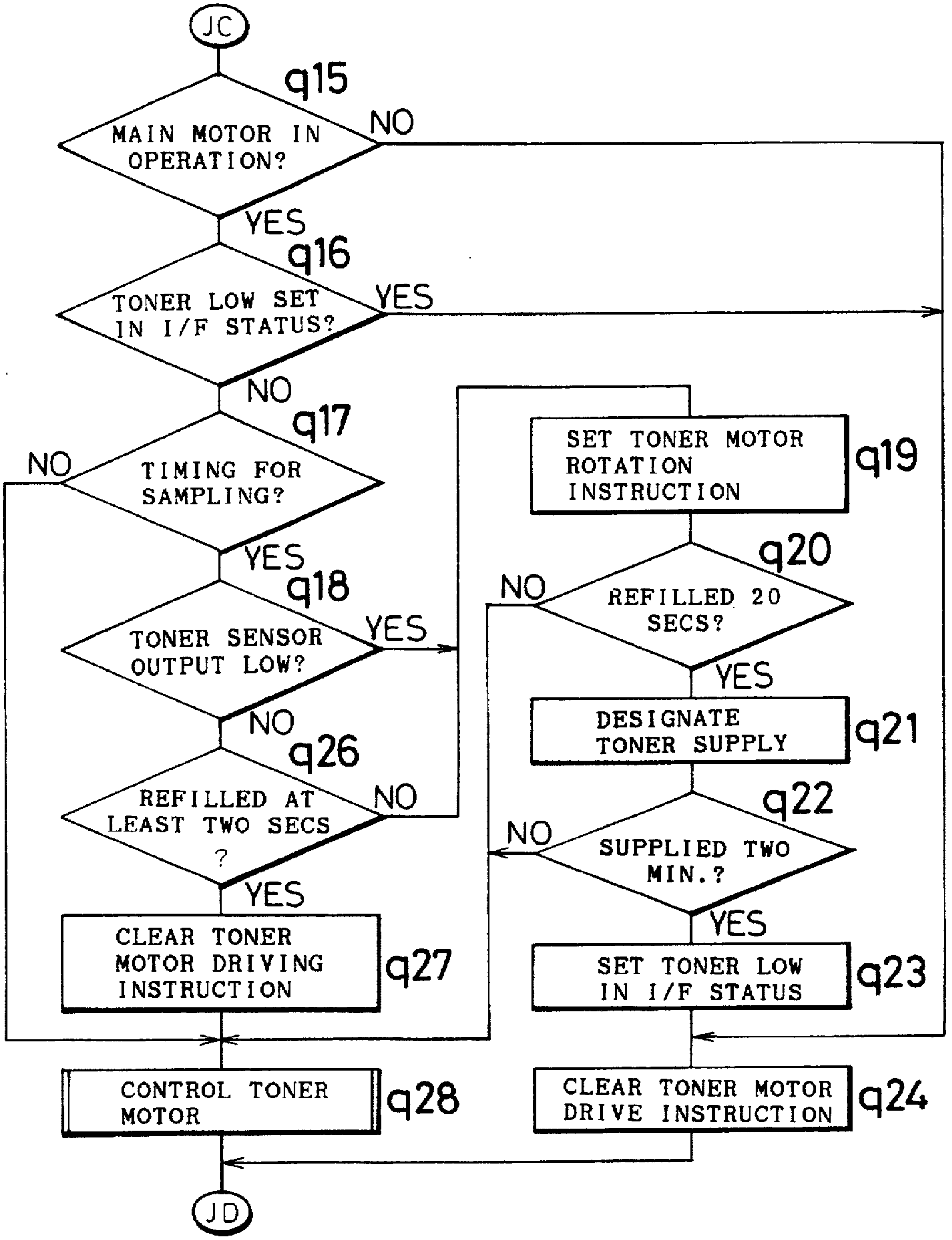
Figure 59:
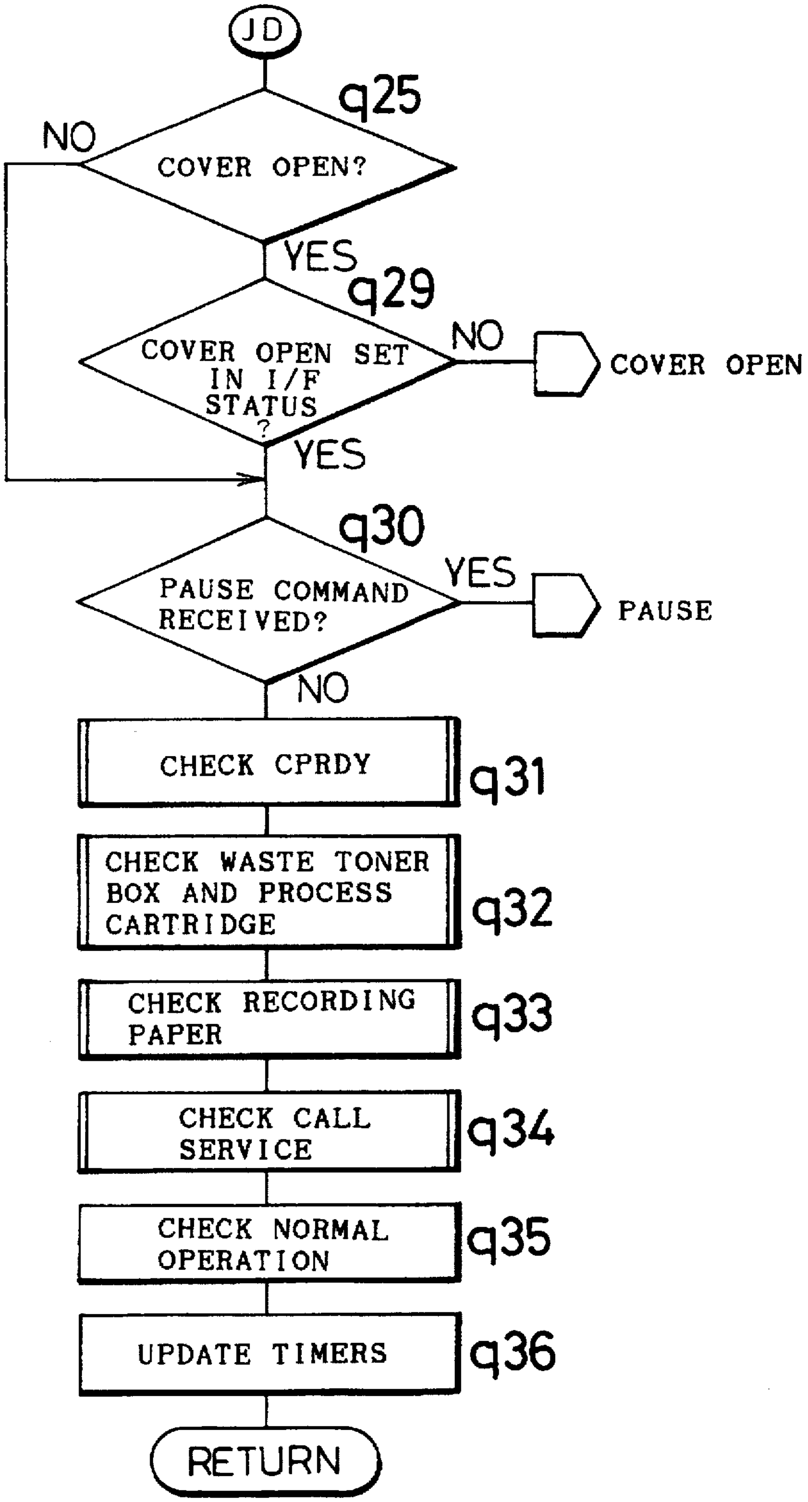

FIGS. 59(*a*), 59(*b*) and 59(*c*) are a flowchart for explaining the operation of the LED printing 21 according to this embodiment. Each flowchart of FIGS. 59(*a*) to 68 and 72 used as a reference to the explanation below represents a process to be executed every one millisecond at interruptions counted and set by the timer 132 of the engine controller 131 shown in FIG. 1 while the main program of the LED printer 21 is being executed. Thus, each flowchart is executed every one millisecond.

In the LED printer 21 according to this embodiment, as explained above, two sheets of recording paper at maximum is transportable in the apparatus at the same time. This is controlled by the count values in the first general counter 215 and the second general counter 216 shown in FIG. 1. Further, a number of counters are required for temperature control of the fixing unit 46, the toner supply operation in the process cartridge 73 and others. Providing such many counters by hardware requires a complicated circuit configuration. Even though such counters are provided independently by software, the memory capacity for performing the counting operation will be tremendously large, thereby preventing effective use of the memory.

In view of this, according to this embodiment, only the timer 132 is added as an independent counter except for the general counters 215, 216, and a step for counting the number of executions is included in the program executed every one-millisecond as explained above. In other words, the count value of this counting step attains the same function as a timer or a counter for making a count every one-millisecond.

More specifically, this embodiment where the counting step executes timing operations every one millisecond solves the above-mentioned problems, namely large or complicated configuration and inhibited use of memory, when the timing operation is executed by hardware or software on the basis of a clock signal of very high frequency from the oscillation circuit 228 shown in FIG. 1.

FIGS. 59(*a*), 59(*b*) and 59(*c*) are a flowchart showing the process executed by setting an interrupt every one-millisecond for the main program of the LED printer 21 described above. Step q1 effects the reading operation from the gate array 134 by the CPU 145 explained with reference to FIG. 12. Specifically, the outputs of the sensors 33, 39, 51, 87, etc. shown in FIG. 1 are read. Step q2 calculates a flag F used for a majority operation as explained later, as follows:

$$F=A*(B*/C+/B*C)+B*C$$

where A, B and C are three-times outputs of the sensors or switches, which are a logic level "1" or "0" respectively, and "/" means logical inversion.

Step q3 reads the on/off conditions of the cover switch 217 and the cassette switch 218 shown in FIG. 1. Step q4 stores the result of the majority operation as the flag F. Step q5 increases the count value by +1, i.e., step q5 is a timing step in units of one millisecond for incrementally counting up every time the flowchart of FIGS. 59(*a*), 59(*b*) and 59(*c*) is executed every one millisecond.

Step q6 judges whether the indicated value of the one-millisecond counter of step q5 is 1000 or not, for example. If the judgment is negative, step q7 judges whether the counter indication for the particular count step is 100*n (n: natural number). If the judgment at step q7 is negative, step q8 judges whether the counter indication at step q5 is 10*n. If this judgment is negative, the process proceeds to step q12 to judge whether the temperature control is ongoing for the heater 146 of the fixing unit 46. If the judgment at step q6 is affirmative, the process is passed to step q9 for setting zero at the 1-second counter provided in the memory and increasing the counter by an increment of 1 at the next process. Step q10 increases the 0.1-second counter by an increment of 1 in similar fashion, followed by step q11 to increase the 0.01-second counter by an increment of 1. After that, the process is passed to step q12. If the judgment at steps q7 and q8 is affirmative, the process is passed to steps q10 and q11 respectively.

In the case where the judgment at step q12 is affirmative, step q13 reads a temperature signal from the thermistor 147 for detecting the temperature of the heater 146 of the fixing unit 46 thereby to start an analog-to-digital conversion. After that, the process is passed to step q15. When the judgment at step q12 is negative and the heater 146 is at constant temperature, the process proceeds to step q14.

Step q14 causes the engine controller 131 to set data indicating that the heater 146 is at low temperature state in a status data sent to the image controller 130. The driving power supply to the heater 146 is thus stopped, and the process proceeds to step q15.

Steps q1 to q14 represent the temperature control of the heater 146, and step q15 and subsequent steps concern the toner supply in the process cartridge 73.

(6) Toner-refilling operation

Step q15 judges whether the motor 126 is running or not. If the motor 126 is running, step q16 judges whether the engine controller 131 has already set a toner-low data in the status data sent to the image controller 130. If the judgment is negative, q18 detects the toner concentration by the toner sensor 104. Step q17 judges whether the sampling timing (say, 0.35-second intervals) has come. If the judgment is affirmative, step q18 judges whether the output of the toner sensor 104 is at low level, i.e., whether the toner concentration near the agitator 78 in the process cartridge 73 is decreased or not.

When the judgment at step q18 is affirmative with the toner amount decreased in the process cartridge 73, step q19 causes the engine controller 131 to set a flag in a toner motor control routine thereby to drive the toner motor 214. Step q20 judges whether the toner supply from the toner box 74 is continued for 20 seconds. The 20-second toner refilling operation represents the toner refilling stage 203 shown in FIG. 25. If the judgment at step q20 is affirmative, the toner concentration in the process cartridge 73 is low in spite of the 20-second toner refilling operation, so that step q21 designates the toner supply condition. Thus the process proceeds to the toner supply stage 204 in FIG. 25.

In the toner supply stage, the operation of feeding new paper is stopped, and the toner supply roller 118 is driven with the operations which may consume toner suspended.

Step q22 judges whether the toner-supply operation has continued for two minutes, for example, under the above-mentioned condition. If the judgment at step q22 is affirmative, the toner concentration is still low in spite of the fact that toner has been supplied under the above-mentioned condition. Then step q23 causes the engine controller 131 to set a toner-low data in the status data to the image controller 130. More specifically, the process proceeds to the toner out stage 205 shown in FIG. 25. Accordingly, the display units 129 of the LED printer 21 in FIG. 1 indicates that either toner is out in the toner box 74 or the toner box 74 is not mounted on the process cartridge 73. Further, step q24 stops the toner motor 214.

In the case where step q15 judges that the motor 126 is stopped or where step q16 judges that the toner-low data has been set in the status data to the image controller 130 from the engine controller 131, then the process immediately proceeds to step q24, thereby clearing the operation flag of the toner motor 214. In the case where the judgment at step q18 is negative and the toner sensor 104 detects that the toner concentration in the process cartridge 73 is comparatively high, then step q26 judges whether the toner-refilling operation has continued for at least 2 seconds. If the judgment at step q26 is negative, the process proceeds to step q19, so that the above-mentioned process is repeated to continue the toner-supply operation.

In the case where the judgment at step q26 is affirmative, the process is passed to step q27, thereby clearing the flag for driving the toner motor 214. Then, the process proceeds to step q28. In the case where the judgment at steps q20 and q22 is negative, on the other hand, the process is passed to step q28. Step q28 drives or stops the toner motor 214 in accordance with the related flag that has been set or cleared at step q19, q27.

After completion of the process of steps q24 and q28, step q25 is executed, judging whether the upper cover 222 of the LED printer 21 shown in FIG. 3, i.e., the upper housing 23 is open or not. If the upper housing 23 is open, step q29 judges whether the data indicating the cover open state has been set in the status date sent from the engine controller 131 to the image controller 130. If the judgment is negative, the cover-open recovery process at step f7 and subsequent steps in FIG. 39 are executed. In the case where the judgment at step q29 is affirmative, on the other hand, step q30 judges whether the engine controller 131 has received a pause command from the image controller 130 on the basis of a key operation of the operator. If the judgment is affirmative, the pause state of the LED printer 21 is checked.

In the case where the judgment at step q30 is negative, step q31 confirms the condition of a communication ready signal CPRDY transmitted from the image controller 130. This communication ready signal CPRDY indicates that the image controller 130 is completely initialized and ready for communication of command and data signals from and to the engine controller 131. After that, step q32 checks whether the waste toner box 99 shown in FIG. 5 has been mounted on the process cartridge 73.

The processing of steps q29 and q30 will be described in detail below. In the case where the judgment at step q29 is negative, the cover-open check process in FIG. 39 is executed, and the process proceeds to the initialization step at step a6 in FIG. 28. If the judgment at step q30 is affirmative, on the other hand, a pause process is executed. After the output initialization of step f7 in FIG. 39, the engine controller 131 either executes the operation for driving the motor 126 or the toner motor 214 or waits in the pause state. The judgment as to whether this pause process is to be executed or not is made from step q1 again at a next one millisecond interrupt since the program shown FIG. 59 is executed every one millisecond.

In other words, in the LED printer 21, the engine controller 131 continues interruption every one-millisecond as shown in FIGS. 59(*a*), 59(*b*) and 59(*c*), while at the same time maintaining the stationary state of the driving mechanisms including the motor 126 and the toner motor 214 and the electrical mechanisms such as the fixing unit 46 and the charger 81. This pause state is canceled when the image controller 130 issues a pause cancel command to the engine controller 131 on the basis of a key operation by the operator.

When the engine controller 131 receives a pause cancel command, the judgment at step q30 becomes negative, and step q31 confirms the state of the communication ready signal CPRDY described above. This communication ready signal CPERDY indicates that the image controller 130 is completely initialized and ready for communication of command and status signals from and to the engine controller 131.

Step q32 checks whether the waste toner box 99 shown in FIGS. 4 and 5 is mounted by the detection switch 110 in FIG. 5. Also, whether the process cartridge 73 is mounted is detected by the cartridge sensor 230 of the holding member 66 of the process cartridge 73 shown in FIG. 5. Step q33 judges whether the paper cassette 29 shown in FIG. 2 is mounted by the size sensor 213 generating a signal relating to the size of recording paper. The presence of the recording paper in the paper cassette 29 is detected by the sensor 33, and that in the manual feed device 83 by the sensor 87. Step q34 confirms whether there is any request for a call service requiring a repair work by the maintenance personnel. Step q35 confirms whether the normal operation of the LED printer 21 is possible or not. Step q36 updates or increases the count value of the various timers by an increment of 1, for example.

(7) Checking waste toner box 99 and process cartridge 73

Figure 60:
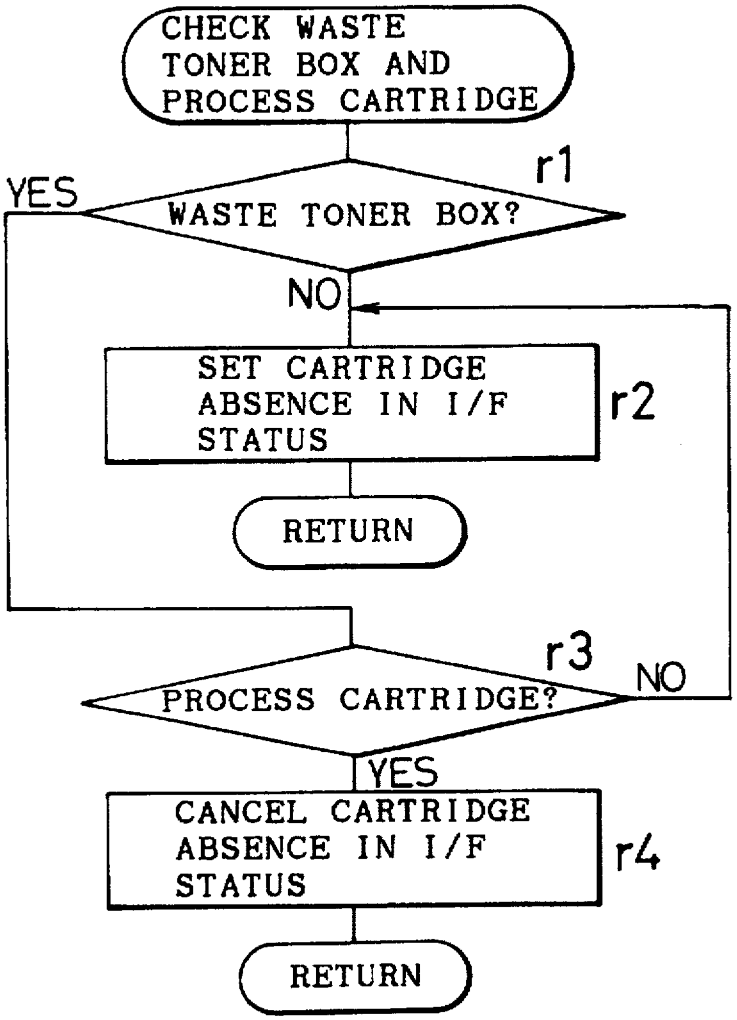
FIG. 60 is a flowchart for explaining the operation of step q32 in FIG. 59(*c*) in detail.

FIG. 60 is a flowchart showing the details of the step q32 in FIG. 59(*c*). In FIG. 60, step r1 judges whether the waste toner box 99 shown in FIGS. 4 and 5 is mounted by reading the state of the detection switch 110. If the waste toner box 99 is not mounted, step r2 sets data indicating the absence of the process cartridge 73 in the status data transmitted by the engine controller 131 to the image controller 130. The process then returns to the program of FIG. 59(*c*).

In the case where the judgment at step r1 is affirmative and the presence of the waste toner box is confirmed, then step r3 judges whether the process cartridge 73 is mounted or not. If the process cartridge 73 is not mounted, the process proceeds to step r2 to perform the above-mentioned process. If the process cartridge 73 is mounted, on the other hand, step r4 cancels the data indicating the absence of the process cartridge 73 in the status data transmitted from the engine controller 131 to the image controller 130. The process then returns to the program of FIG. 59(*c*).

(8) Checking recording paper

Figure 61:
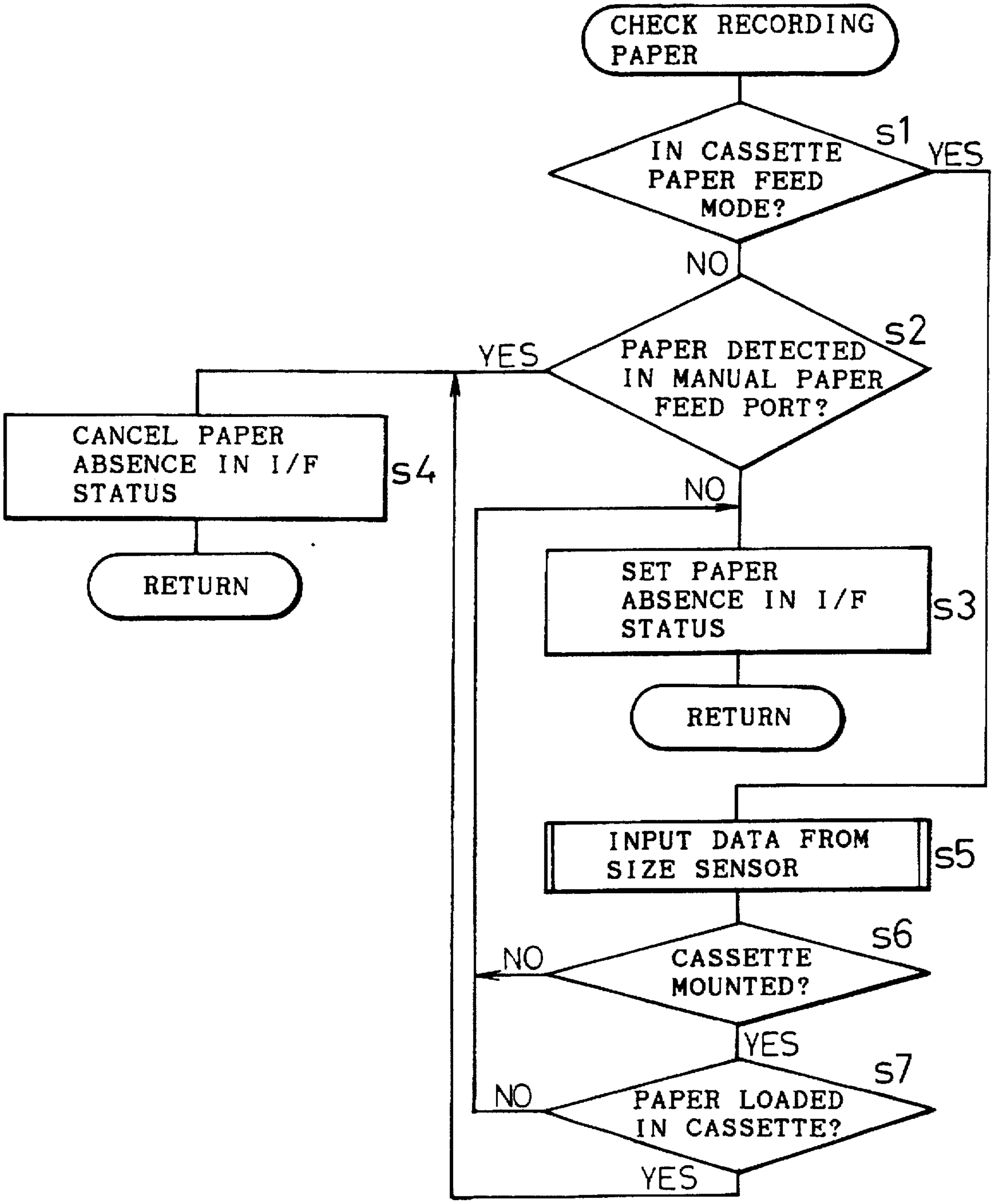
FIG. 61 is a flowchart for explaining the operation of step q33 in FIG. 59(*c*) in detail.

FIG. 61 is a flowchart showing the details of step q33 in FIG. 59(*c*). In FIG. 61, step s1 judges whether the paper feed mode of the LED printer 21 is the cassette feed mode or not. This judgment is made by reading whether the engine controller 131 has set or canceled the cassette feed mode flag. If the cassette feed mode flag is canceled, step s2 judges whether the recording paper is detected by the sensor 87 in the manual feed device 83. When this judgment is negative, step s3 sets data indicating the absence of the recording paper in the status data transmitted from the engine controller 131 to the image controller 130, and the process is returned to the program of FIG. 59(*c*).

In the case where the judgment at step s2 is affirmative, step s4 cancels the paper absence data in the status data sent to the image controller 130. If the judgment at step s1 is affirmative, step s5 sets corresponding data in the status data transmitted to the image controller 130 on the basis of the cassette size data read by the size sensor 213.

After that, step s6 judges whether any signal is applied from the size sensor 213 thereby judging whether the paper cassette 29 is mounted or not. If this judgment is affirmative, step s7 judges whether the recording paper is loaded in the paper cassette 29 by reading the output from the sensor 33. In the case where the judgment at steps s6 or s7 is negative, the process returns to step s3. If the judgment at step s7 is affirmative, on the other hand, the process is passed to step s4 to repeat the above-mentioned operation.

(9) Checking call service

Figure 62:
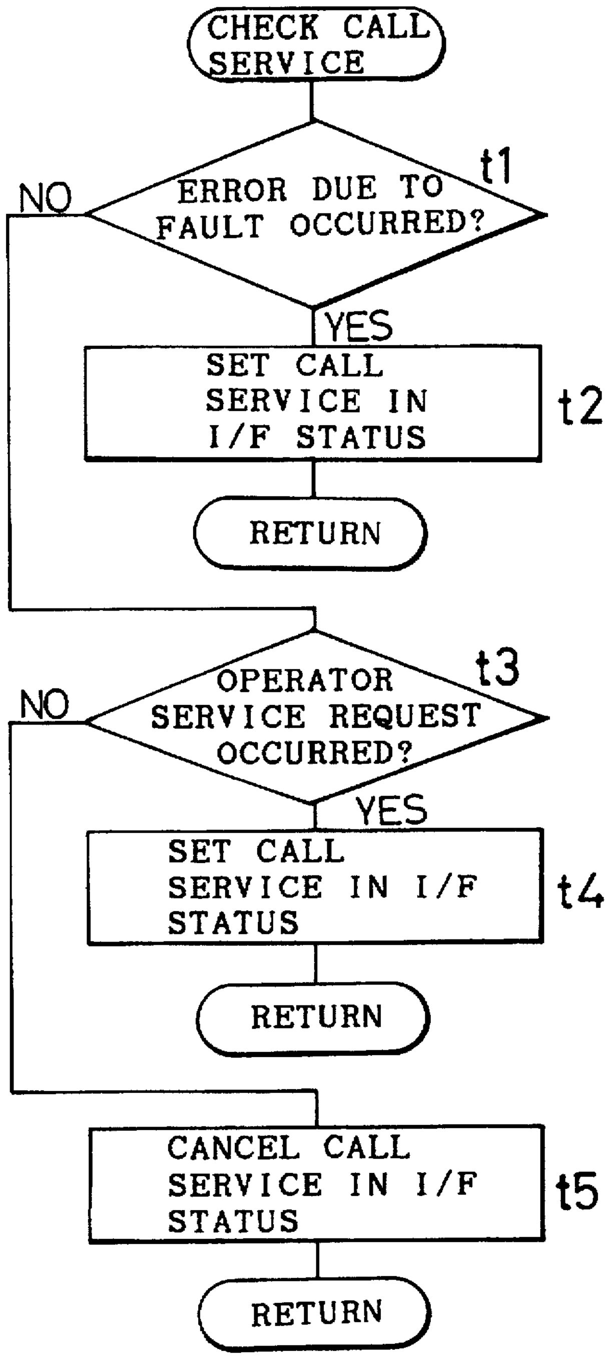
FIG. 62 is a flowchart for explaining the operation of step q34 in FIG. 59(*c*) in detail.

FIG. 62 is a flowchart showing the details of the step q34 in FIG. 59(*c*). In FIG. 62, step t1 judges whether a fault error has occurred in the LED printer 21. If this judgment is affirmative, step t2 sets a call service data for calling a maintenance specialist in the status data transmitted to the image controller 130, and the process returns to the program of FIG. 59(*c*). In the case where the judgment at step t1 is negative, on the other hand, step t3 judges whether a request for the operator service has occurred. If this judgment is affirmative, step t4, as well as step t2, sets a call service data in the status data transmitted to the image controller 130, and the process is returned to the program of FIG. 59(*c*). Where the judgment at step t3 is negative, on the other hand, the process proceeds to step t5, and cancels the call service data in the status data transmitted to the image controller 130, followed by returning to the program of FIG. 59(*c*).

(10) Checking normal operation

Figure 63:
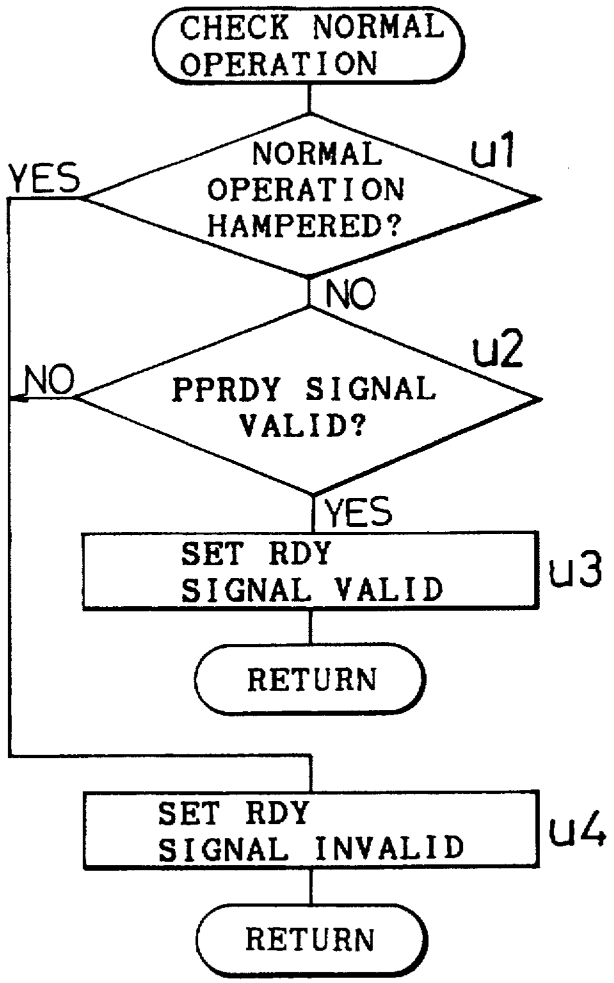
FIG. 63 is a flowchart for explaining the operation of step q35 in FIG. 59(*c*) in detail.

FIG. 63 is a flowchart showing the details of the step q35 in FIG. 59(*c*). In FIG. 63, step u1 judges whether the normal operating condition of the LED printer 21 is hampered. If the judgment is negative, step u2 judges whether the initialization over signal PPRDY mentioned above is valid or not. Specifically, where the initialization over signal PPRDY is a low-active signal, step u2 judges whether the particular signal is in a low level or not. When this judgment is affirmative, step u3 sets the print ready signal RDY to low level, for example, into a valid output state, and then the process returns to the program of FIG. 59(*c*).

In the case where the judgment at step u1 is affirmative or that at step u2 is negative, i.e., where the LED printer 21 is not adapted to perform normal operation or where the engine controller 131 is not completely initialized so that communication of command and status signals are not available between the engine controller 131 and the image controller 130, then the process proceeds to step u4, so that the print ready signal RDY is set to invalid state and transmitted to the image controller 130. After that, the process returns to the program of FIG. 59(*c*).

In the case where the print ready signal RDY is invalid in the processing on the image controller 130 side, a command is generated for requesting the engine controller 131 to send a status data in order to confirm the presence of a fault on the engine controller 131 side. In response to this request, the engine controller 131 sends out the status data to the image controller 130 to inform of the prevailing conditions. The image controller checks the status data for a call service data, and recognizes that the engine has a fault. Then the image controller issues a command requesting another more detailed status data, and the engine controller sends a status data indicating the contents of the fault. Upon recognition of the contents of the fault by these processings, the image controller informs the user of the fault by displaying an appropriate message on the display unit of the operating panel.

(11) Temperature control

Figure 64A:
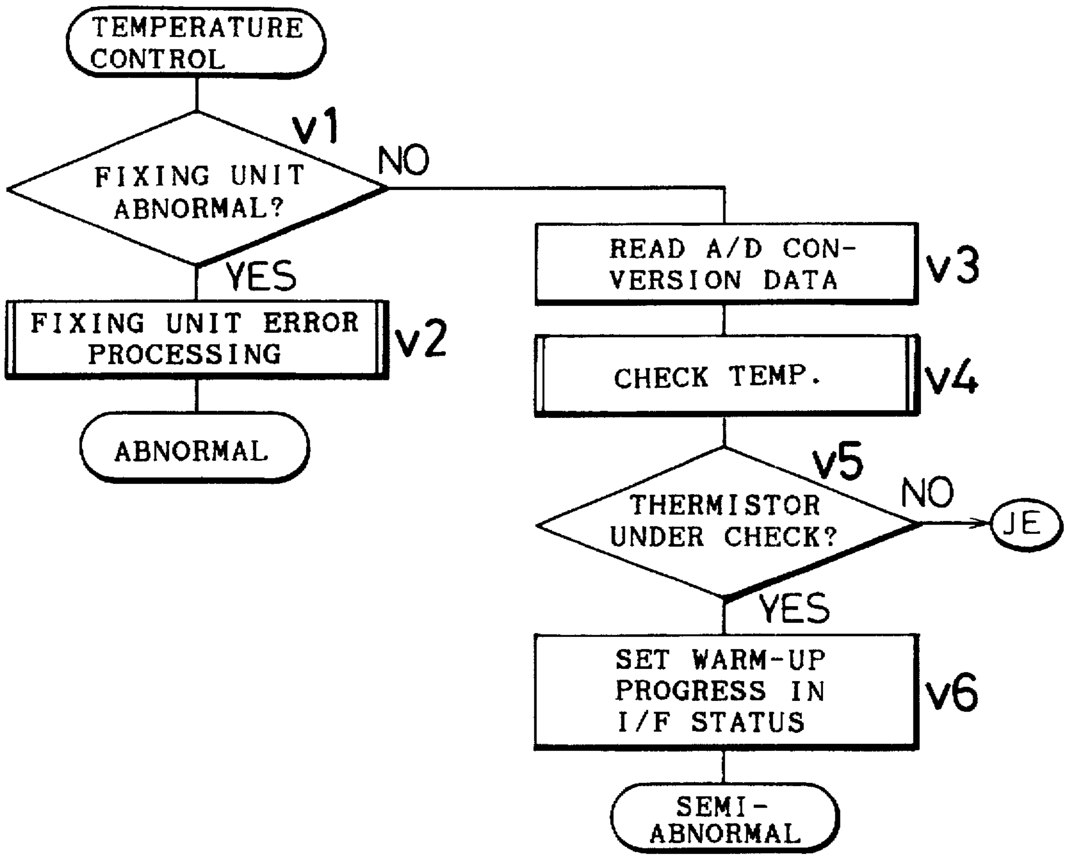
FIGS. 64(*a*), 64(*b*) and 64(*c*) are a flowchart for explaining the operation executed as an interrupt operation every one millisecond according to an embodiment.
Figure 64B:
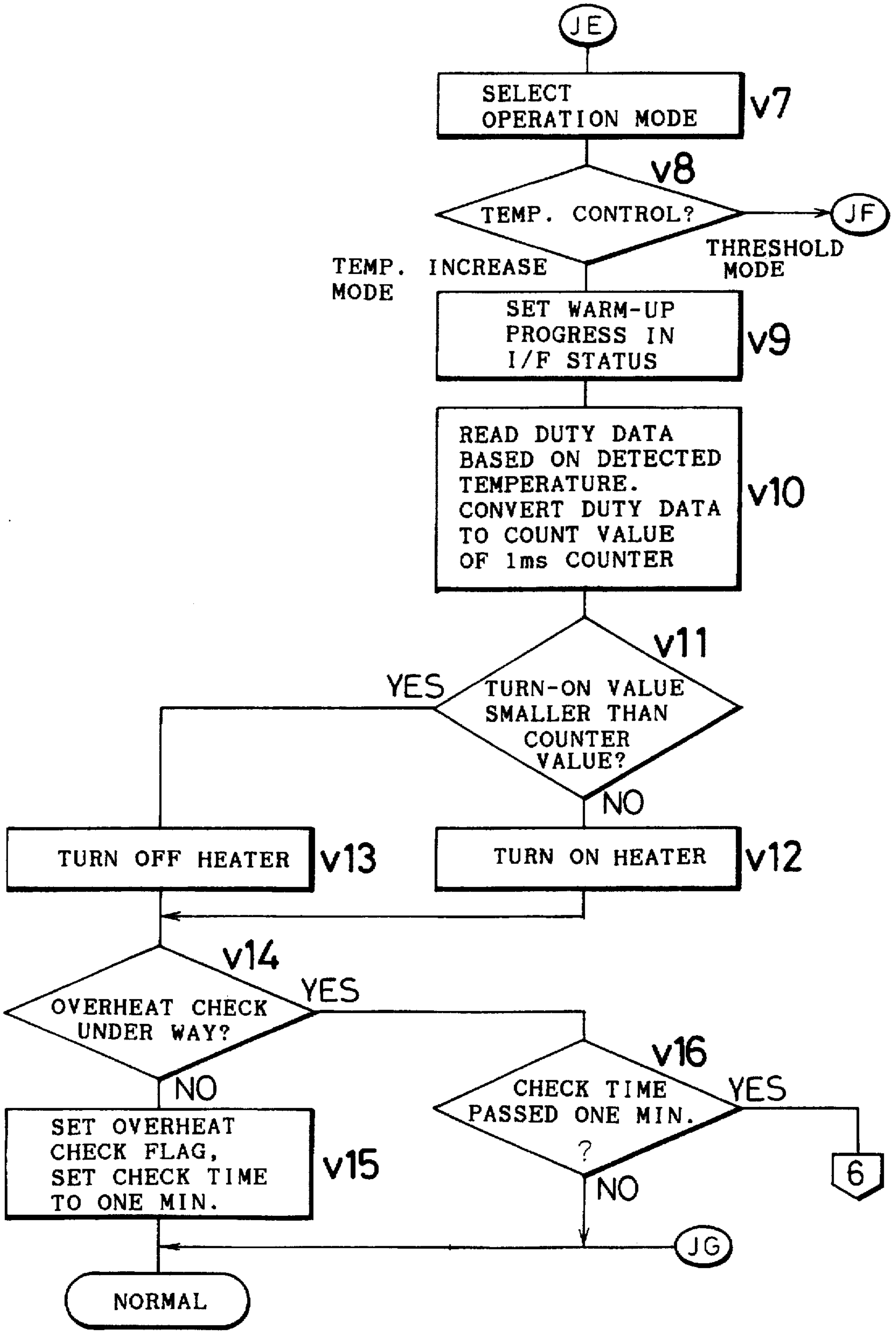
Figure 64C:
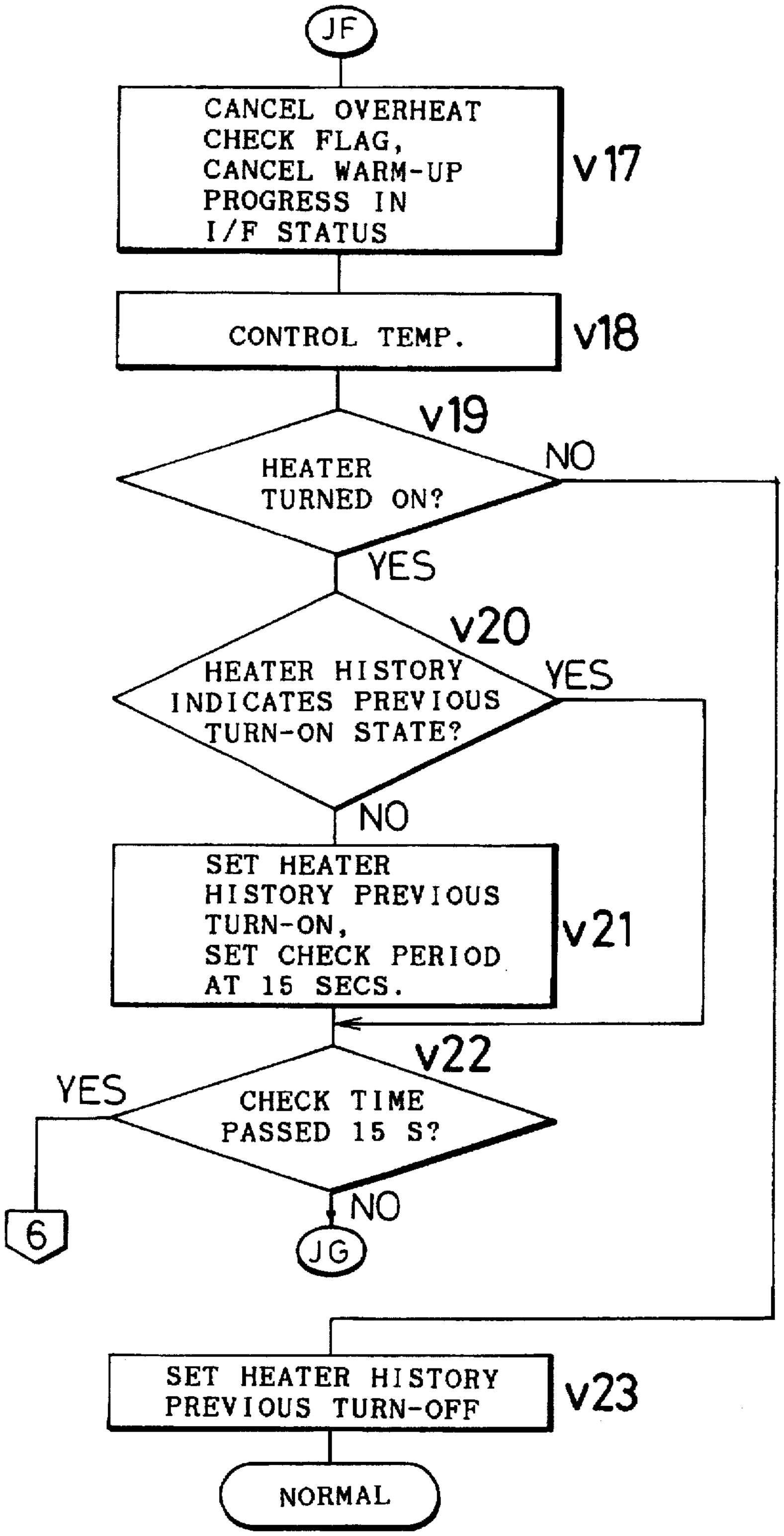

FIGS. 64(*a*), 64(*b*) and 64(*c*) are a flowchart showing an example of operation for controlling the temperature of the heater 146 of the fixing unit 46. This operation is also performed as an interrupt in the main processing shown in FIG. 28 every one millisecond on the basis of the timing operation of the timer 132 shown in FIG. 1. As explained with reference to FIGS. 12 and 13, the temperature control of the heater 146 of the fixing unit 46 in the LED printer 21 according to this embodiment is basically executed by the CPU 145. In the event that the CPU 145 becomes impossible to be reset even with the runaway-preventing operation of the watchdog timer circuit 151 explained with reference to FIG. 12, the CPU 145 is forcibly reset and the power supply to the heater 146 is cut off by an operation of an electrical circuit in order to prevent the case of fire or smoking due to an extreme temperature increase of the heater 146. FIGS. 64(*a*), 64(*b*) and 64(*c*) represent the operation to be performed when the CPU 145 is controllable.

FIGS. 12 and 13 are also referred to in the description that follows. In FIG. 64(*a*), step v1 judges whether the fixing unit 46 is in abnormal condition. This judgment is made on the basis of the result of the previous judgment on the normal/abnormal condition of the fixing unit 46 obtained in the manner described later as a result of the operation shown in FIGS. 64(*a*), 64(*b*) and 64(*c*) which is executed every one millisecond. If this judgment is affirmative, in step v2 the CPU 145 controls the gate array 134 to turn off the transistor 154 and the triac 156, thus stopping the driving power supply to the heater 146. After that, the process is passed to the operating program of FIGS. 59(*a*), 59(*b*) and 59(*c*).

In the case where the judgment at step v1 is negative, on the other hand, step v3 causes the CPU 145 to read a temperature signal from the thermistor 147 in the form of digital data converted at the digital-to-analog converter 150. Step v4 confirms the temperature range of the heater 146 described later with reference to FIGS. 65(*a*) and 65(*b*). Step v5 judges whether the thermistor 147 is being checked. If it is being checked, step v6 sets data indicating that the fixing unit 36 is being warmed up, in the status data transmitted from the engine controller 131 to the image controller 130, and the process returns to FIGS. 59(*a*), 59(*b*) and 59(*c*) regarding the condition as semi-abnormal.

In the case where the judgment at step v5 is negative, the process proceeds to step v7, in which the selection and setting are executed of two types of temperature control operation mode relating to the heater 146 of the fixing unit 46 described later with reference to FIG. 66. Step v8 confirms whether the selected temperature control mode at step v7 is the table mode described with reference to FIG. 26 or the threshold mode for holding a predetermined temperature including the standby temperature or the operating temperature described above. If the judgment at step v8 is the table mode, step v9 sets warm-up data indicating that the heater 146 is being increased in temperature, in the status data transmitted from the engine controller 131 to the image controller 130.

Step v10 reads corresponding duty data Dd from the duty table 163 shown in FIG. 13 on the basis of the temperature data obtained from the thermistor 147. Also, the duty data Dd thus read is converted into a count value on the one-millisecond counter incrementally counted up every one-millisecond shown at step q5 in FIG. 59(*a*). Step v11 compares the on value as a count value on the one-millisecond counter corresponding to the duty data Dd obtained at step v10 with the present count value of the one-millisecond counter, and judges whether the present count value is greater than the on value.

In other words, step v10 judges whether the operation of FIGS. 64(*a*), 64(*b*) and 64(*c*) has been repeated the number of times corresponding to the on value obtained by converting the duty data Dd read from the duty table 163 shown in FIG. 13 to a count value of the one-millisecond counter.

If the judgment at step v11 is negative, it indicates that the operation of FIGS. 64(*a*), 64(*b*) and 64(*c*) is not repeated until the above-mentioned on value has been reached, and the process proceeds to step v12, where the CPU 145 shown in FIG. 12 controls the gate array 134 to turn on the transistor 154 and turn on/off the triac 156 at a predetermined duty, thus driving the fixing unit 46. After that, the process proceeds to step v14. If the judgment at step v11 is affirmative, the operation of FIGS. 64(*a*), 64(*b*) and 64(*c*) is considered to have been executed more than the number of times corresponding to the on value, indicating that the driving period at a predetermined duty of the heater 146 has been completed. The process then is passed to step v13, where the CPU 145 turns off the triac 156 by controlling the gate array 134 thereby to stop the supply of the driving power to the heater 146. The process then proceeds to step v14.

Step v14 judges whether an overheat check is running to confirm whether the heater 146 has reached a critical temperature of, say, 210° C. beyond a safety limit. If the judgment is negative, step v15 causes the engine controller 131 to set a overheat check flag and one minute, for example, as a time required for check, and the process returns to FIG. 28 regarding the temperature of the heater 146 as normal. In the case where the operation in FIGS. 64(*a*), 64(*b*) and 64(*c*) is repeated a plurality of times with the overheat check executed, the judgment at step v14 becomes affirmative, and step v16 judges whether the check time of one minute has passed. If the check time has not passed, the heater 146 is regarded as normal, and the process returns to FIG. 53, thereby repeating the steps mentioned above. If the judgment at step v16 becomes affirmative, the error in the fixing unit 46 is recovered with reference to FIG. 68 as described later.

In the case where the temperature control of the fixing unit 46 is in threshold mode at step v18, the process proceeds to step v17, canceling the overheat check flag and the data indicating that the warm-up is proceeding in the data transmitted from the engine controller 131 to the image controller 130. Step v18 executes the temperature control operation of the heater 146 in the threshold mode described later with reference to FIG. 67. After that, the process is passed to step v19 to judge whether the heater 146 is being driven. If the judgment is affirmative, step v20 judges whether the state of the heater 146 was in an energizing state in the preceding operation during the process of FIG. 64 executed repeatedly every one-millisecond as described above.

In the case where the heater 146 was turned off in the preceding process, the process proceeds to step v21. Since the judgment at step v19 is affirmative, the energizing history of the heater 146 is set to the previous on state, and for example, 15 seconds is set as a check period of the heater 146. Then step v22 judges whether the check time of 15 seconds has passed or not. If the time has not yet passed, the process is returned to the process of FIG. 28, regarding the operation of the heater 146 as normal. If the judgment at step v20 is affirmative, the process proceeds to step v22 without executing step v21.

In this way, the operation shown in FIGS. 64(*a*), 64(*b*) and 64(*c*) is performed, and in the threshold mode, step v22 checks whether the check time of 15 seconds has passed. In the case where the energizing state of the heater 146 continues after a lapse of 15 seconds, the error processing operation of the fixing unit 46 shown in FIG. 68 described above is executed. If the heater 146 is off at step v19, on the other hand, step v23 sets the history data of the heater 146 to the previous off state, and the process returns to process of FIG. 28 regarding the operation of the heater 146 as normal.

Figure 65:
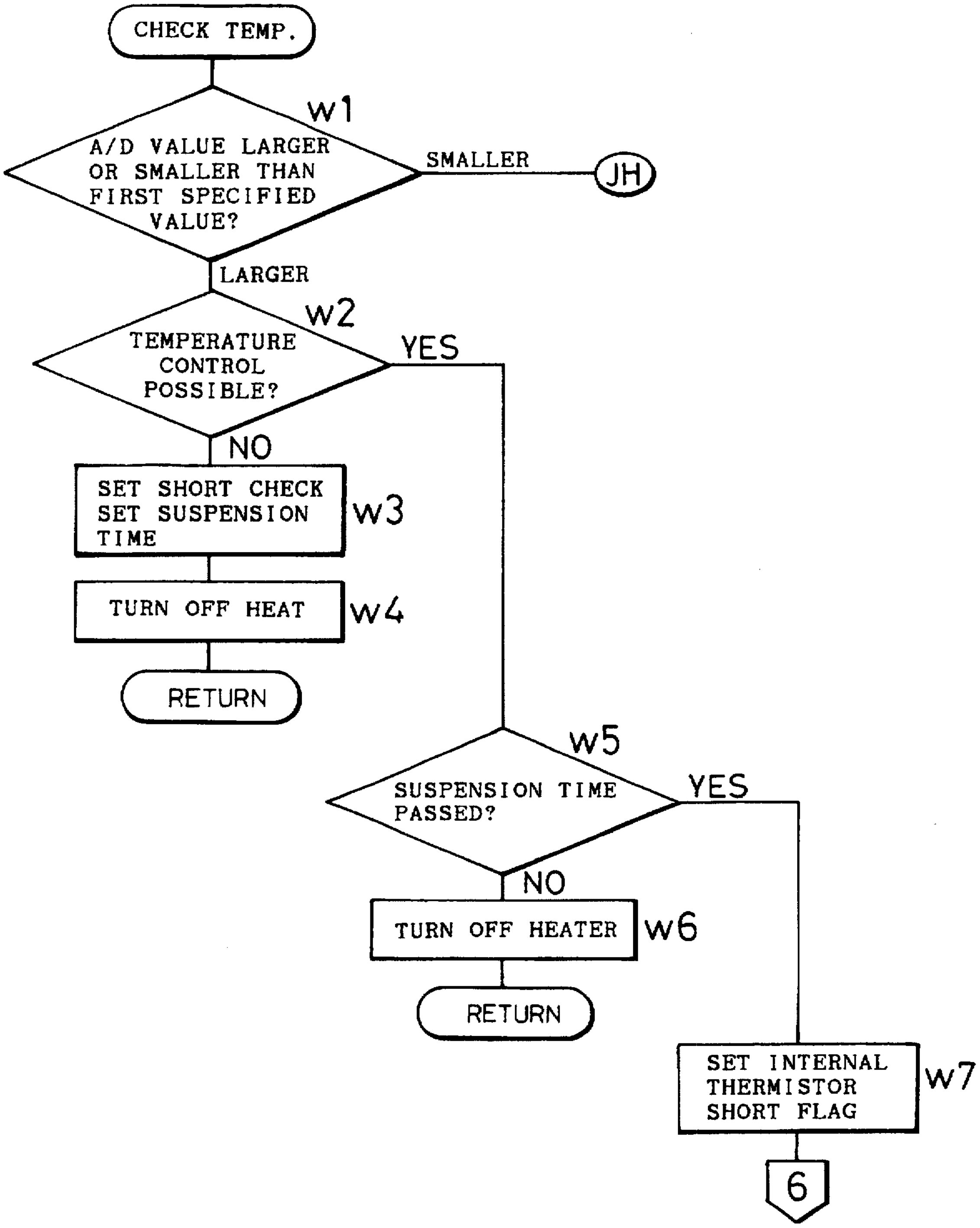
FIGS. 65 (*a*) and 65(*b*) are a flowchart for explaining the operation of step v4 in FIG. 64(*a*) in detail.
Figure 65:
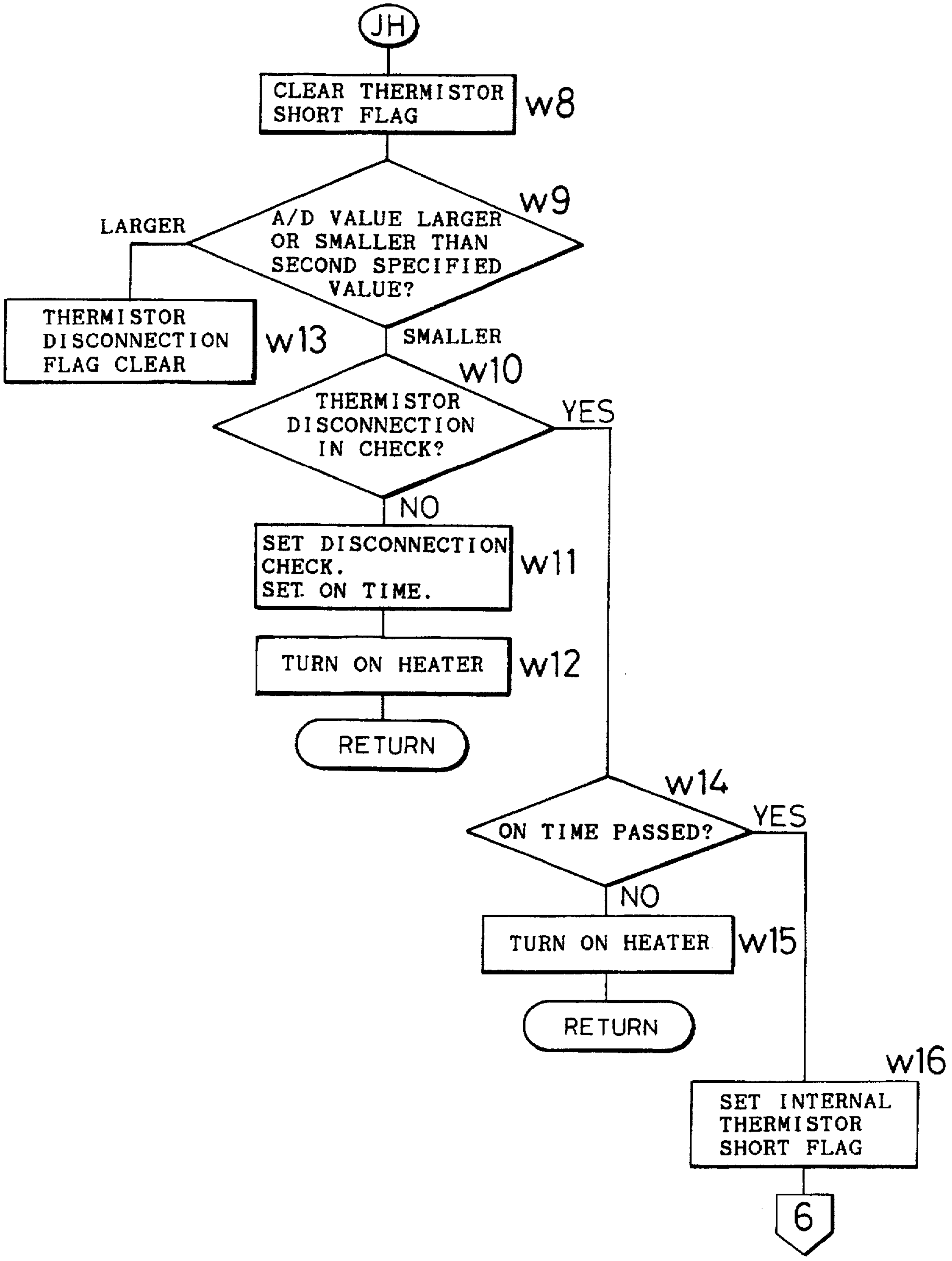

FIGS. 65(*a*) and 65(*b*) is a flowchart showing the details of the step v4 of FIG. 64(*a*). As described above, this process checks the temperature range of the heater 146. Step w1 determines which is greater between a digital temperature data and a first specified value, the digital temperature data being obtained by the analog-to-digital converter 150 form an analog temperature signal generated at the thermister 147 shown in FIG. 12, while the first specified value corresponding to the critical temperature of, say, 210 at which a fire may be induced as described above. In the case where the temperature data is greater than the first specified value, the process proceeds to step w2 to judge whether the temperature control of the heater 146 is executed or not. This judgment is made according to whether a short-circuit check of the thermistor 147 is being executed. When the operation of FIGS. 65(*a*) and 65(*b*) is executed for the first time, the short-circuit check of the thermistor 147 is not implemented, therefore the judgment at step w2 is negative. Step w3 causes the CPU 145 to set data indicating that the short-circuit check is ongoing, and sets a suspension time of, say, 25 seconds for the heater 146. Step w4 cuts off the driving power to the heater 146, and the process is passed to step v5 in FIG. 64(*a*).

On the second and subsequent operation of FIGS. 65(*a*) and 65(*b*), the thermistor 147 is under the short-circuit check, and the judgment at step w2 is affirmative, so that step w5 judges whether the suspension time of, say, 25 seconds has passed or not. If the suspension time has not yet passed, step w6 cuts off the driving power supply to the heater 146, proceeding to step v5 in FIG. 64(*a*). In this way, until the suspension time passes, the heater 146 is de-energized.

In the case where the judgment at step w5 is affirmative, when the temperature data is greater than the first specified value on the judgment at step w1, therefore, an increasing temperature data is obtained from the thermistor 147 in spite of the heater 146 being cut off as described above. As a result, step w7 sets a short-circuit flag indicating that the thermistor 147 is shorted, and executes the error processing step for the fixing unit 46 with reference to FIG. 68 as described later.

If the temperature data is smaller than the first specified value at step w1, the thermistor 147 correctly detects that the temperature of the heater 146 falls by cutting off the heater 146 at steps w4, w6. Step w8 thus clears the short-circuit flag of the thermistor 147, and determines which is greater between the temperature data described above and a second specified value providing a temperature data, say, 66° C. associated with disconnection of the thermistor 147.

In the case where the temperature data is smaller than the second specified value at step w9, step w10 judges whether the thermistor 147 is being checked for disconnection. If the operation of FIGS. 65(*a*) and 65(*b*) is performed for the first time with the temperature data smaller than both the first and second specified values, the disconnection check of the thermistor 147 is not executed before reaching step w10. If the judgment at step w10 is negative, therefore, step w11 causes the CPU 145 to set data indicating that the thermistor 147 is being checked for disconnection, setting an on time of, say, 25 seconds for the check.

Step w12 energizes the fixing unit 46, followed by returning to step v5 in FIG. 64(*a*). In the case where the temperature data based on the temperature signal from the thermistor 147 is greater than the second specified value at step w9, it indicates that the thermistor 147 is operating normally. Step w13 clears the thermistor-disconnection flag, and the process returns to step v5 in FIG. 64(*a*) regarding the operation of the thermistor 147 as normal.

In the event that step w10 judges that the thermistor 147 is being checked for disconnection, step w14 judges whether the on time set at step w11 has passed. If the on time has not yet passed, step w15 energizes the heater 146, and the process returns to step v5. If the on time has passed, it indicates that thermistor 147 produces no temperature data indicating a temperature increase in spite of the control for energizing the heater 146 over 25 seconds. Accordingly, step w16 sets the short-circuit flag of the thermistor 147, and the process proceeds to the error-processing step for the fixing unit 46 described later with reference to FIG. 68.

Figure 66:
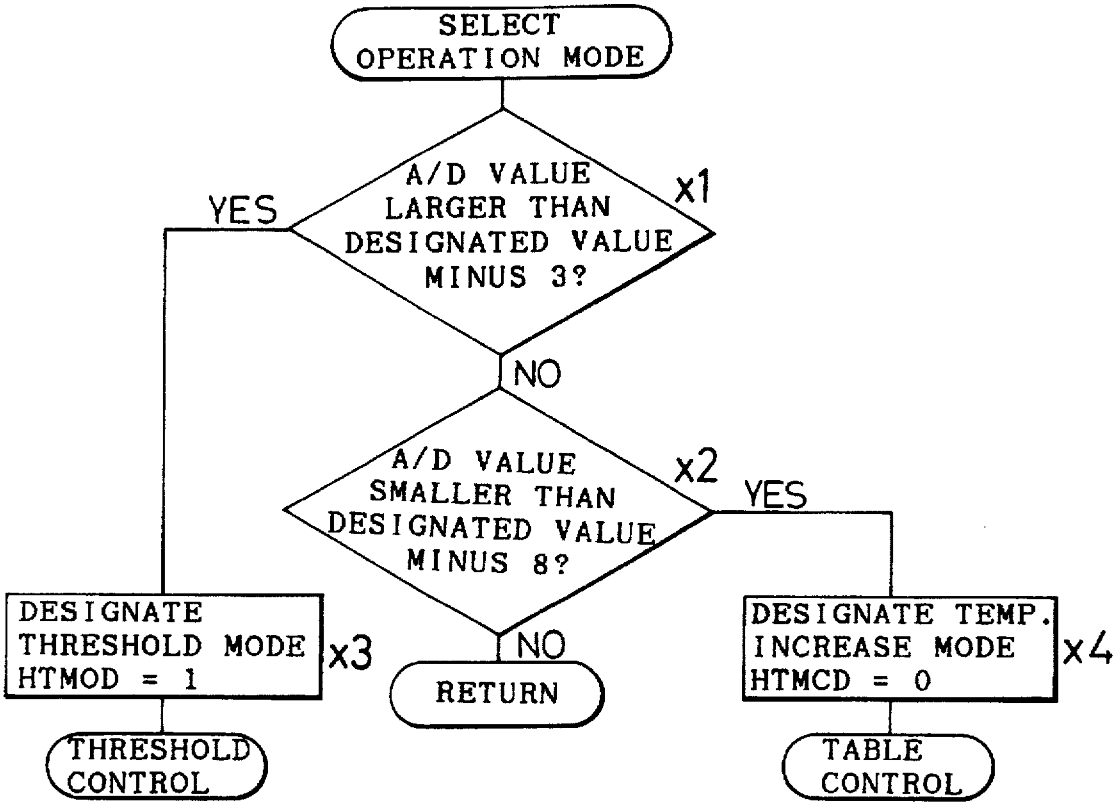
FIG. 66 is a flowchart for explaining the operation of step v7 in FIG. 64(*b*) in detail.

FIG. 66 is a flowchart showing the details of the step v7 for determining whether the temperature control of the heater 146 should be made in the threshold mode or the table mode as described above. Step x1 judges whether the temperature data based on the temperature signal from the thermistor 147 is a specified value, say 170° C., minus 3 or higher. If the temperature data is lower than the designated value of temperature minus 3, step x2 judges whether the temperature data is lower than the designated value of temperature minus 8. If the temperature data is higher than the designated value of temperature minus 8, the process returns to step v8 shown in FIG. 64(*b*), thereby continuing the operation mode for the present temperature control.

In the case where the temperature data is higher than the designated value of temperature minus 3, it indicates that the temperature of the heater 146 is almost the designated value, and the judgment at step x1 is affirmative. As a result, step x3 designates the threshold mode, with the process proceeding to step v8 as shown in FIG. 64(*b*). The temperature control in the threshold mode is executed for controlling the energization time of the heater 146 in such a manner that the temperature of the heater 146 converges to the designated value. In the case where the temperature data is the designated value of temperature minus 8, the heater 146 is at about the room temperature immediately after power is thrown in against the waiting temperature or about the waiting temperature against the operating temperature. The judgment at step x2 is affirmative, and the process proceeds to step x4, where the temperature increase mode is designated for controlling the conduction time of the heater 146 on the basis of the duty table 163 explained with reference to FIG. 13. The process then proceeds to step v8 shown in FIG. 64(*b*), thereby controlling the temperature in the temperature-increase mode for preventing the overshoot with the temperature increasing.

Figure 67:
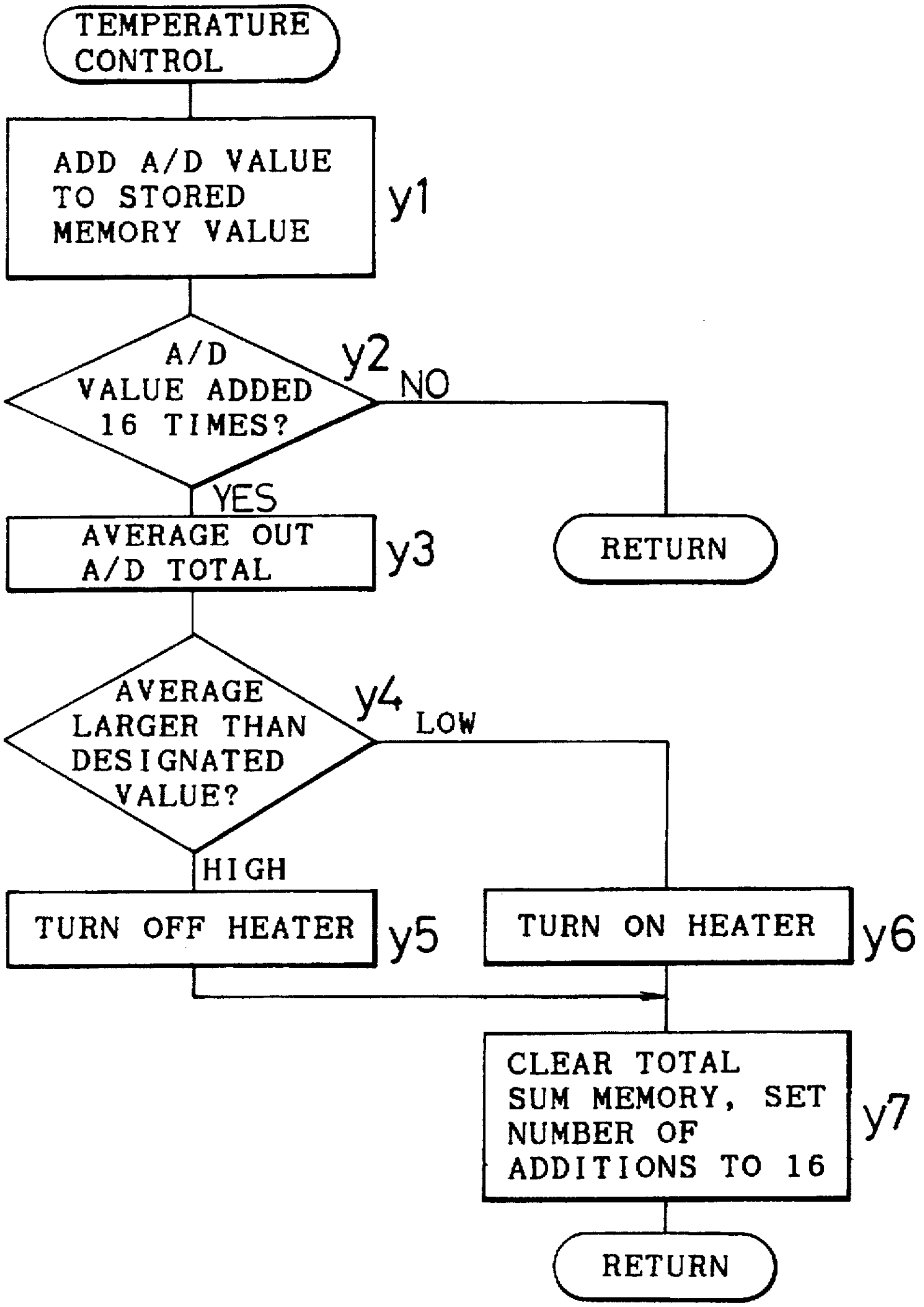
FIG. 67 is a flowchart for explaining the operation of step v18 in FIG. 64(*c*) in detail.

FIG. 67 is a flowchart showing the details of the step v18 in FIG. 64(*c*). According to this embodiment, in employing the temperature data in a digitized form of the temperature signal from the thermistor 147 for the purpose of temperature control, the temperature data is accumulated every time the operation of FIGS. 64(*a*), 64(*b*) and 64(*c*) is performed at one-millisecond intervals. The average of sixteen values is employed, for example. In other words, step y1 shown in FIG. 67 adds the temperature data from the analog-to-digital converter 150 to the temperature data read at the preceding process of FIG. 67, followed by step y2 for judging whether the addition has been made sixteen times. If the judgment is negative, the process proceeds to step v19 in FIG. 64(*c*).

In the case where the addition of the temperature data is made sixteen times and the judgment at step y2 is affirmative, step y3 averages the sixteen temperature data, and by step y4 determines which is greater between the average value and a temperature value indicated by the CPU 145. If the average value is greater than the indicated value, step y5 cuts off power to the heater 146, and the process proceeds to step y7. In the case where the average value is smaller than the indicated value, on the other hand, step y6 supplies power to the heater 146, step y7 clears the total sum memory and sets the number of additions at sixteen anew, and the process proceeds to step v19.

The reason for adding the temperature data sixteen times in the operation of FIG. 67 will be explained as follows. As shown in FIG. 12, the power supplied to the heater 146 is derived from the commercial power supply of, say 60 Hz, 100 VAC with a period of 1/60 (=0.017), i.e., 17 msec. More specifically, executing the operation shown in FIG. 67 every one millisecond and averaging the accumulated sixteen data requires the time of about 1/60 seconds. In other words, the operation of supplying or cutting off power to the heater 146 at steps y5 and y6 can be executed at a zero-cross timing with the 60 Hz, 100 V commercial AC power supply.

FIG. 68 is a flowchart showing the details of the error processing of the fixing unit 46 explained with reference to FIG. 64(*a*). In FIG. 68, step z1 sets in the status data transmitted from the engine controller 131 to the image controller 130 a data indicating that the operation of the fixing unit 46 is abnormal, and a call service data indicating that the abnormal condition of the fixing unit 46 is so serious that a special maintenance personnel is required. Step z2 cuts off power to the heater 146 and clears the flag indicating that the temperature is being controlled of the heater 146 in the engine controller 131. Step z3 executes the output initialization referenced at steps f3 and f7 in FIG. 39. Then the LED printer 21 enters the standby stage.

Figure 71:
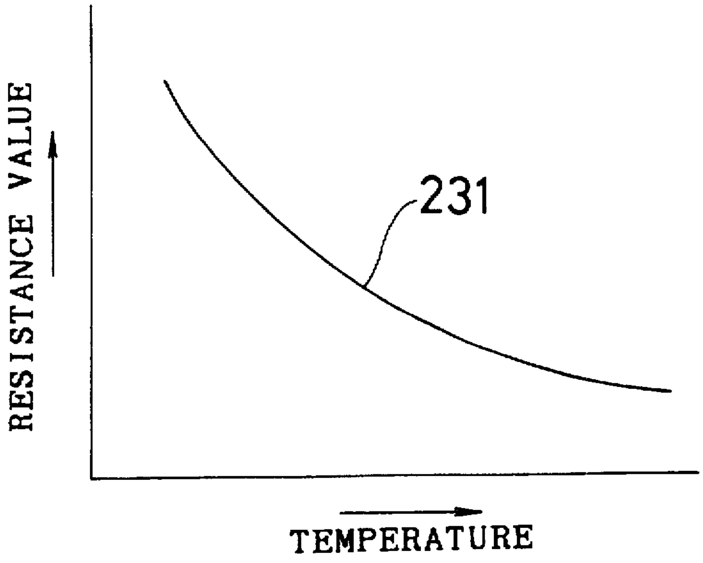
FIG. 71 is graph for explaining the characteristics of a thermistor 147.

FIG. 69 is a timing chart relating to the operation of the CPU 145 is shown in FIG. 12. FIG. 70 is a graph showing the temperature control of the fixing unit 46 of the LED printer 21. FIG. 71 is a graph showing the characteristics of the thermistor 147 shown in FIG. 12.

In the LED printer 21 according to this embodiment, the temperature of the fixing unit 46 is controlled by software. In the case where the CPU 145 is in a runaway condition, for example, software control becomes impossible, so that the heater 146 built in the heating roller 49 of the fixing unit 46 may be abnormally increased in temperature, often leading to a thermal damage or smoking or a fire. The LED printer 21 according to this embodiment, therefore, detects the temperature of the heater 146 with a configuration shown in FIG. 12, and in the case where an abnormally high temperature is detected, the CPU 145 is forcibly reset by a circuit operation.

The CPU 145 normally applies signals periods shown in FIG. 69(1) to the watchdog timer circuit 151, and the watchdog timer circuit 151 continues to apply a high-level signal to the CPU 145 as an example in FIG. 69(2). The runaway of the CPU 145, in the form of a missing signal in FIG. 69(1), is detected by the watchdog timer circuit 151. The watchdog timer circuit 151 generates a reset signal with the signal of FIG. 69(2) turned low, thereby stopping the driving of the CPU 145, i.e., the engine controller 131. In the case where the signals from the CPU 145 are irregular as shown in FIG. 69(3), however, such a runaway of the CPU 145 cannot be detected by the watchdog timer circuit 151.

As far as the output of the thermistor 147 falls within the proper temperature range as shown in FIG. 70(1), the comparator 152 produces a high-level signal and the transistors 159 and 160 are energized. As a result, a high-level bias voltage is applied to the transistors 161, 154, so that the control signal from the gate array 134 under the control of the CPU 145 is applied to the transistor 161 or the transistor 154, thereby driving the motor 126 or the heater 146.

When the output of the thermistor 147 exceeds an upper limit indicated by a reference voltage generating circuit 153, such as 170° C. as an example of the proper temperature, as shown in FIG. 70(1), the comparator 152 produces a low-level signal, to cut off the transistors 159, 160, and forcibly reset the CPU 145 and the gate array 134 by the reset signal RS shown in FIG. 70(3). As a result, the transistor 161, 154 are turned off, the motor 126 is stopped, and the driving power supply to the heater 146 is suspended. Thus the temperature falls as shown in FIG. 70(2).

More specifically, in the LED printer 21 having the above-mentioned configuration, when the CPU 145 runs away and the heater 146 increases to an abnormal high temperature, the CPU 145 and the gate array 134 are reset and the heater 146 is deactivated before the fuse 157 burns out. Therefore, as compared with the case where the heater 146 is program controlled only by the engine controller 131, it is possible to prevent a thermal damage, smoking or fire which otherwise might be caused by the overheated heater 146.

In the temperature control operation described above, the temperature-resistance characteristic of the thermistor 147 is given as a monotonous decreasing curve which is convex downward as shown by the line 231 in FIG. 71.

Figure 72:
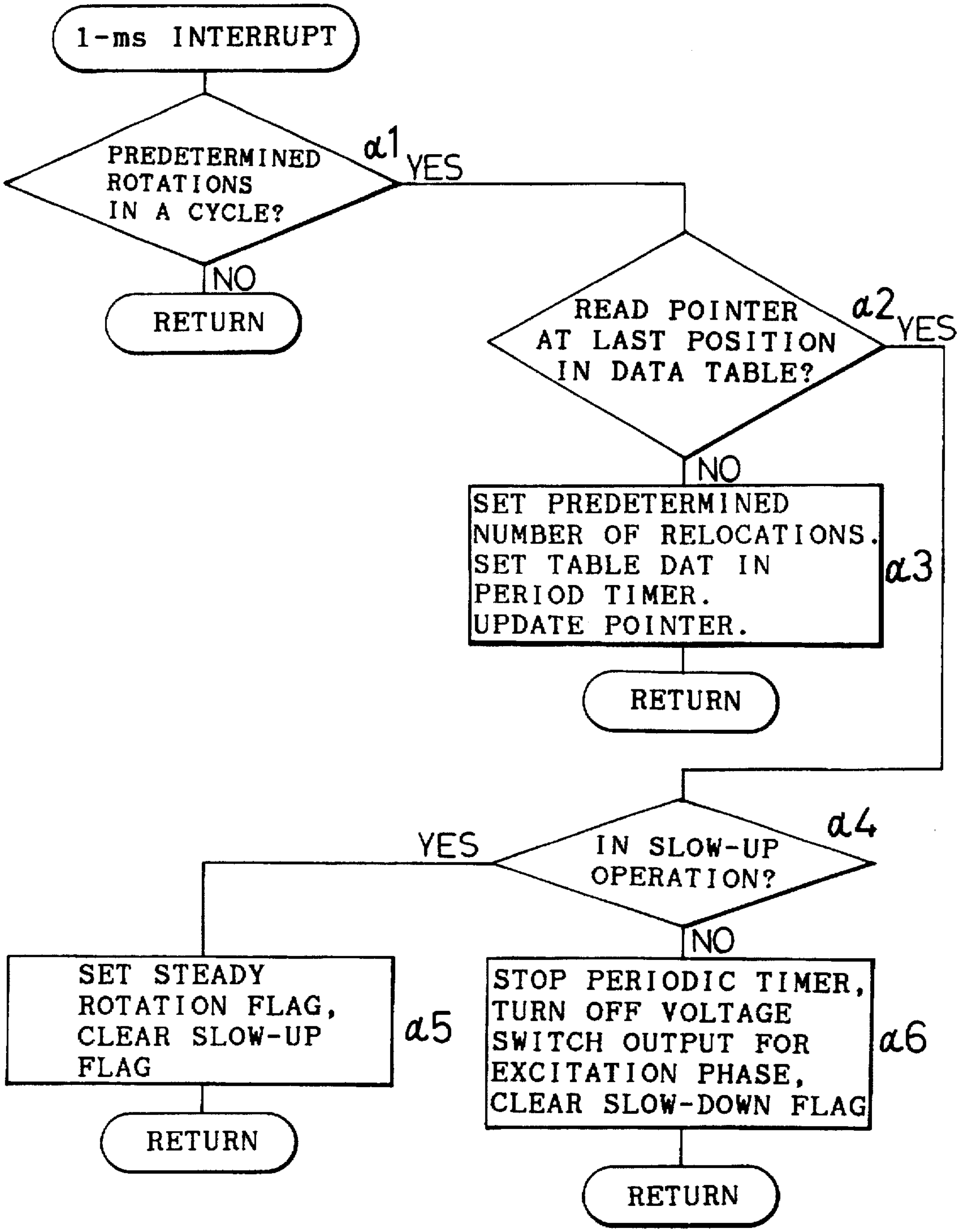
FIG. 72 is a flowchart showing an example of the operation executed as an interrupt operation every one millisecond.
Figure 73:
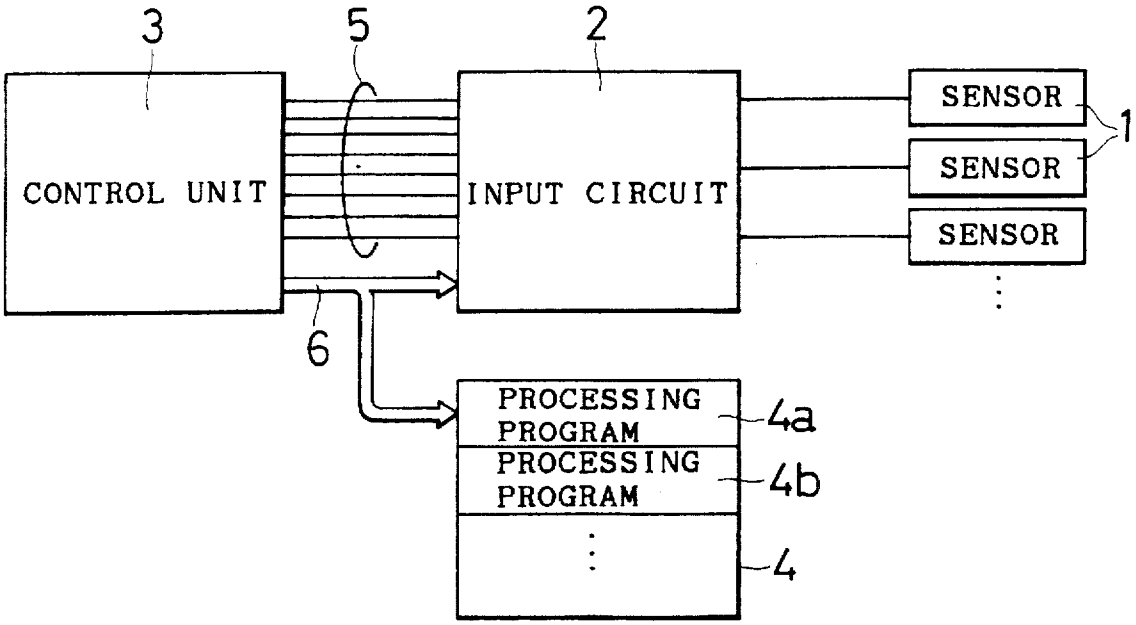
Fig. 73 Prior Art
FIG. 73 is a block diagram showing a conventional art where signals are introduced from a number of sensors.
Figure 74:
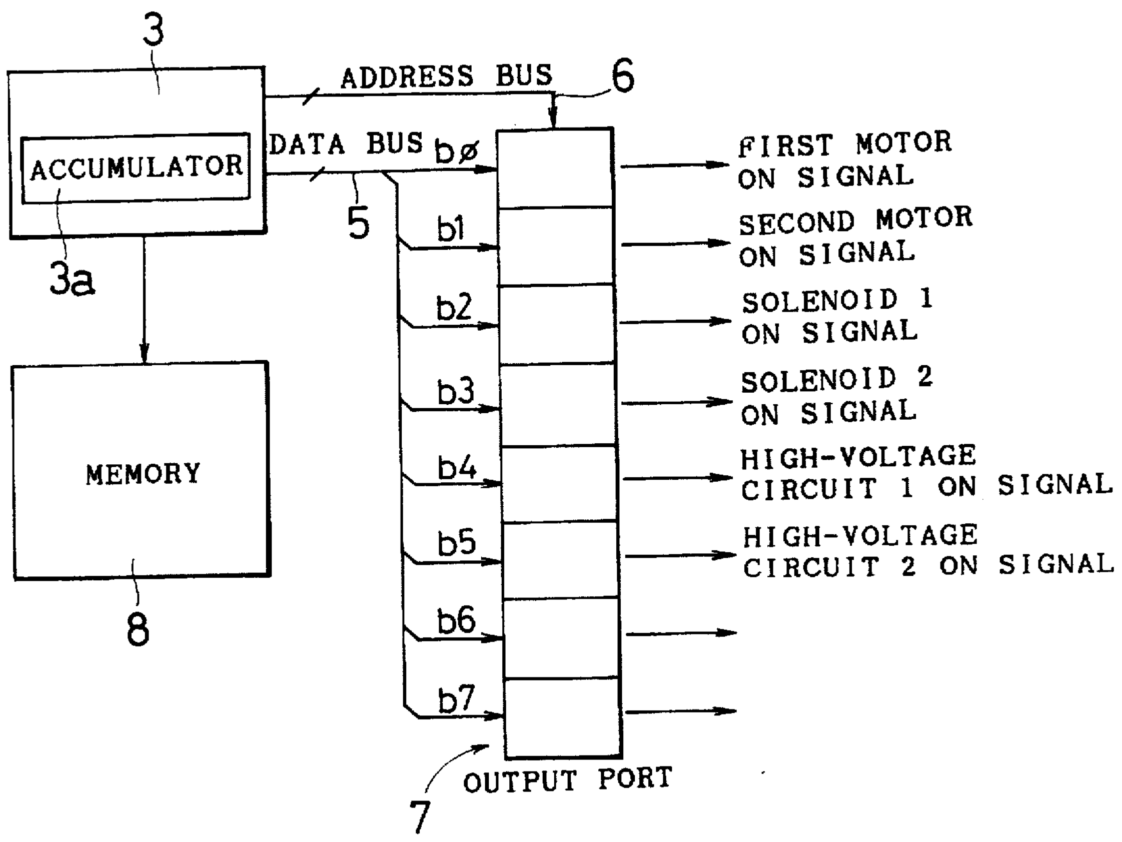
Fig. 74 Prior Art
FIG. 74 is a block diagram showing a conventional art where signals are sent to a plurality of ports.

FIG. 72 shows a process for determining the control mode of rotational speed of the motor 126. Like the process of FIG. 59, this operation is executed by an interrupt every one-millisecond. The CPU 145 of the engine controller 131 shown in FIG. 1 has a memory for pre-storing the speed data to control the rotational speed of the motor 126 which is a pulse motor. The pulse motor 126 is a four-phase motor, for example. By switching the combinations of power application to the four-phase windings at predetermined intervals, the motor 126 is driven in one or the other predetermined direction. Such switching operation is called "stepping" hereinafter. The speed data memory described above stores the number of steppings to be executed and the execution period during which the steppings are to be executed the specified number of times. This execution period includes an indefinite period, which is used in continuing the steady operation of the motor 126.

Step α1 in FIG. 72 judges whether the motor 126 makes as many revolutions as the number of steppings stored in the memory during the execution period in the same cycle. If this judgment is negative, and the motor 126 is in steady operation, the process is returned to the program of FIG. 28. If the judgment at step α1 is affirmative and the motor 126 is accelerating or decelerating, the process proceeds to step α2, which judges whether a read pointer indicating a data read address in the memory represents the final address of the data table. If it is not the final address, the acceleration or deceleration is not yet complete. On the basis of the data read from the final address of the data table at step α2, step α3 sets a predetermined number of relocations, and a table data in the period timer thereby to update the read pointer.

In the case where the judgment at step α2 is affirmative and the read pointer represents the final address of the data table, the motor 126 has reached the last stage of either acceleration or deceleration. In such a case, the process proceeds to step α4 and judges whether the motor 126 is in acceleration or not. If the judgment is affirmative, the motor 126 is in the final stage of the accelerating operation and the process proceeds to step α5, where a steady rotation flag is set and the acceleration flag is canceled. After that, the process returns to the program of FIG. 28. If the judgment at step a4 is negative, the motor 126 is now in the final stage of the decelerating operation. The process is passed to step α6, where the period timer is turned off, and the switching output of each voltage in excitation phase to the motor 126 is stopped. Also, the deceleration flag is cleared and the process is returned to the program of FIG. 28.

The invention may be embodied in order specific forms without departing from the spirit or essential characteristics thereof. The present embodiments are therefore to be considered in all respects as illustrative and not restrictive, the scope of the invention being indicated by the appended claims rather than by the foregoing description an all changes which come within the meaning and the range of equivalency of the claims are therefore intended to be embraced therein.

What is claimed is:

1. A signal processing apparatus of a printer, comprising:

a memory for storing a plurality of programs to be executed successively at predetermined timings;

interruption signal generating means for generating an interruption signal at predetermined timings;

a single counter for counting the number of occurrences of the interruption signals at the predetermined timings from a start of transferring a print medium within the printer to at least a start of ejecting the print medium from the printer;

an event table for storing a head memory address of each of said plurality of programs stored in said memory, and for storing a plurality of count values, each count value representing a number of occurrences of interruption signals, and each count value corresponding to a head memory address of one of said plurality of programs; and a microprocessor for reading a head memory address stored in said event table each time the number of occurrences of the interruption signal counted by said counter equals a count value stored in said event table, and for executing one of said plurality of programs stored in said memory according to the read head memory address.

2. The apparatus of claim 1, wherein the printer is configured to transfer a plurality of print mediums continuously, and wherein said apparatus includes a plurality of said single counters for said respective plurality of print mediums.

3. The apparatus of claim 1, wherein the interruption signal is for causing an interruption process of a predetermined interval and the predetermined interval of the interruption process is 1 msec.

* * * * *